United States Patent
Beg et al.

(10) Patent No.: US 12,133,103 B2
(45) Date of Patent: Oct. 29, 2024

(54) SYSTEMS AND METHODS FOR DYNAMIC TIME DOMAIN CHANNEL REPRESENTATIONS

(71) Applicant: COGNITIVE SYSTEMS CORP., Waterloo (CA)

(72) Inventors: Chris Beg, Waterloo (CA); Mohammad Omer, Waterloo (CA)

(73) Assignee: COGNITIVE SYSTEMS CORP., Waterloo (CA)

(*) Notice: Subject to any disclaimer, the term of this patent is extended or adjusted under 35 U.S.C. 154(b) by 0 days.

(21) Appl. No.: 18/297,089

(22) Filed: Apr. 7, 2023

(65) Prior Publication Data
US 2023/0247455 A1    Aug. 3, 2023

Related U.S. Application Data

(63) Continuation of application No. PCT/IB2022/055417, filed on Jun. 10, 2022.
(Continued)

(51) Int. Cl.
*H04W 24/08* (2009.01)
*G01S 7/00* (2006.01)
(Continued)

(52) U.S. Cl.
CPC ............ *H04W 24/08* (2013.01); *G01S 7/006* (2013.01); *G01S 13/003* (2013.01); *H04W 84/12* (2013.01)

(58) Field of Classification Search
None
See application file for complete search history.

(56) References Cited

U.S. PATENT DOCUMENTS 9,584,974 B1 * 2/2017 Omer .................... H04W 4/023
10,048,350 B1 8/2018 Piao et al.
(Continued)

FOREIGN PATENT DOCUMENTS

WO    WO-2020222585 A1 * 11/2020 ........ H04W 28/0284
WO    2021/256831 A1    12/2021
WO    2022/216225 A1    10/2022

OTHER PUBLICATIONS

Ma et al., "WiFi Sensing with Channel State Information: A Survey", ACM Comput. Surv., vol. 1, No. 1, Jan. 2019. (Year: 2019).*
(Continued)

*Primary Examiner* — Faruk Hamza
*Assistant Examiner* — Cassandra L Decker
(74) *Attorney, Agent, or Firm* — MEDLER FERRO WOODHOUSE & MILLS PLLC

(57) ABSTRACT

Systems and methods for dynamic channel representations are described. Initially a sensing receiver receives a sensing transmission. The sensing receiver then generates a sensing measurement based on the sensing transmission. Thereafter, the sensing receiver generates a channel representation information of a propagation channel between the sensing receiver and a sensing transmitter based on the sensing measurement. The sensing receiver then obtains a sensing imprint representing a steady-state propagation channel between the sensing receiver and the sensing transmitter. Further, the sensing receiver compares the channel representation information to the sensing imprint and identifies a difference between the channel representation information and the sensing imprint. The sensing receiver may further send the channel representation information to a sensing algorithm manager.

16 Claims, 26 Drawing Sheets

Related U.S. Application Data

(60) Provisional application No. 63/227,684, filed on Jul. 30, 2021, provisional application No. 63/210,645, filed on Jun. 15, 2021.

(51) Int. Cl.
  *G01S 13/00* (2006.01)
  *H04W 84/12* (2009.01)

(56) References Cited

U.S. PATENT DOCUMENTS

| | | |
|---|---|---|
| 10,109,168 B1 | 10/2018 | Devison et al. |
| 11,070,945 B1* | 7/2021 | Gao .................... G01S 13/003 |
| 2010/0267397 A1* | 10/2010 | Shen .................. H04W 64/006 |
| | | 455/456.1 |
| 2012/0164953 A1* | 6/2012 | Gu ....................... G01S 11/06 |
| | | 455/67.11 |
| 2018/0365975 A1* | 12/2018 | Xu ...................... H04B 7/0626 |
| 2019/0364591 A1* | 11/2019 | Berglund ............. H04L 1/0027 |
| 2019/0379434 A1* | 12/2019 | Lindskog .............. G01P 13/04 |
| 2020/0305231 A1* | 9/2020 | Sadeghi .............. H04B 7/0452 |
| 2020/0359248 A1 | 11/2020 | Sadeghi et al. |
| 2021/0041548 A1* | 2/2021 | Chen ....................... G01S 7/417 |
| 2021/0044407 A1* | 2/2021 | Lomayev ............ H04L 25/0202 |
| 2021/0228152 A1* | 7/2021 | Martinmäki ........... G16H 20/30 |
| 2021/0273735 A1 | 9/2021 | Da Silva et al. |
| 2022/0070710 A1 | 3/2022 | Lim et al. |
| 2022/0150962 A1* | 5/2022 | Chen .................... H04B 7/0626 |
| 2022/0272561 A1 | 8/2022 | Beg et al. |
| 2022/0304051 A1* | 9/2022 | Aboul-Magd ....... H04B 7/0626 |
| 2022/0322116 A1* | 10/2022 | Aboul-Magd ........ H04W 24/08 |
| 2022/0345187 A1* | 10/2022 | Merlin .................. H04L 1/0027 |
| 2022/0345979 A1* | 10/2022 | Tumuluru ............... G06F 3/165 |
| 2023/0023227 A1* | 1/2023 | Choi ................... H04L 25/0224 |
| 2023/0221428 A1* | 7/2023 | Jang ...................... G01S 13/765 |
| | | 342/42 |
| 2023/0254053 A1* | 8/2023 | Kim ........................ G01S 13/82 |
| | | 370/252 |

OTHER PUBLICATIONS

Zhu et al., "R-TTWD: Robust Device-Free Through-the-Wall Detection of Moving Human with WiFi", IEEE Journal on Selected Areas in Communications., vol. 35, No. 5, May 2017. (Year: 2017).*

* cited by examiner

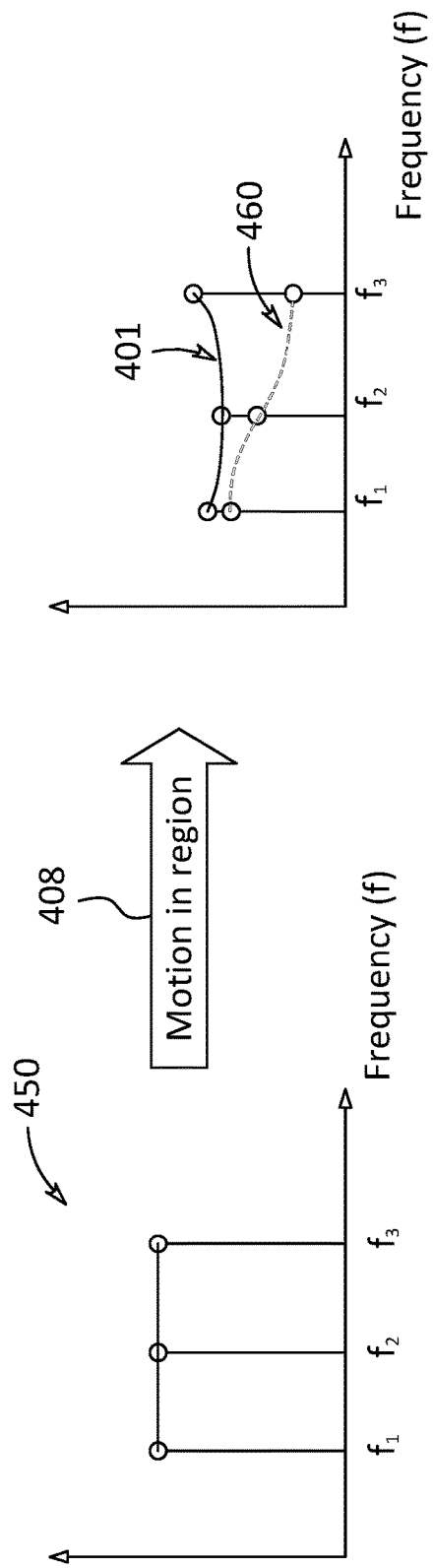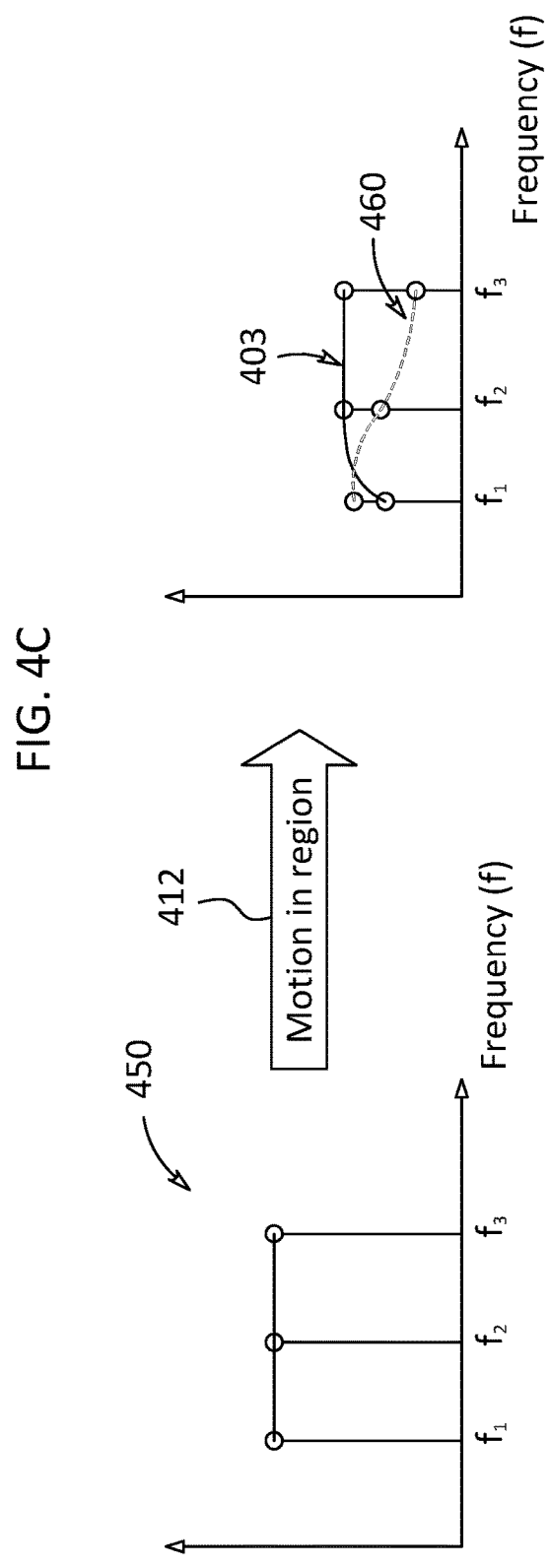
FIG. 4C
FIG. 4D

| 0 | 1 | 0 | 0 | 0 | 1 | Time domain pulse 1 - Magnitude | Time domain pulse 1- Phase |
|---|---|---|---|---|---|---|---|
| 0 | 1 | 0 | 0 | 1 | 0 | Time domain pulse 2 -Magnitude | Time domain pulse 2- Phase |
| 0 | 1 | 0 | 1 | 0 | 0 | Time domain pulse 3 -Magnitude | Time domain pulse 3- Phase |

| 0 | 1 | 0 | 0 | 0 | 1 | Imprint delta 1 - Phase |
| 0 | 1 | 0 | 0 | 1 | 0 | Imprint delta 2 - Phase |
| 0 | 1 | 0 | 1 | 0 | 0 | Imprint delta 3 - Phase |

| | | | | | | Imprint delta 1 - Magnitude |
| | | | | | | Imprint delta 2 - Magnitude |
| | | | | | | Imprint delta 3 - Magnitude |

| Message Type | Transmission Configuration (optional) | Timing Configuration (optional) | Steering Matrix Configuration (optional) | TD-CRI Configuration (optional) |
|---|---|---|---|---|
| 1 | Variable | Variable | Variable | Variable |

Octets:

SYSTEMS AND METHODS FOR DYNAMIC TIME DOMAIN CHANNEL REPRESENTATIONS

CROSS-REFERENCE TO RELATED APPLICATIONS

The present application is a continuation of International Application No. PCT/IB2022/055417, filed Jun. 10, 2022, which claims benefit under 35 U.S.C. § 119(e) of U.S. Provisional Application No. 63/210,645, filed Jun. 15, 2021, and U.S. Provisional Application No. 63/227,684, filed Jul. 30, 2021, all of which are incorporated by reference herein in their entirety.

TECHNICAL FIELD

The present disclosure generally relates to systems and methods for Wi-Fi sensing. In particular, the present disclosure relates to configuring Wi-Fi systems and methods for generating dynamic time domain channel representations for Wi-Fi sensing.

BACKGROUND OF THE DISCLOSURE

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems. A Wi-Fi sensing system is one recent addition to motion detection systems.

The Wi-Fi sensing system may be a network of Wi-Fi-enabled devices that may be a part of an IEEE 802.11 network. For example, the Wi-Fi sensing system may include a sensing receiver and a sensing transmitter. In an example, the Wi-Fi sensing system may be configured to detect features of interest in a sensing space. The sensing space may refer to any physical space in which the Wi-Fi sensing system may operate, such as a place of residence, a place of work, a shopping mall, a sports hall or sports stadium, a garden, or any other physical space. The features of interest may include motion of objects and motion tracking, presence detection, intrusion detection, gesture recognition, fall detection, breathing rate detection, and other applications. Motion or movement may be determined in the sensing space by a Wi-Fi sensing algorithm based on a transmission path between the sensing receiver and the sensing transmitter.

In the Wi-Fi sensing system, information that is representative of propagation channel (i.e., channel representation information) may need to be transmitted from one device to another device (for example, from the sensing receiver to the sensing transmitter) over the air. The representation of the propagation channel between devices is currently captured in channel state information (CSI). CSI is typically a set of complex values in frequency domain representing amplitude attenuation and phase rotation of each tone of a multi-tone orthogonal frequency-division multiplexing (OFDM) signal. In an example, for 20 MHz propagation channel bandwidth, 52 CSI complex pairs are used to represent the propagation channel. In another example, for 40 MHz propagation channel bandwidth, 104 CSI complex pairs are used to represent the propagation channel. As the propagation bandwidth increases, the number of CSI complex pairs used to represent the propagation channel also increases. Accordingly, transmission of channel information from one device to another device may require passing of a significant amount of information and as a result, channel capacity that may otherwise be used for data transfer is consumed. Also, channel utilization caused by transmission of the CSI over the air is magnified for wider channel bandwidth as a greater number of complex values needs to be sent. Further, the CSI needs to pass from Physical (PHY) layer to Media Access Control (MAC) layer. Currently, there is no standardized way to do transmit the CSI from PHY layer to MAC layer, and Wi-Fi sensing algorithms rely on proprietary interfaces.

BRIEF SUMMARY OF THE DISCLOSURE

The present disclosure generally relates to systems and methods for Wi-Fi sensing. In particular, the present disclosure relates to configuring Wi-Fi systems and methods for generating dynamic time domain channel representations for Wi-Fi sensing.

Systems and methods are provided for Wi-Fi sensing. In an embodiment, a method for Wi-Fi sensing carried out by a sensing receiver including a transmitting antenna, a receiving antenna, and at least one processor configured to execute instructions is provided. The method includes transmitting, via the transmitting antenna, a sensing trigger message; receiving, via the receiving antenna, a sensing transmission from a sensing transmitter; obtaining, by the at least one processor, a channel representation information based on the sensing transmission; identifying, by the at least one processor, that a difference between the channel representation information and a sensing imprint exceeds a threshold, wherein the sensing imprint includes two or more previously measured channel representation information; and sending the channel representation information to a sensing algorithm manager responsive to identifying that the difference exceeds the threshold.

In another embodiment, a method for Wi-Fi sensing carried out by a device including a transmitting antenna, a receiving antenna, and at least one processor configured to execute instructions is provided. The method includes receiving, via the receiving antenna from a sensing initiator, a threshold; receiving, via the receiving antenna from a sensing transmitter, a sensing transmission announcement message and a sensing transmission null data PPDU (NDP); obtaining, by the at least one processor, a channel representation information based on the sensing transmission NDP; receiving, via the receiving antenna from the sensing initiator, a measurement poll message; identifying, by the at least one processor, that a difference between the channel representation information and a sensing imprint exceeds the threshold, wherein the sensing imprint includes two or more previously measured channel representation information; and sending, by the at least one processor to the sensing initiator via the transmitting antenna, the channel representation information responsive to identifying that the difference exceeds the threshold.

In another embodiment, a method for Wi-Fi sensing carried out by a device including a transmitting antenna, a receiving antenna, and at least one processor configured to execute instructions is provided. The method includes receiving, via the receiving antenna, a sensing imprint from a sensing receiver; transmitting, via the transmitting antenna, a sensing transmission to a sensing receiver; transmitting, via the transmitting antenna, a measurement poll message to the sensing receiver; receiving, via the receiving antenna, a channel representation information based on the sensing transmission; identifying, by the at least one processor, that a difference between the channel representation information and the sensing imprint exceeds a threshold, wherein the sensing imprint includes two or more previously measured channel representation information; and sending the channel representation information to a sensing algorithm manager responsive to identifying that the difference exceeds the threshold.

In another embodiment, a system for Wi-Fi sensing comprising a sensing receiver including a transmitting antenna, a receiving antenna, and at least one processor configured to execute instructions is provided. The instructions may be for transmitting, via the transmitting antenna, a sensing trigger message; receiving, via the receiving antenna, a sensing transmission from a sensing transmitter; obtaining a channel representation information based on the sensing transmission; identifying that a difference between the channel representation information and a sensing imprint exceeds a threshold, wherein the sensing imprint includes two or more previously measured channel representation information; and sending the channel representation information to a sensing algorithm manager responsive to identifying that the difference exceeds the threshold.

In another embodiment, a system for Wi-Fi sensing comprising a device including a transmitting antenna, a receiving antenna, and at least one processor configured to execute instructions is provided. The instructions may be for receiving, via the receiving antenna from a sensing initiator, a threshold; receiving, via the receiving antenna from a sensing transmitter, a sensing transmission announcement message and a sensing transmission null data PPDU (NDP); obtaining a channel representation information based on the sensing transmission NDP; receiving, via the receiving antenna from the sensing initiator, a measurement poll message; identifying that a difference between the channel representation information and a sensing imprint exceeds the threshold, wherein the sensing imprint includes two or more previously measured channel representation information; and sending to the sensing initiator, via the transmitting antenna, the channel representation information responsive to identifying that the difference exceeds the threshold.

In another embodiment, a system for Wi-Fi sensing comprising a device including a transmitting antenna, a receiving antenna, and at least one processor configured to execute instructions is provided. The instructions may be for receiving, via the receiving antenna, a sensing imprint from a sensing receiver; transmitting, via the transmitting antenna, a sensing transmission to the sensing receiver; transmitting, via the transmitting antenna, a measurement poll message to the sensing receiver; receiving, via the receiving antenna, a channel representation information based on the sensing transmission; identifying that a difference between the channel representation information and the sensing imprint exceeds a threshold, wherein the sensing imprint includes two or more previously measured channel representation information; and sending the channel representation information to a sensing algorithm manager responsive to identifying that the difference exceeds the threshold.

In an example embodiment, a method configured for Wi-Fi sensing is described. The method is carried out by a sensing receiver including a transmitting antenna, a receiving antenna, and a processor configured to execute instructions. The method includes receiving, via the receiving antenna, a sensing transmission, generating, by the at least one processor, a sensing measurement based on the sensing transmission, generating, by the at least one processor, a full time-domain channel representation (TD-CRI) of a propagation channel between the sensing receiver and a sensing transmitter based on the sensing measurement, obtaining, by the at least one processor, a sensing imprint representing a steady-state propagation channel between the sensing receiver and the sensing transmitter, comparing, by the at least one processor, the full TD-CRI to the sensing imprint, identifying, by the at least one processor, a filtered TD-CRI according to differences between the full TD-CRI and the sensing imprint, and sending the filtered TD-CRI to a sensing algorithm manager.

In some implementations, identifying the filtered TD-CRI includes determining first time domain pulses of the full TD-CRI that differ from second time domain pulses of the sensing imprint and designating the first time domain pulses as the filtered TD-CRI.

In some implementations, the method further includes obtaining, by the sensing algorithm manager, the sensing imprint, and generating, by the sensing algorithm manager, a reconstructed TD-CRI by replacing corresponding time domain pulses of the sensing imprint with the first time domain pulses of the filtered TD-CRI.

In some implementations, the method further includes transmitting, to the sensing algorithm manager, a location bitmap indicating locations in the full TD-CRI of the first time domain pulses.

In some implementations, the method further includes storing differences between first time domain pulses of the full TD-CRI and second time domain pulses of the sensing imprint as an imprint delta defining the filtered TD-CRI.

In some implementations, the differences stored as the imprint delta require fewer bits than the first time domain pulses.

In some implementations, storing differences between first time domain pulses of the full TD-CRI and second time domain pulses of the sensing imprint includes storing only the differences that exceed a measurement imprint delta threshold.

In some implementations, the method further includes obtaining, by the sensing algorithm manager, the sensing imprint and generating, by the sensing algorithm manager, a reconstructed TD-CRI by adding the differences stored in the imprint delta to corresponding time domain pulses of the sensing imprint.

In some implementations, the method further includes transmitting, to the sensing algorithm manager, a location bitmap indicating imprint delta locations corresponding to TD-CRI locations.

In some implementations, comparing the full TD-CRI to the sensing imprint is performed responsive to a request from the sensing algorithm manager for a high fidelity TD-CRI reconstruction.

In some implementations, the method further includes transmitting, to the sensing algorithm manager, a sensing imprint indicator.

In some implementations, the method further includes making a sensing imprint update determination and updating, responsive to the sensing imprint update determination, the sensing imprint.

In some implementations, making the sensing imprint update determination includes obtaining a previous imprint delta selected according to a steady-state imprint delta period, comparing the previous imprint delta to a current imprint delta, identifying a changed time domain pulse in the previous imprint delta and a corresponding time domain pulse in the current imprint delta, and determining that the corresponding time domain pulse remains above a steady-state imprint delta threshold.

In some implementations, making a sensing imprint update determination includes obtaining a previous imprint delta selected according to an imprint delta derivative period, comparing the previous imprint delta to a current imprint delta, identifying a changed time domain pulse between the previous imprint delta and the current imprint delta, and determining that the corresponding time domain pulse drops below an imprint delta derivative threshold.

In some implementations, making a sensing imprint update determination includes determining that an imprint validity timer has expired.

In another example embodiment, a method configured for Wi-Fi sensing is described. The method is carried out by a device including a receiving antenna and a processor configured to execute instructions. The method includes receiving, via the receiving antenna, a filtered TD-CRI, obtaining, by the at least one processor, a sensing imprint, generating, by a sensing algorithm manager, a reconstructed TD-CRI from the filtered TD-CRI and the sensing imprint, transforming the reconstructed TD-CRI into a reconstructed frequency domain channel representation, and detecting, by the sensing algorithm manager, a feature of interest in a sensing space according to the reconstructed frequency domain channel representation.

In some embodiments, receiving the filtered TD-CRI includes receiving a plurality of time domain pulses and generating the reconstructed TD-CRI includes replacing corresponding time domain pulses of the sensing imprint with the plurality of time domain pulses.

In some embodiments, the method further includes receiving a location bitmap indicating locations of the corresponding time domain pulses in the sensing imprint.

In some embodiments, receiving the filtered TD-CRI includes receiving an imprint delta storing time domain pulse differences and generating the reconstructed TD-CRI includes adding the time domain pulse differences to corresponding time domain pulses of the sensing imprint.

In some embodiments, the method further includes receiving a location bitmap indicating locations of the corresponding time domain pulses in the sensing imprint.

In some embodiments, the method further includes receiving a sensing imprint indicator, where obtaining the sensing imprint is performed according to the sensing imprint indicator.

In some embodiments, the method further includes making a sensing imprint update determination and updating, responsive to the sensing imprint update determination, the sensing imprint.

In some embodiments, making a sensing imprint update determination includes obtaining a previous imprint delta selected according to a steady-state imprint delta period, comparing the previous imprint delta to a current imprint delta, identifying a changed time domain pulse in the previous imprint delta and a corresponding time domain pulse in the current imprint delta, and determining that the corresponding time domain pulse remains above a steady-state imprint delta threshold.

In some embodiments, making a sensing imprint update determination includes obtaining a previous imprint delta selected according to an imprint delta derivative period, comparing the previous imprint delta to a current imprint delta, identifying a changed time domain pulse between the previous imprint delta and the current imprint delta, and determining that the corresponding time domain pulse drops below an imprint delta derivative threshold.

In some embodiments, making a sensing imprint update determination includes determining that an imprint validity timer has expired.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 4C and 4D are plots showing the example channel responses of FIGS. 4A and 4B overlaid on an example channel response associated with no motion occurring in the space;

FIG. 10 depicts an example of a set of changed time domain pulses in a full TD-CRI, according to some embodiments;

FIG. 11 depicts another example of a set of changed time domain pulses in a full TD-CRI, according to some embodiments;

FIG. 12 illustrates a management frame carrying a sensing transmission, according to some embodiments;

DETAILED DESCRIPTION

Figure 1:
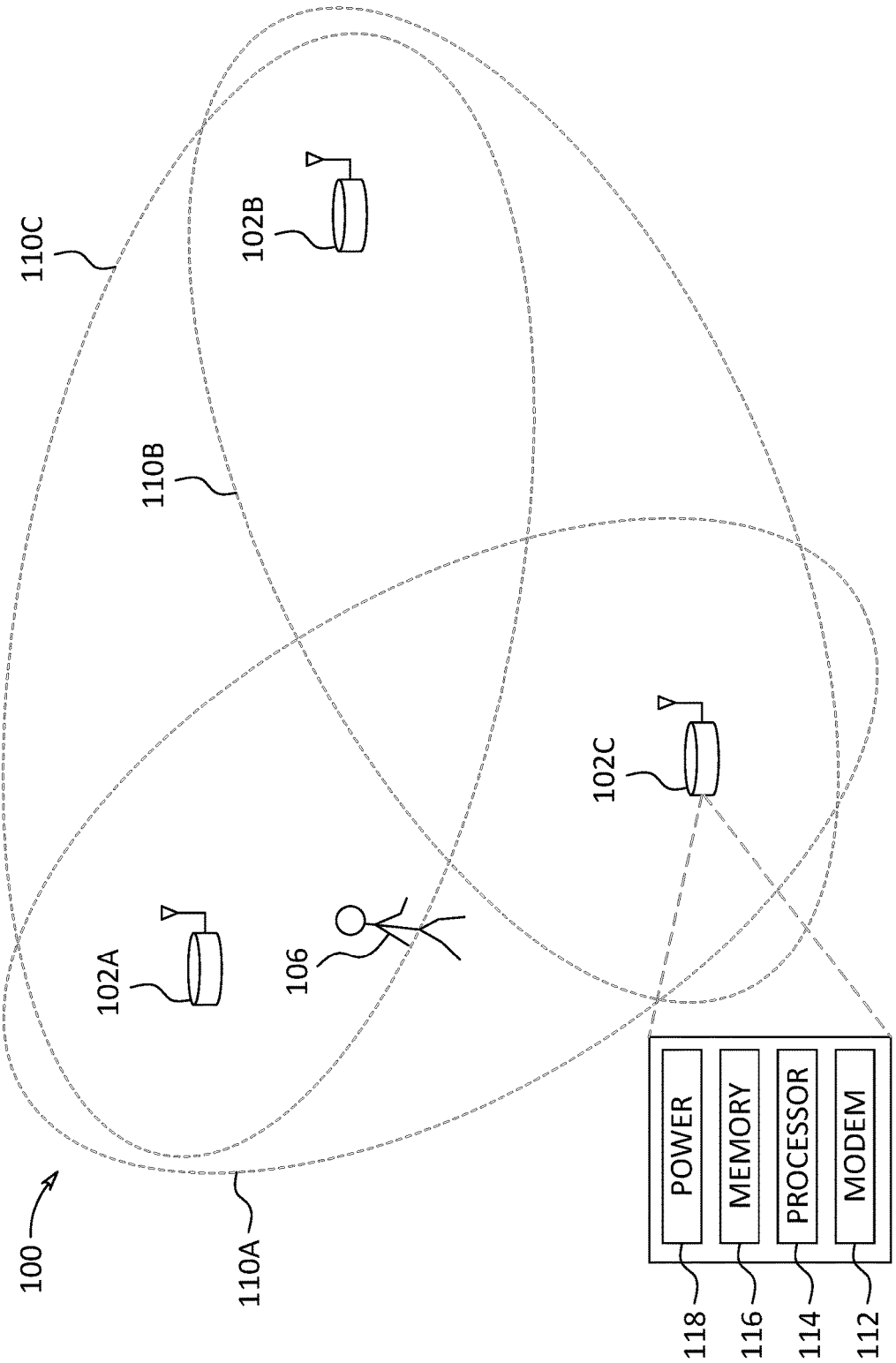
FIG. 1 is a diagram showing an example wireless communication system.

A Wi-Fi sensing system may measure an environment by transmitting signal(s) to sensing transmitter(s) and analyzing response(s) received from the sensing transmitter(s). The Wi-Fi sensing system may perform repeated measurements to analyze the environment and the changes thereof. The Wi-Fi sensing system may operate in conjunction with existing communication components, and benefits from having a Medium Access Control (MAC) layer entity, which may be used for the coordination of air-time resource usage among multiple devices based upon defined protocols.

One of the relevant standardization goals of Wi-Fi sensing systems is to reduce additional overheads on existing Wi-Fi network, such that overlaying Wi-Fi sensing capability on the 802.11 network does not compromise the communication function of the network. One aspect of sensing in Wi-Fi sensing systems is a solicitation of a sensing transmission from a sensing transmitter. Improvements to MAC layer to enable solicitation of a sensing transmission from the sensing transmitter with characteristics that are optimized to allow the Wi-Fi sensing agent to detect presence, location and motion may significantly impact existing system performance. In particular, the request or solicitation of the sensing transmitter transmission optimized for sensing (or a sensing transmission) may impact an uplink scheduler of the sensing transmitter. There are existing mechanisms to request or solicit the sensing transmitter to transmit the sensing transmission. However, such mechanisms were designed for different purposes. As a result, these mechanisms are not efficient, offer no flexibility in control, and are not universally consistent among different vendor implementations. Furthermore, a channel sounding protocol may be considered for supporting Wi-Fi sensing. However, the channel sounding protocol is not currently flexible and thus, such functionality in support of Wi-Fi sensing is not possible.

Protocols for Wi-Fi systems are designed with decisions made on a basis of a data transfer mechanism as against sensing requirements. As a result, Wi-Fi sensing aspects are frequently not developed within common Wi-Fi systems.

In some aspects of what is described herein, a wireless sensing system may be used for a variety of wireless sensing applications by processing wireless signals (e.g., radio frequency signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals. As described in more detail below, the wireless sensing system may be configured to control measurement rates, wireless connections, and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate like a bistatic radar system, where a Wi-Fi access-point (AP) assumes the receiver role, and each Wi-Fi device (stations, nodes, or peers) connected to the AP assume the transmitter role. The wireless sensing system may trigger a connected device to generate a transmission and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). The wireless sensing algorithm may include intelligence needed to extract desired features out of the channel response measurements and may be different based on the desired sensing application.

In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a sensing transmitter communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space. According to some aspects, the channel information may be offloaded to an external device. The external device may process the channel information to detect whether an object is present or not. In an example, the channel information may be transmitted from one device to another device over the air. Further, channel utilization caused by transmission of the channel information over the air may vary based on width of channel bandwidth.

In some cases, a wireless sensing system can perform band steering or client steering of nodes throughout a wireless network, for example, in a Wi-Fi multi-AP or Extended Service Set (ESS) topology, multiple coordinating wireless access-points (APs) each provide a Basic Service Set (BSS) which may occupy different frequency bands and allow devices to transparently move between from one participating AP to another (e.g., mesh). For instance, within a home mesh network, Wi-Fi devices can connect to any of the APs, but typically select one with a good signal strength. The coverage footprint of the mesh APs typically overlap, often putting each device within communication range or more than one AP. If the AP supports multi-bands (e.g., 2.4 GHz and 5 GHz), the wireless sensing system may keep a device connected to the same physical AP, but instruct it to use a different frequency band to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area to improve detection coverage or to better localize motion within an area.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell-phone battery to discharge faster). These and other events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications). However, the operation, system improvements, and technical advantages achieved when the wireless sensing system is operating as a motion detection system are also applicable in examples where the wireless sensing system is used for another type of wireless sensing application.

As disclosed in embodiments herein, a wireless local area network (WLAN) sensing procedure allows a station (STA) to perform WLAN sensing. WLAN sensing may include a WLAN sensing session. In examples, WLAN sensing procedure, WLAN sensing, and WLAN sensing session may be referred to as wireless sensing procedure, wireless sensing, wireless sensing session, Wi-Fi sensing procedure, Wi-Fi sensing, and Wi-Fi sensing session, or sensing procedure, sensing, and sensing session.

WLAN sensing is a service that enables a STA to obtain sensing measurements of the channel(s) between two or more STAs and/or the channel between a receive antenna and a transmit antenna of a STA or an access point (AP). A WLAN sensing procedure may be composed of one or more of the following: sensing session setup, sensing measurement setup, sensing measurement instances, sensing measurement setup termination, and sensing session termination.

In examples disclosed herein, sensing session setup and sensing measurement setup may be referred to as sensing configuration and may be achieved by a sensing configuration message and may be confirmed by a sensing configuration response message. A sensing measurement instance may be an individual sensing measurement and may be derived from a sensing transmission. In examples, the sensing configuration message may be referred to as a sensing measurement setup request, and the sensing configuration response message may be referred to as a sensing measurement setup response.

A WLAN sensing procedure may include multiple sensing measurement instances. In examples, the multiple sensing measurement instances may be referred to a measurement campaign.

IEEE P802.11-REVmd/D5.0 considers a STA to be a physical (PHY) and media access controller (MAC) entity capable of supporting features defined by the specification. A device containing a STA may be referred to as a Wi-Fi device. A Wi-Fi device which manages a basic service set (BSS) (as defined by IEEE P802.11-REVmd/D5.0) may be referred to as an AP STA. A Wi-Fi device which is a client node in a BSS may be referred to as a non-AP STA. In some examples, an AP STA may be referred to as an AP and a non-AP STA may be referred to as a STA.

In various embodiments of the disclosure, non-limiting definitions of one or more terms that will be used in the document are provided below.

A term "steady-state propagation channel" may refer to a channel between a sensing receiver and a sensing transmitter which is defined and affected only by the physical sensing space and does not account for any perturbations due to transient objects or motion.

A term "measurement campaign" may refer to a bi-directional series of sensing transmissions between a sensing receiver (commonly known as Wi-Fi device, wireless access-point, Wi-Fi access point, access point, Wi-Fi station, station, sensing initiator, sensing responder, or sensing receiver) and a sensing transmitter (commonly known as Wi-Fi device, wireless access point, Wi-Fi access point, access point, Wi-Fi station, station, sensing initiator, sensing responder, or sensing transmitter) that allows a series of sensing measurements to be computed.

A term "sensing initiator" may refer to a STA or an AP that initiates a Wi-Fi sensing procedure. A STA acting as a sensing initiator may participate in a sensing measurement instance as a sensing receiver, a sensing transmitter, both a sensing transmitter and sensing receiver, or neither a sensing transmitter nor a sensing receiver, or a separate device which includes a sensing algorithm (for example, a sensing algorithm manager). In some examples, the sensing initiator may be a device that initiates a WLAN sensing session. In an example, the sensing initiator may include a Wi-Fi sensing agent executing a sensing algorithm. In an example, a sensing initiator may be considered to control the WLAN sensing procedure or the measurement campaign.

A term "sensing responder" may refer to a STA or an AP that participates in a WLAN sensing procedure initiated by a sensing initiator. A STA acting as a sensing responder may participate in a sensing measurement instance as a sensing receiver, a sensing transmitter, and both a sensing receiver and a sensing transmitter.

A term "sensing transmitter" may refer to a STA or an AP that transmits PHY-layer Protocol Data Units (PPDUs) which are sensing transmissions used for sensing measurements in a WLAN sensing session.

A term "sensing receiver" may be refer to a STA or AP that receives PPDUs sent by a sensing transmitter in a WLAN sensing procedure and performs sensing measurements.

In examples, a sensing transmitter may be referred to as a remote device and a sensing receiver may be referred to as a sensing device. In other examples, a sensing initiator may be a function of a sensing device or of a remote device, and a sensing responder may be a function of a sensing device or of a remote device.

A term "Wireless Local Area Network (WLAN) sensing session" may refer to a period during which objects in a physical space may be probed, detected and/or characterized. In an example, during a WLAN sensing session, several devices participate in, and thereby contribute to the generation of sensing measurements. The WLAN sensing session may be controlled by a sensing initiator.

A term "PHY-layer Protocol Data Unit (PPDU)" may refer to a data unit that includes preamble and data fields. The preamble field may include the transmission vector format information and the data field may include payload and higher layer headers.

A term "Channel State Information (CSI)" may represent how wireless signals propagate from a transmitter to a receiver along multiple paths. CSI is typically a matrix of complex values representing amplitude attenuation and phase shift of signals, which provides an estimation of a communications channel.

A term "sensing space" may refer to any physical space in which a Wi-Fi sensing system may operate.

A term "sensing initiation message" may refer to a message sent from the sensing initiator (which may be a sensing receiver) to the sensing transmitter to initiate one or more sensing transmissions that may be used for performing sensing measurements. The sensing initiation message may also be known as a sensing trigger message in some examples.

A term "sensing transmission" may refer to any transmission made from the sensing transmitter to the sensing receiver which may be used to make a sensing measurement. In an example, sensing transmission may also be referred to as wireless sensing signal or wireless signal. In examples, PPDU(s) used for a sensing measurement may be referred to as a sensing transmission.

A term "sensing trigger message" may refer to a message sent from a sensing initiator to a sensing transmitter to initiate or trigger one or more sensing transmissions that may be used for performing sensing measurements. In an example, the sensing trigger message may include requested transmission configuration, requested timing configuration, and/or steering matrix configuration. In examples, the term sensing trigger message may be referred to as sensing sounding trigger message or sensing sounding trigger frame.

A term "sensing transmission announcement" may refer to a message which is sent from the sensing transmitter to the sensing receiver that announces that a sensing transmission NDP will follow within a Short Interframe Space (SIFS). The sensing transmission NDP may be transmitted using transmission parameters defined with the sensing transmission announcement.

A term "sensing transmission NDP" may refer to an NDP (null data PPDU) transmission which is sent by the sensing transmitter and used for a sensing measurement at the sensing receiver. The transmission follows a sensing transmission announcement and may be transmitted using transmission parameters that are defined in the sensing response announcement.

A term "sensing measurement" may refer to a measurement of a state of a propagation channel between the sensing transmitter and the sensing receiver derived from a sensing transmission.

A term "Channel Representation Information (CRI)" may refer to a collection of sensing measurements with together represent the state of the propagation channel between two devices. Examples of CRI are CSI and full TD-CRI.

A term "sensing measurement poll" may refer to a message which is sent from the sensing initiator or in example, the sensing transmitter, to the sensing receiver to solicit the transmission of channel representation information which has been determined by the sensing receiver.

A term "transmission parameters" may refer to a set of IEEE 802.11 PHY transmitter configuration parameters which are defined as part of transmission vector (TXVECTOR) corresponding to a specific PHY and which are configurable for each PHY-layer Protocol Data Unit (PPDU) transmission.

A term "full time-domain channel representation information (full TD-CRI)" may refer to a series of complex pairs of time domain pulses which are created by performing an Inverse Fast Fourier Transform (IFFT) on CSI values, for example CSI calculated by a baseband receiver.

A term "filtered time-domain channel representation information (filtered TD-CRI)" may refer to a reduced series of complex pairs of time domain pulses created by applying an algorithm to a full TD-CRI. The algorithm may select some time domain pulses and reject others. The filtered TD-CRI contains information that relates a selected time domain pulse to the corresponding time domain pulse in the full TD-CRI.

A term "Channel Response Information (CRI) transmission message" may refer to a message sent by the sensing receiver that has performed a sensing measurement on a sensing transmission, in which the sensing receiver sends CRI to a sensing initiator or the sensing algorithm manager.

A term "reconstructed CSI (R-CSI)" may refer to representation of original CSI values as measured by the baseband receiver, where R-CSI is calculated by taking original CSI values (frequency domain), performing an IFFT to translate those values into the time domain, selecting a number of time domain pulses, zeroing or nulling time domain tones that do not include a selected time domain pulse, and performing an FFT. The resulting frequency domain complex values are the R-CSI.

A term "time domain pulse" may refer to a complex number that represents amplitude and phase of discretized energy in the time domain. When CSI values are obtained for each tone from the baseband receiver, time domain pulses are obtained by performing an IFFT on the CSI values.

A term "tone" may refer to an individual subcarrier in an OFDM signal. A tone may be represented in time domain or frequency domain. In the time domain, a tone may also be referred to as a symbol. In the frequency domain, a tone may also be referred to as a subcarrier.

A term "feature of interest" may refer to item or state of an item which is positively detected and/or identified by a sensing algorithm.

A term "sensing imprint" may refer to a steady state or semi-static representation of the propagation channel between the sensing receiver and the sensing transmitter in the sensing space calculated by the sensing receiver in the form of a time domain channel impulse response.

A term "delivered transmission configuration" may refer to transmission parameters applied by the sensing transmitter to a sensing transmission.

A term "requested transmission configuration" may refer to requested transmission parameters of the sensing transmitter to be used when sending a sensing transmission A term "imprint delta" may refer to a single dimension matrix of complex values which represent the difference between a time domain channel impulse response generated by converting a CSI measurement to the time domain using an IFFT, and a stored sensing imprint.

A term "measurement imprint delta threshold" may refer to minimum difference between a TD-CRI value and the corresponding sensing imprint value for which the sensing receiver or the sensing algorithm manager considers that there is a change in the propagation channel propagation characteristics.

A term "measurement imprint delta count" may refer to a number of times which a measurement imprint delta threshold is exceeded before the sensing receiver or the sensing algorithm manager considers that there is a change in propagation channel propagation characteristics.

A term "imprint delta derivative period" may refer to a period during which imprint delta derivatives must remain below an imprint delta derivative threshold before the sensing receiver or the sensing algorithm manager may determine that a new sensing imprint needs to be calculated.

A term "imprint delta derivative" may refer to the rate of change of the imprint delta over one or more tones and over one or more frames.

A term "imprint delta derivative threshold" may refer to a maximum value of the rate imprint delta derivative for which the sensing receiver or the sensing algorithm manager considers that there is ongoing movement or motion in the sensing space. If the imprint delta derivative drops below the imprint delta derivative threshold, the sensing receiver or the sensing algorithm manager may determine that a new sensing imprint needs to be calculated.

A term "imprint validity timer" for a sensing imprint may indicate when the validity period for that sensing imprint expires. In examples, when the imprint validity timer for a given sensing imprint expires, the sensing imprint will be recalculated. In an example, a duration of the imprint validity timer may be configured by sensing algorithm manager.

A term "steady-state imprint delta threshold" may refer to the maximum difference between a TD-CRI value and the corresponding sensing imprint value for which the sensing receiver or the sensing algorithm manager considers that the TD-CRI has not returned to its steady-state (i.e., a stored sensing imprint).

A term "steady-state imprint delta period" may refer to a period within which an imprint delta should drop below steady-state imprint delta threshold if the sensing receiver or the sensing algorithm manager is to consider that the TD-CRI has returned to its steady-state.

A term "imprint validity period" may refer to a maximum period of validity for a sensing imprint.

A term "sensing imprint average count" may refer to a number of sensing measurements which may be averaged to generate a sensing imprint.

For purposes of reading the description of the various embodiments below, the following descriptions of the sections of the specifications and their respective contents may be helpful:

Section A describes a wireless communications system, wireless transmissions and sensing measurements which may be useful for practicing embodiments described herein.

Section B describes embodiments of systems and methods for Wi-Fi sensing. In particular, section B describes Wi-Fi systems and methods for generating dynamic time domain channel representations for Wi-Fi sensing.

A. Wireless Communications System, Wireless Transmissions, and Sensing Measurements FIG. 1 illustrates wireless communication system 100. Wireless communication system 100 includes three wireless communication devices: first wireless communication device 102A, second wireless communication device 102B, and third wireless communication device 102C. Example wireless communication system 100 may include additional wireless communication devices and other components (e.g., additional wireless communication devices, one or more network servers, network routers, network switches, cables, or other communication links, etc.).

Wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), Zig-Bee), millimeter wave communications, and others.

In some implementations, wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In the example shown in FIG. 1, wireless communication devices 102A, 102B, 102C can be, or they may include standard wireless network components. For example, wireless communication devices 102A, 102B, 102C may be commercially available Wi-Fi access points or another type of wireless access point (WAP) performing one or more operations as described herein that are embedded as instructions (e.g., software or firmware) on the modem of the WAP. In some cases, wireless communication devices 102A, 102B, 102C may be nodes of a wireless mesh network, such as, for example, a commercially available mesh network system (e.g., Plume Wi-Fi, Google Wi-Fi, Qualcomm Wi-Fi SoN, etc.). In some cases, another type of standard or conventional Wi-Fi transmitter device may be used. In some instances, one or more of wireless communication devices 102A, 102B, 102C may be implemented as WAPs in a mesh network, while other wireless communication device(s) 102A, 102B, 102C are implemented as leaf devices (e.g., mobile devices, smart devices, etc.) that access the mesh network through one of the WAPs. In some cases, one or more of wireless communication devices 102A, 102B, 102C is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

Wireless communication devices 102A, 102B, 102C may be implemented without Wi-Fi components; for example, other types of standard or non-standard wireless communication may be used for motion detection. In some cases, wireless communication devices 102A, 102B, 102C can be, or they may be part of, a dedicated motion detection system. For example, the dedicated motion detection system can include a hub device and one or more beacon devices (as remote sensor devices), and wireless communication devices 102A, 102B, 102C can be either a hub device or a beacon device in the motion detection system.

As shown in FIG. 1, wireless communication device 102C includes modem 112, processor 114, memory 116, and power unit 118; any of wireless communication devices 102A, 102B, 102C in wireless communication system 100 may include the same, additional, or different components, and the components may be configured to operate as shown in FIG. 1 or in another manner. In some implementations, modem 112, processor 114, memory 116, and power unit 118 of a wireless communication device are housed together in a common housing or other assembly. In some implementations, one or more of the components of a wireless communication device can be housed separately, for example, in a separate housing or other assembly.

Modem 112 can communicate (receive, transmit, or both) wireless signals. For example, modem 112 may be configured to communicate radio frequency (RF) signals formatted according to a wireless communication standard (e.g., Wi-Fi or Bluetooth). Modem 112 may be implemented as the example wireless network modem 112 shown in FIG. 1, or may be implemented in another manner, for example, with other types of components or subsystems. In some implementations, modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in modem 112 can include one or more antennas and radio frequency circuitry. The radio frequency circuitry can include, for example, circuitry that filters, amplifies, or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in modem 112 receives baseband signals from the baseband subsystem, up-converts the baseband signals to radio frequency (RF) signals, and wirelessly transmits the radio frequency signals (e.g., through an antenna). In some instances, the radio subsystem in modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of modem 112 can communicate wireless network traffic (e.g., data packets) in the wireless communication network through the radio subsystem on one or more network traffic channels. The baseband subsystem of modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

Processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. Processor 114 may be or include a general-purpose microprocessor, as a specialized co-processor or another type of data processing apparatus. In some cases, processor 114 performs high level operation of the wireless communication device 102C. For example, processor 114 may be configured to execute or interpret software, scripts, programs, functions, executables, or other instructions stored in memory 116. In some implementations, processor 114 may be included in modem 112.

Memory 116 can include computer-readable storage media, for example, a volatile memory device, a non-volatile memory device, or both. Memory 116 can include one or more read-only memory devices, random-access memory devices, buffer memory devices, or a combination of these and other types of memory devices. In some instances, one or more components of the memory can be integrated or otherwise associated with another component of wireless communication device 102C. Memory 116 may store instructions that are executable by processor 114. For example, the instructions may include instructions for time-aligning signals using an interference buffer and a motion detection buffer, such as through one or more of the operations of the example processes as described in any of FIGS. 17A, 17B, 18, 19A, 19B, 20, and 21.

Power unit 118 provides power to the other components of wireless communication device 102C. For example, the other components may operate based on electrical power provided by power unit 118 through a voltage bus or other connection. In some implementations, power unit 118 includes a battery or a battery system, for example, a rechargeable battery. In some implementations, power unit 118 includes an adapter (e.g., an AC adapter) that receives an external power signal (from an external source) and coverts the external power signal to an internal power signal conditioned for a component of wireless communication device 102C. Power unit 118 may include other components or operate in another manner.

In the example shown in FIG. 1, wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as wireless communication device 102C may receive the wireless signals transmitted by wireless communication devices 102A, 102B. In some cases, the wireless signals transmitted by wireless communication devices 102A, 102B are repeated periodically, for example, according to a wireless communication standard or otherwise.

In the example shown, wireless communication device 102C processes the wireless signals from wireless communication devices 102A, 102B to detect motion of an object in a space accessed by the wireless signals, to determine a location of the detected motion, or both. For example, wireless communication device 102C may perform one or more operations of the example processes described below with respect to any of FIGS. 17A, 17B, 18, 19A, 19B, 20, and 21, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that wireless communication device 102C can transmit wireless signals and wireless communication devices 102A, 102B can processes the wireless signals from wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In examples, motion detection may be carried out by analyzing one or more training fields carried by the wireless signals or by analyzing other data carried by the signal. In some examples data will be added for the express purpose of motion detection or the data used will nominally be for another purpose and reused or repurposed for motion detection. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, wireless communication device 102C may generate motion detection data. In some instances, wireless communication device 102C may communicate the motion detection data to another device or system, such as a security system, which may include a control center for monitoring movement within a space, such as a room, building, outdoor area, etc.

In some implementations, wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by wireless communication device 102C, which may reduce the amount of processing that wireless communication device 102C performs for motion sensing. The header may include additional information such as, for example, an indication of whether motion was detected by another device in communication system 100, an indication of the modulation type, an identification of the device transmitting the signal, etc.

In the example shown in FIG. 1, wireless communication system 100 is a wireless mesh network, with wireless communication links between each of wireless communication devices 102. In the example shown, the wireless communication link between wireless communication device 102C and wireless communication device 102A can be used to probe motion detection field 110A, the wireless communication link between wireless communication device 102C and wireless communication device 102B can be used to probe motion detection field 110B, and the wireless communication link between wireless communication device 102A and wireless communication device 102B can be used to probe motion detection field 110C. In some instances, each wireless communication device 102 detects motion in motion detection fields 110 accessed by that device by processing received signals that are based on wireless signals transmitted by wireless communication devices 102 through motion detection fields 110. For example, when person 106 shown in FIG. 1 moves in motion detection field 110A and motion detection field 110C, wireless communication devices 102 may detect the motion based on signals they received that are based on wireless signals transmitted through respective motion detection fields 110. For instance, wireless communication device 102A can detect motion of person 106 in motion detection fields 110A, 110C, wireless communication device 102B can detect motion of person 106 in motion detection field 110C, and wireless communication device 102C can detect motion of person 106 in motion detection field 110A.

In some instances, motion detection fields 110 can include, for example, air, solid materials, liquids, or another medium through which wireless electromagnetic signals may propagate. In the example shown in FIG. 1, motion detection field 110A provides a wireless communication channel between wireless communication device 102A and wireless communication device 102C, motion detection field 110B provides a wireless communication channel between wireless communication device 102B and wireless communication device 102C, and motion detection field 110C provides a wireless communication channel between wireless communication device 102A and wireless communication device 102B. In some aspects of operation, wireless signals transmitted on a wireless communication channel (separate from or shared with the wireless communication channel for network traffic) are used to detect movement of an object in a space. The objects can be any type of static or moveable object and can be living or inanimate. For example, the object can be a human (e.g., person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of wireless communication devices 102 (or another device communicably coupled to wireless communications devices 102) may determine that the detected motion is nearby a particular wireless communication device.

Figure 2A:
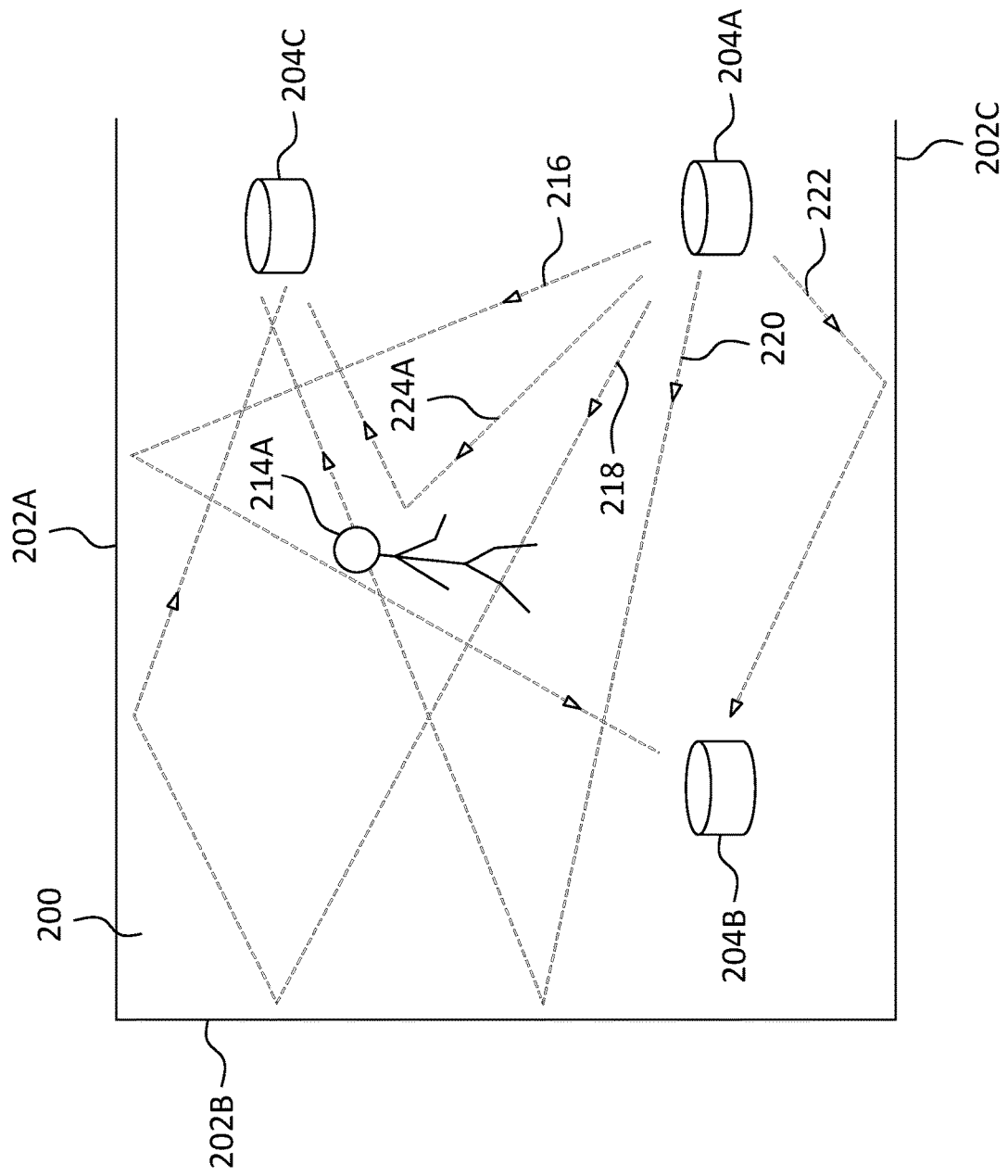
FIGS. 2A and 2B are diagrams showing example wireless signals communicated between wireless communication devices.
Figure 2B:
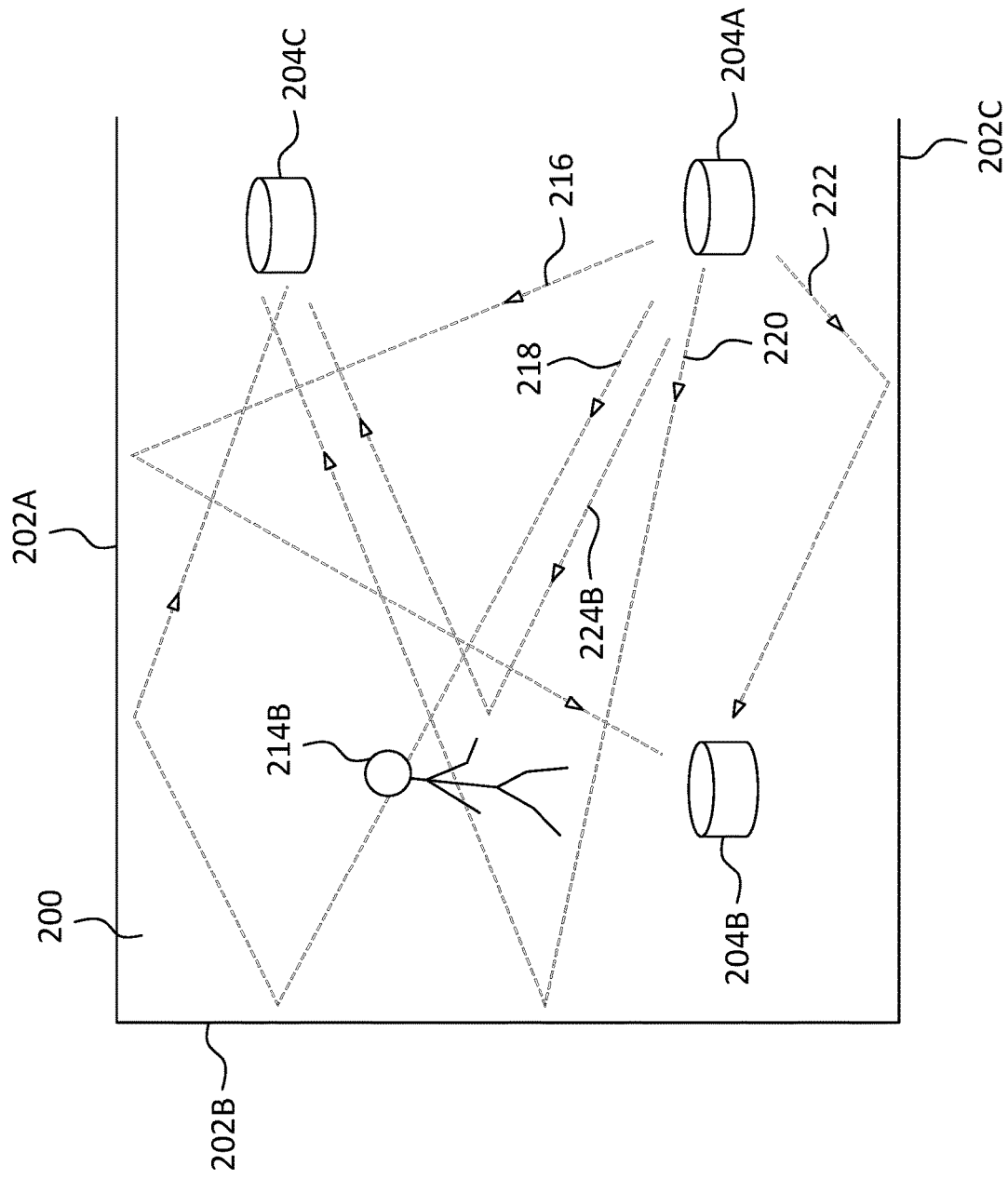

FIGS. 2A and 2B are diagrams showing example wireless signals communicated between wireless communication devices 204A, 204B, 204C. Wireless communication devices 204A, 204B, 204C can be, for example, wireless communication devices 102A, 102B, 102C shown in FIG. 1, or other types of wireless communication devices. Wireless communication devices 204A, 204B, 204C transmit wireless signals through space 200. Space 200 can be completely or partially enclosed or open at one or more boundaries. Space 200 can be or can include an interior of a room, multiple rooms, a building, an indoor area, outdoor area, or the like. First wall 202A, second wall 202B, and third wall 202C at least partially enclose space 200 in the example shown.

In the example shown in FIGS. 2A and 2B, wireless communication device 204A is operable to transmit wireless signals repeatedly (e.g., periodically, intermittently, at scheduled, unscheduled, or random intervals, etc.). Wireless communication devices 204B, 204C are operable to receive signals based on those transmitted by wireless communication device 204A. Wireless communication devices 204B, 204C each have a modem (e.g., modem 112 shown in FIG. 1) that is configured to process received signals to detect motion of an object in space 200.

As shown, an object is in first position 214A in FIG. 2A, and the object has moved to second position 214B in FIG. 2B. In FIGS. 2A and 2B, the moving object in space 200 is represented as a human, but the moving object can be another type of object. For example, the moving object can be an animal, an inorganic object (e.g., a system, device, apparatus, or assembly), an object that defines all or part of the boundary of space 200 (e.g., a wall, door, window, etc.), or another type of object.

As shown in FIGS. 2A and 2B, multiple example paths of the wireless signals transmitted from wireless communication device 204A are illustrated by dashed lines. Along first signal path 216, the wireless signal is transmitted from wireless communication device 204A and reflected off first wall 202A toward the wireless communication device 204B. Along second signal path 218, the wireless signal is transmitted from the wireless communication device 204A and reflected off second wall 202B and first wall 202A toward wireless communication device 204C. Along third signal path 220, the wireless signal is transmitted from the wireless communication device 204A and reflected off second wall 202B toward wireless communication device 204C. Along fourth signal path 222, the wireless signal is transmitted from the wireless communication device 204A and reflected off third wall 202C toward the wireless communication device 204B.

In FIG. 2A, along fifth signal path 224A, the wireless signal is transmitted from wireless communication device 204A and reflected off the object at first position 214A toward wireless communication device 204C. Between FIGS. 2A and 2B, a surface of the object moves from first position 214A to second position 214B in space 200 (e.g., some distance away from first position 214A). In FIG. 2B, along sixth signal path 224B, the wireless signal is transmitted from wireless communication device 204A and reflected off the object at second position 214B toward wireless communication device 204C. Sixth signal path 224B depicted in FIG. 2B is longer than fifth signal path 224A depicted in FIG. 2A due to the movement of the object from first position 214A to second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the first, second and third walls 202A, 202B, and 202C. In some examples, the wireless signals are radio frequency (RF) signals. The wireless signals may include other types of signals.

In the example shown in FIGS. 2A and 2B, wireless communication device 204A can repeatedly transmit a wireless signal. In particular, FIG. 2A shows the wireless signal being transmitted from wireless communication device 204A at a first time, and FIG. 2B shows the same wireless signal being transmitted from wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from wireless communication device 204A in an omnidirectional manner, in a directional manner or otherwise. In the example shown, the wireless signals traverse multiple respective paths in space 200, and the signal along each path may become attenuated due to path losses, scattering, reflection, or the like and may have a phase or frequency offset.

As shown in FIGS. 2A and 2B, the signals from first to sixth paths 216, 218, 220, 222, 224A, and 224B combine at wireless communication device 204C and wireless communication device 204B to form received signals. Because of the effects of the multiple paths in space 200 on the transmitted signal, space 200 may be represented as a transfer function (e.g., a filter) in which the transmitted signal is input and the received signal is output. When an object moves in space 200, the attenuation or phase offset affected upon a signal in a signal path can change, and hence, the transfer function of space 200 can change. Assuming the same wireless signal is transmitted from wireless communication device 204A, if the transfer function of space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \Sigma_{n=-\infty}^{\infty} c_n e^{j\omega_n t} \quad (1)$$

Where $\omega_n$ represents the frequency of nth frequency component of the transmitted signal, $c_n$ represents the complex coefficient of the nth frequency component, and t represents time. With the transmitted signal f(t) being transmitted from the first wireless communication device 204A, an output signal $r_k(t)$ from a path k may be described according to Equation (2):

$$r_k(t) = \Sigma_{n=-\infty}^{\infty} \alpha_{n,k} c_n e^{j(\omega_n t + \phi_{n,k})} \quad (2)$$

Where $\alpha_{n,k}$ represents an attenuation factor (or channel response; e.g., due to scattering, reflection, and path losses) for the nth frequency component along path k, and $\phi_{n,k}$ represents the phase of the signal for nth frequency component along path k. Then, the received signal R at a wireless communication device can be described as the summation of all output signals $r_k(t)$ from all paths to the wireless communication device, which is shown in Equation (3):

$$R = \Sigma_k r_k(t) \quad (3)$$

Substituting Equation (2) into Equation (3) renders the following Equation (4):

$$R = \Sigma_k \Sigma_{n=-\infty}^{\infty} (\alpha_{n,k} e^{j\phi_{n,k}}) c_n e^{j\omega_n t} \quad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \Sigma_k c_n \alpha_{n,k} e^{j\phi_{n,k}} \quad (5)$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as follows in Equation (6):

$$h_{ch} = \Sigma_k \Sigma_{n=-\infty}^{\infty} \alpha_{n,k} \quad (6)$$

In some instances, the channel response $h_{ch}$ for a space can be determined, for example, based on the mathematical theory of estimation. For instance, a reference signal $R_{ef}$ can be modified with candidate channel responses $(h_{ch})$, and then a maximum likelihood approach can be used to select the candidate channel which gives best match to the received signal $(R_{cvd})$. In some cases, an estimated received signal $(\hat{R}_{cvd})$ is obtained from the convolution of the reference signal $(R_{ef})$ with the candidate channel responses $(h_{ch})$, and then the channel coefficients of the channel response $(h_{ch})$ are varied to minimize the squared error of the estimated received signal $(\hat{R}_{cvd})$. This can be mathematically illustrated as follows in Equation (7):

$$R_{cvd} = R_{ef} \otimes h_{ch} = \Sigma_{k=-m}^{m} R_{ef}(n-k) h_{ch}(k) \quad (7)$$

with the optimization criterion $$\min_{h_{ch}} \Sigma (\hat{R}_{cvd} - R_{cvd})^2$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figure 3A:
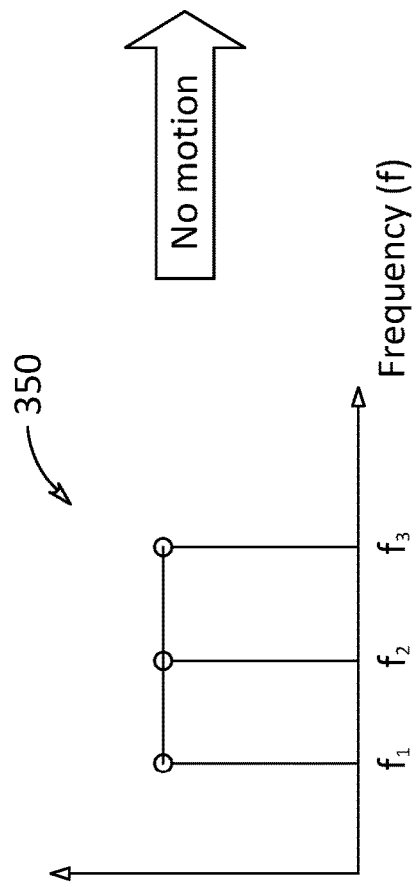
FIGS. 3A and 3B are plots showing examples of channel responses computed from the wireless signals communicated between wireless communication devices in FIGS. 2A and 2B.
Figure 3B:
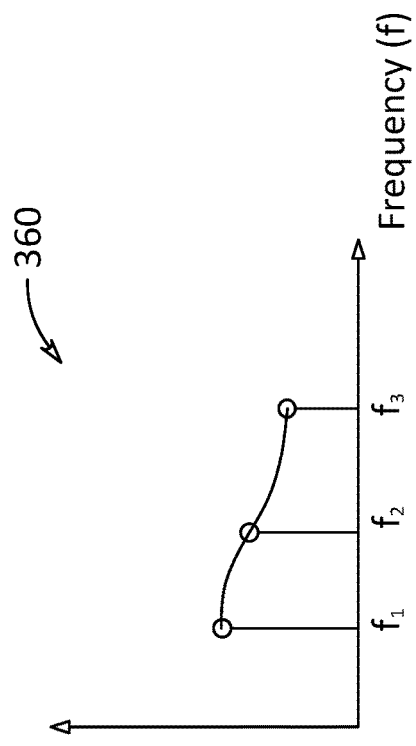
Figure 3B:
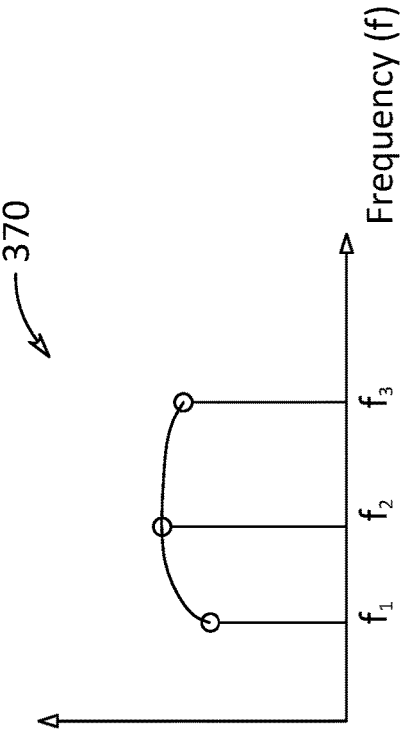

FIGS. 3A-3B are plots showing examples of channel responses 360, 370 computed from the wireless signals communicated between wireless communication devices 204A, 204B, 204C in FIGS. 2A-2B. FIGS. 3A-3B also show frequency domain representation 350 of an initial wireless signal transmitted by wireless communication device 204A. In the examples shown, channel response 360 in FIG. 3A represents the signals received by wireless communication device 204B when there is no motion in space 200, and channel response 370 in FIG. 3B represents the signals received by wireless communication device 204B in FIG. 2B after the object has moved in space 200.

In the example shown in FIGS. 3A-3B, for illustration purposes, wireless communication device 204A transmits a signal that has a flat frequency profile (the magnitude of each frequency component $f_1$, $f_2$, and $f_3$ is the same), as shown in frequency domain representation 350. Because of the interaction of the signal with space 200 (and the objects therein), the signals received at wireless communication device 204B that are based on the signal sent from wireless communication device 204A look different from the transmitted signal. In this example, where the transmitted signal has a flat frequency profile, the received signal represents the channel response of space 200. As shown in FIGS. 3A-3B, channel responses 360, 370 are different from frequency domain representation 350 of the transmitted signal. When motion occurs in space 200, a variation in the channel response will also occur. For example, as shown in FIG. 3B, channel response 370 that is associated with motion of object in space 200 varies from channel response 360 that is associated with no motion in space 200.

Furthermore, as an object moves within space 200, the channel response may vary from channel response 370. In some cases, space 200 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
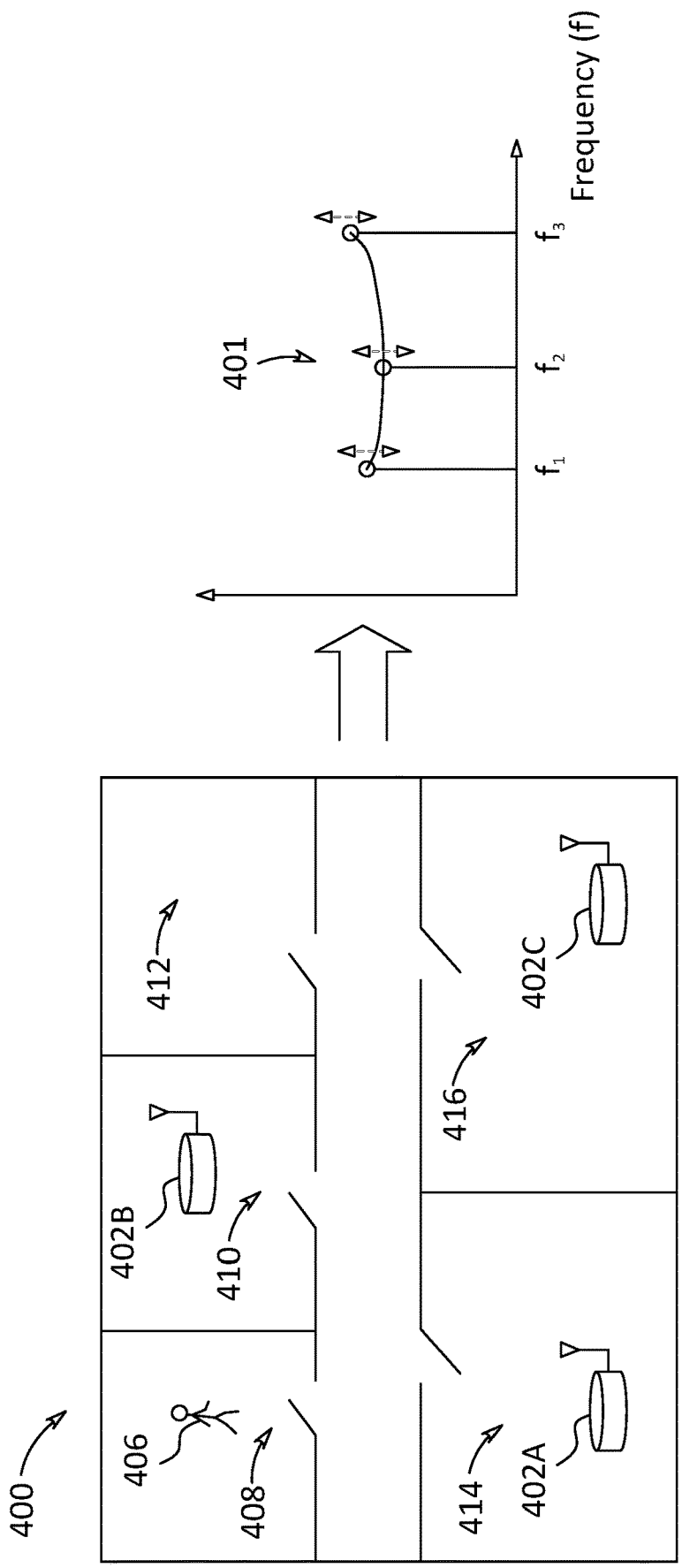
FIGS. 4A and 4B are diagrams showing example channel responses associated with motion of an object in distinct regions of a space.
Figure 4B:
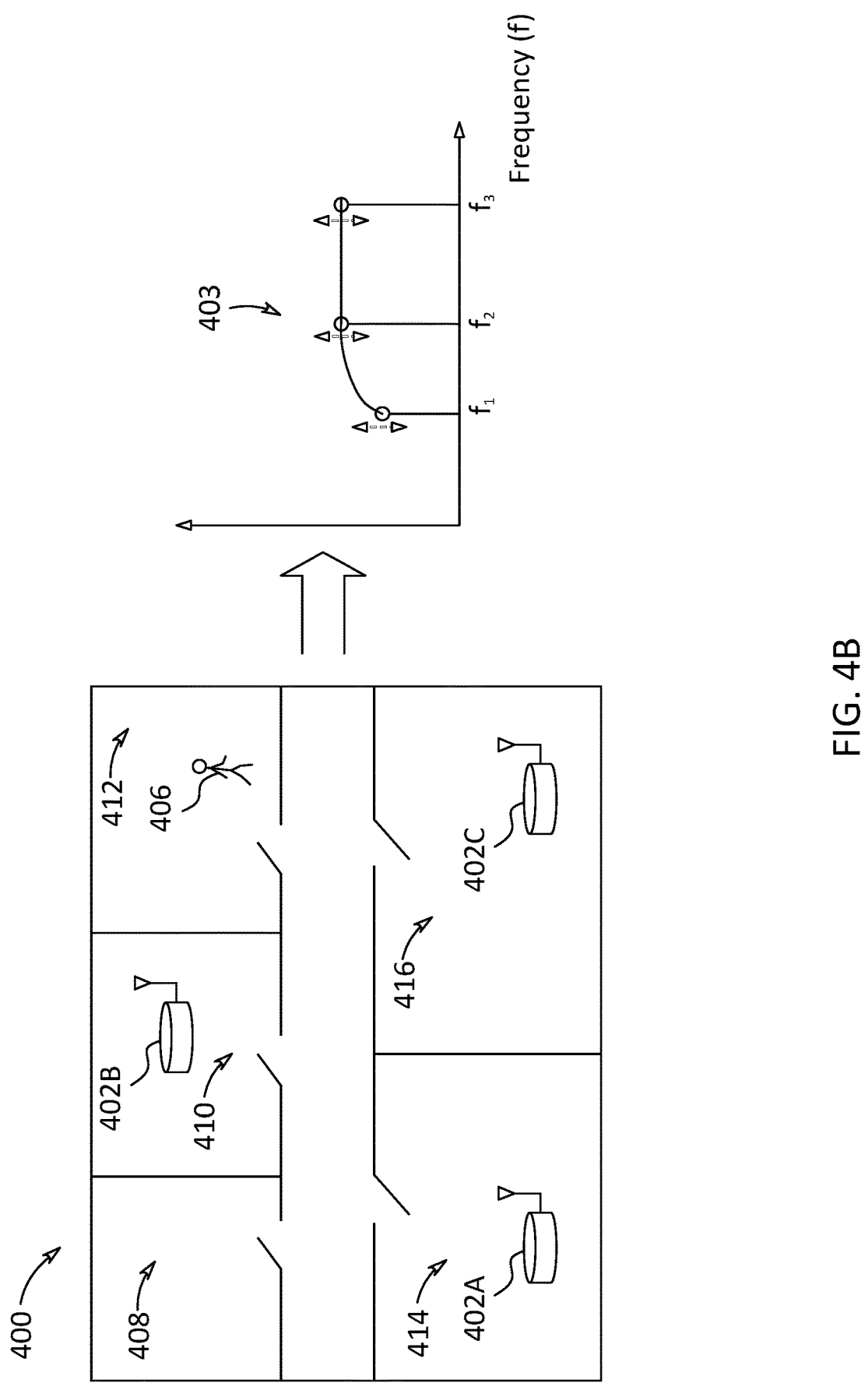

FIGS. 4A-4B are diagrams showing example channel responses 401, 403 associated with motion of object 406 in distinct regions, first region 408, and third region 412 of space 400. In the examples shown, space 400 is a building, and space 400 is divided into a plurality of distinct regions— first region 408, second region 410, third region 412, fourth region 414, and fifth region 416. Space 400 may include additional or fewer regions, in some instances. As shown in FIGS. 4A-4B, the regions within space 400 may be defined by walls between rooms. In addition, the regions may be defined by ceilings between floors of a building. For example, space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in first region 408 is represented as person 106, but the moving object can be another type of object, such as an animal or an inorganic object.

In the example shown, wireless communication device 402A is located in fourth region 414 of space 400, wireless communication device 402B is located in second region 410 of space 400, and wireless communication device 402C is located in fifth region 416 of space 400. Wireless communication devices 402 can operate in the same or similar manner as wireless communication devices 102 of FIG. 1. For instance, wireless communication devices 402 may be configured to transmit and receive wireless signals and detect whether motion has occurred in space 400 based on the received signals. As an example, wireless communication devices 402 may periodically or repeatedly transmit motion probe signals through space 400, and receive signals based on the motion probe signals. Wireless communication devices 402 can analyze the received signals to detect whether an object has moved in space 400, such as, for example, by analyzing channel responses associated with space 400 based on the received signals. In addition, in some implementations, wireless communication devices 402 can analyze the received signals to identify a location of detected motion within space 400. For example, wireless communication devices 402 can analyze characteristics of the channel response to determine whether the channel responses share the same or similar characteristics to channel responses known to be associated with first region 408 to fifth region 416 of space 400.

In the examples shown, one (or more) of wireless communication devices 402 repeatedly transmits a motion probe signal (e.g., a reference signal) through space 400. The motion probe signals may have a flat frequency profile in some instances, wherein the magnitude of each frequency component $f_1$, $f_2$, and $f_3$. For example, the motion probe signals may have a frequency response similar to frequency domain representation 350 shown in FIGS. 3A-3B. The motion probe signals may have a different frequency profile in some instances. Because of the interaction of the reference signal with space 400 (and the objects therein), the signals received at another wireless communication device 402 that are based on the motion probe signal transmitted from the other wireless communication device 402 are different from the transmitted reference signal.

Based on the received signals, wireless communication devices 402 can determine a channel response for space 400. When motion occurs in distinct regions within the space, distinct characteristics may be seen in the channel responses. For example, while the channel responses may differ slightly for motion within the same region of space 400, the channel responses associated with motion in distinct regions may generally share the same shape or other characteristics. For instance, channel response 401 of FIG. 4A represents an example channel response associated with motion of object 406 in first region 408 of space 400, while channel response 403 of FIG. 4B represents an example channel response associated with motion of object 406 in third region 412 of space 400. Channel responses 401, 403 are associated with signals received by the same wireless communication device 402 in space 400.

FIGS. 4C-4D are plots showing channel responses 401, 403 of FIGS. 4A-4B overlaid on channel response 460 associated with no motion occurring in space 400. In the example shown, wireless communication device 402 transmits a motion probe signal that has a flat frequency profile as shown in frequency domain representation 450. When motion occurs in space 400, a variation in the channel response will occur relative to channel response 460 associated with no motion, and thus, motion of an object in space 400 can be detected by analyzing variations in the channel responses. In addition, a relative location of the detected motion within space 400 can be identified. For example, the shape of channel responses associated with motion can be compared with reference information (e.g., using a trained AI model) to categorize the motion as having occurred within a distinct region of space 400.

When there is no motion in space 400 (e.g., when object 406 is not present), wireless communication device 402 may compute channel response 460 associated with no motion. Slight variations may occur in the channel response due to a number of factors; however, multiple channel responses 460 associated with different periods of time may share one or more characteristics. In the example shown, channel response 460 associated with no motion has a decreasing frequency profile (the magnitude of each frequency component $f_1$, $f_2$, and $f_3$ is less than the previous). The profile of channel response 460 may differ in some instances (e.g., based on different room layouts or placement of wireless communication devices 402).

When motion occurs in space 400, a variation in the channel response will occur. For instance, in the examples shown in FIGS. 4C-4D, channel response 401 associated with motion of object 406 in first region 408 differs from channel response 460 associated with no motion and channel response 403 associated with motion of object 406 in third region 412 differs from channel response 460 associated with no motion. Channel response 401 has a concave-parabolic frequency profile (the magnitude of the middle frequency component $f_2$ is less than the outer frequency components $f_1$ and $f_3$), while channel response 403 has a convex-asymptotic frequency profile (the magnitude of the middle frequency component $f_2$ is greater than the outer frequency components $f_1$ and $f_3$). The profiles of channel responses 401, 403 may differ in some instances (e.g., based on different room layouts or placement of the wireless communication devices 402).

Analyzing channel responses may be considered similar to analyzing a digital filter. In other words, a channel response has been formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles amplify the frequency components of a channel response and appear as peaks or high points in the response, while zeros attenuate the frequency components of a channel response and appear as troughs, low points, or nulls in the response). A changing digital filter can be characterized by the locations of its peaks and troughs, and a channel response may be characterized similarly by its peaks and troughs. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique profiles (in examples profiles may also be referred to as signatures) may be identified for distinct regions within a space.

In some implementations, an artificial intelligence (AI) model may be used to process data. AI models may be of a variety of types, for example, linear regression models, logistic regression models, linear discriminant analysis models, decision tree models, naïve bayes models, K-nearest neighbor models, learning vector quantization models, support vector machines, bagging and random forest models, and deep neural networks. In general, all AI models aim to learn a function that provides the most precise correlation between input values and output values and are trained using historic sets of inputs and outputs that are known to be correlated. In examples, artificial intelligence may also be referred to as machine learning.

In some implementations, the profiles of the channel responses associated with motion in distinct regions of space 400 can be learned. For example, machine learning may be used to categorize channel response characteristics with motion of an object within distinct regions of a space. In some cases, a user associated with wireless communication devices 402 (e.g., an owner or other occupier of space 400) can assist with the learning process. For instance, referring to the examples shown in FIGS. 4A-4B, the user can move in each of first to fifth regions 408, 410, 412, 414, 416 during a learning phase and may indicate (e.g., through a user interface on a mobile computing device) that he/she is moving in one of the particular regions in space 400. For example, while the user is moving through first region 408 (e.g., as shown in FIG. 4A) the user may indicate on a mobile computing device that he/she is in first region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of space 400. The term "tagged" as used herein may refer to marking and identifying channel responses with the user's indicated location or any other information.

The tagged channel responses can then be processed (e.g., by machine learning software) to identify unique characteristics of the channel responses associated with motion in the distinct regions. Once identified, the identified unique characteristics may be used to determine a location of detected motion for newly computed channel responses. For example, an AI model may be trained using the tagged channel responses, and once trained, newly computed channel responses can be input to the AI model, and the AI model can output a location of the detected motion. For example, in some cases, mean, range, and absolute values are input to an AI model. In some instances, magnitude and phase of the complex channel response itself may be input as well. These values allow the AI model to design arbitrary front-end filters to pick up the features that are most relevant to making accurate predictions with respect to motion in distinct regions of a space. In some implementations, the AI model is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.).

The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, may be trying to aggregate values in a certain region to cluster them, which can be done by creating a logistic classifier based decision surfaces. The decision surfaces divide different clusters and subsequent layers can form categories based on a single cluster or a combination of clusters.

In some implementations, an AI model includes two or more layers of inference. The first layer acts as a logistic classifier that can divide different concentrations of values into separate clusters, while the second layer combines some of these clusters together to create a category for a distinct region. Additionally, subsequent layers can help in extending the distinct regions over more than two categories of clusters. For example, a fully-connected AI model may include an input layer corresponding to the number of features tracked, a middle layer corresponding to the number of effective clusters (through iterating between choices), and a final layer corresponding to different regions. Where complete channel response information is input to the AI model, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

B. Systems and Methods for Dynamic Time Domain Channel Representations

The present disclosure generally relates to systems and methods for Wi-Fi sensing. In particular, the present disclosure relates to configuring Wi-Fi systems and methods for generating dynamic time domain channel representations for Wi-Fi sensing.

The systems and methods of the present disclosure leverage a physics of the relationship (the Fourier relationship) between the time domain and the frequency domain. In a propagation channel impulse response between two devices (such as a sensing receiver and a sensing transmitter), reflections in the physical environment may be represented in the time domain by changes in only a few time domain pulses, in particular when the reflections are caused by an object that is not extremely close to one device or another. However, in the frequency domain, the impact of these reflections is reflected across all Channel State Information (CSI) values of the propagation channel bandwidth.

Figure 5:
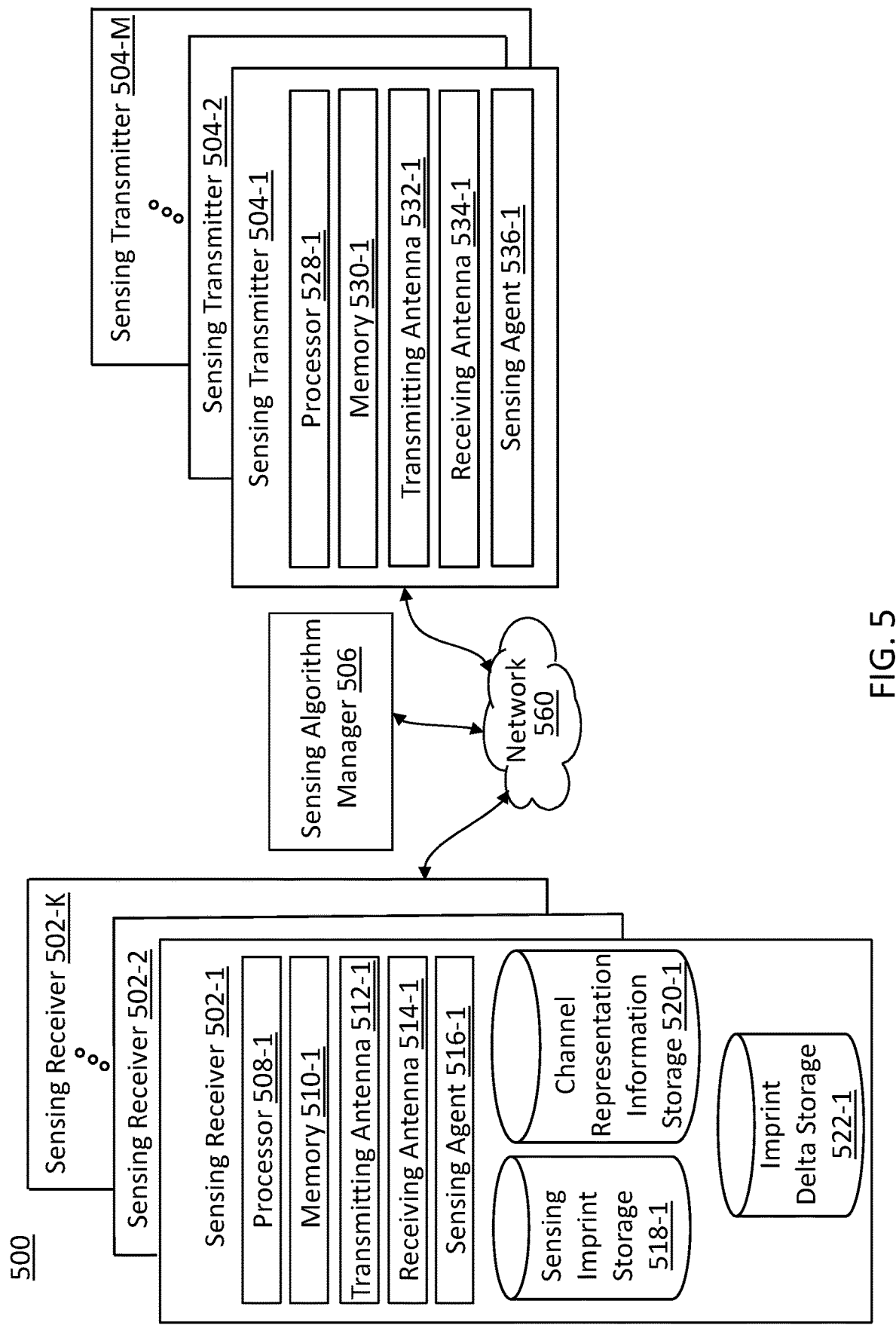
FIG. 5 depicts an implementation of some of an architecture of a system for Wi-Fi sensing, according to some embodiments.

FIG. 5 depicts an implementation of some of an architecture of an implementation of system 500 for Wi-Fi sensing, according to some embodiments.

System 500 (alternatively referred to as Wi-Fi sensing system 500) may include plurality of sensing receivers 502-(1-K), plurality of sensing transmitters 504-(1-M), sensing algorithm manager 506, and network 560 enabling communication between the system components for information exchange. System 500 may be an example or instance of wireless communication system 100, and network 560 may be an example or instance of wireless network or cellular network, details of which are provided with reference to FIG. 1 and its accompanying description.

The description hereinafter is explained with reference to sensing receiver 502-1 and sensing transmitter 504-1 for the purpose of simplicity and should not be construed as a limitation.

According to some embodiments, sensing receiver 502-1 may be configured to receive a sensing transmission and perform one or more sensing measurements useful for Wi-Fi sensing. These measurements may be known as sensing measurements. The sensing measurements may be processed to achieve a sensing goal of system 500. In an embodiment, sensing receiver 502-1 may be an Access Point (AP). In some embodiments, sensing receiver 502-1 may be a Station (STA), for example, in a mesh network scenario. According to an implementation, sensing receiver 502-1 may be implemented by a device, such as wireless communication device 102 shown in FIG. 1. In some implementations, sensing receiver 502-1 may be implemented by a device, such as wireless communication device 204 shown in FIGS. 2A and 2B. Sensing receiver 502-1 may be implemented by a device, such as wireless communication device 402 shown in FIGS. 4A and 4B. In an implementation, sensing receiver 502-1 may coordinate and control communication among plurality of sensing transmitters 504-(1-M). According to an implementation, sensing receiver 502-1 may be enabled to control a measurement campaign to ensure that required sensing transmissions are made at a required time and to ensure an accurate determination of sensing measurement. In some embodiments, sensing receiver 502-1 may process sensing measurements to achieve the sensing goal of system 500. In some embodiments, sensing receiver 502-1 may be configured to transmit the sensing measurements to sensing algorithm manager 506, and sensing algorithm manager 506 may be configured to process the sensing measurements to achieve the sensing goal of system 500.

According to an implementation, sensing receiver 502-1 may initiate a WLAN sensing session and plurality of sensing transmitters 504-(1-M) may participate in the WLAN session initiated by sensing receiver 502-1. In some implementations, plurality of sensing transmitters 504-(1-M) may transmit PPDUs which are used for sensing measurements in the WLAN sensing session. In an implementation, sensing receiver 502-1 may receive the PPDUs in the WLAN sensing session and process the PPDUs into the sensing measurements.

Referring again to FIG. 5, in some embodiments, sensing transmitter 504-1 may be configured to send a sensing transmission to sensing receiver 502-1 based on which, one or more sensing measurements may be performed for Wi-Fi sensing. In an embodiment, sensing transmitter 504-1 may be an STA. In some embodiments, sensing transmitter 504-1 may be an AP for Wi-Fi sensing, for example, in scenarios where sensing receiver 502-1 acts as STA. According to an implementation, sensing transmitter 504-1 may be implemented by a device, such as wireless communication device 102 shown in FIG. 1. In some implementations, sensing transmitter 504-1 may be implemented by a device, such as wireless communication device 204 shown in FIGS. 2A and 2B. Further, sensing transmitter 504-1 may be implemented by a device, such as wireless communication device 402 shown in FIGS. 4A and 4B. In some implementations, communication between sensing receiver 502-1 and sensing transmitter 504-1 may happen via Station Management Entity (SME) and MAC Layer Management Entity (MLME) protocols.

According to some embodiments, sensing algorithm manager 506 may be configured to receive sensing measurements from sensing receiver 502-1 and process the sensing measurements to achieve a sensing goal of system 500. In an example, sensing algorithm manager 506 may process and analyze the sensing measurement to achieve the sensing goal of detecting a motion and/or a movement. According to some implementations, sensing algorithm manager 506 may include/execute a sensing algorithm. The sensing algorithm may be a computational algorithm that achieves a sensing goal. In an example, the sensing algorithm may utilize Channel Representation Information (CRI) to achieve the sensing goal of detecting movement and/or motion. In an embodiment, sensing algorithm manager 506 may be implemented in an STA. In some embodiments, sensing algorithm manager 506 may be implemented in an AP. According to an implementation, sensing algorithm manager 506 may be implemented by a device, such as wireless communication device 102 shown in FIG. 1. In some implementations, sensing algorithm manager 506 may be implemented by a device, such as wireless communication device 204 shown in FIGS. 2A and 2B. Further, sensing algorithm manager 506 may be implemented by a device, such as wireless communication device 402 shown in FIGS. 4A and 4B. In some embodiments, sensing algorithm manager 506 may be any computing device, such as a desktop computer, a laptop, a tablet computer, a mobile device, a Personal Digital Assistant (PDA) or any other computing device. In embodiments, sensing algorithm manager 506 may take a role of sensing initiator where a sensing algorithm determines a measurement campaign and the sensing measurements required to fulfill the measurement campaign. Sensing algorithm manager 506 may communicate the sensing measurements required to fulfill the measurement campaign to sensing receiver 502-1 to coordinate and control communication among plurality of sensing transmitters 504-(1-M). Although, it has been described that sensing algorithm manager 506 is a separate device, in some implementations, sensing algorithm manager 506 may be implemented within sensing transmitter 504-1.

Referring to FIG. 5, in more detail, sensing receiver 502-1 may include processor 508-1 and memory 510-1. For example, processor 508-1 and memory 510-1 of sensing receiver 502-1 may be processor 114 and memory 116, respectively, as shown in FIG. 1. In an embodiment, sensing receiver 502-1 may further include transmitting antenna(s) 512-1, receiving antenna(s) 514-1, and sensing agent 516-1. In some embodiments, an antenna may be used to both transmit and receive signals in a half-duplex format. When the antenna is transmitting, it may be referred to as transmitting antenna 512-1, and when the antenna is receiving, it may be referred to as receiving antenna 514-1. It is understood by a person of normal skill in the art that the same antenna may be transmitting antenna 512-1 in some instances and receiving antenna 514-1 in other instances. In the case of an antenna array, one or more antenna elements may be used to transmit or receive a signal, for example, in a beamforming environment. In some examples, a group of antenna elements used to transmit a composite signal may be referred to as transmitting antenna 512-1, and a group of antenna elements used to receive a composite signal may be referred to as receiving antenna 514-1. In some examples, each antenna is equipped with its own transmission and receive paths, which may be alternately switched to connect to the antenna depending on whether the antenna is operating as transmitting antenna 512-1 or receiving antenna 514-1.

In an implementation, sensing agent 516-1 may be responsible for receiving sensing transmissions and associated transmission parameters and calculating sensing measurements for the purpose of Wi-Fi sensing. In some implementations, receiving sensing transmissions and associated transmission parameters, and calculating sensing measurements may be carried out by an algorithm running in the Medium Access Control (MAC) layer of sensing receiver 502-1. In an implementation, sensing agent 516-1 may be configured to cause at least one transmitting antenna of transmitting antenna(s) 512-1 to transmit messages to sensing transmitter 504-1. In an example, sensing agent 516-1 may be configured to receive, via at least one receiving antenna of receiving antennas(s) 514-1, messages from sensing transmitter 504-1. In an example, sensing agent 516-1 may be configured to make sensing measurements based on sensing transmissions received from sensing transmitter 504-1.

In some embodiments, sensing receiver 502-1 may include sensing imprint storage 518-1, channel representation information storage 520-1, and imprint delta storage 522-1. Sensing imprint storage 518-1 may store information related to one or more sensing imprints. Channel representation information storage 520-1 may store information related to sensing measurements that represent state of the channel between sensing receiver 502-1 and each of the plurality of sensing transmitters 504-(1-M). In an example, channel representation information storage 520 may store one or more of Channel State Information (CSI), full TD-CRI, and filtered TD-CRI. Imprint delta storage 522-1 may store information related to differences between full TD-CRIs and sensing imprints as imprint delta. Information related to the one or more sensing imprints stored in sensing imprint storage 518-1, information related to the sensing measurements stored in channel representation information storage 520-1, and information related to imprint delta stored in imprint delta storage 522-1 may be periodically or dynamically updated as required. In an implementation, sensing imprint storage 518-1, channel representation information storage 520-1, and imprint delta storage 522-1 may include any type or form of storage, such as a database or a file system or coupled to memory 510-1.

Referring again to FIG. 5, sensing transmitter 504-1 may include processor 528-1 and memory 530-1. For example, processor 528-1 and memory 530-1 of sensing transmitter 504-1 may be processor 114 and memory 116, respectively, as shown in FIG. 1. In an embodiment, sensing transmitter 504-1 may further include transmitting antenna(s) 532-1, receiving antenna(s) 534-1, and sensing agent 536-1. In an implementation, sensing agent 536-1 may be a block that passes physical and MAC layer parameters from the MAC of sensing transmitter 504-1 to application layer programs. Sensing agent 536-1 may be configured to cause at least one transmitting antenna of transmitting antenna(s) 532-1 and at least one receiving antenna of receiving antennas(s) 534-1 to exchange messages with sensing receiver 502-1. In some embodiments, an antenna may be used to both transmit and receive in a half-duplex format. When the antenna is transmitting, it may be referred to as transmitting antenna 532-1, and when the antenna is receiving, it may be referred to as receiving antenna 534-1. It is understood by a person of normal skill in the art that the same antenna may be transmitting antenna 532-1 in some instances and receiving antenna 534-1 in other instances. In the case of an antenna array, one or more antenna elements may be used to transmit or receive a signal, for example, in a beamforming environment. In some examples, a group of antenna elements used to transmit a composite signal may be referred to as transmitting antenna 532-1, and a group of antenna elements used to receive a composite signal may be referred to as receiving antenna 534-1. In some examples, each antenna is equipped with its own transmission and receive paths, which may be alternately switched to connect to the antenna depending on whether the antenna is operating as transmitting antenna 532-1 or receiving antenna 534-1.

According to one or more implementations, communications in network 560 may be governed by one or more of the 802.11 family of standards developed by IEEE. Some example IEEE standards may include IEEE 802.11ax, IEEE 802.11md, and IEEE 802.11-REVmd/D5.0. The IEEE 802.11ax and the IEEE 802.11md are a part of IEEE 802.11-2016 WLAN standard. The IEEE 802.11md is a new release of the standard that includes previous amendments. Further, the IEEE 802.11ax is an addition to the IEEE 802.11-2016 standard. In some implementations, communications may be governed by other standards (other or additional IEEE standards or other types of standards). In some embodiments, parts of network 560 which are not required by system 500 to be governed by one or more of the 802.11 family of standards may be implemented by an instance of any type of network, including wireless network or cellular network.

Referring again to FIG. 5, in an implementation, sensing receiver 502-1 may initiate a measurement campaign. According to an example implementation, sensing receiver 502-1 may initiate the measurement campaign via one or more sensing initiation messages. In an implementation, sensing agent 516-1 may be configured to generate a sensing initiation message. In an example, the sensing initiation message may include a requested transmission configuration. Other examples of information/data included in the sensing initiation message that are not discussed here are contemplated herein. In an implementation, sensing agent 516-1 may transmit the sensing initiation message to sensing transmitter 504-1 via transmitting antenna 512-1.

According to an implementation, sensing transmitter 504-1 may receive the sensing initiation message from sensing receiver 502-1 via receiving antenna 534-1. In an implementation, sensing agent 536-1 may apply the requested transmission configuration included in the sensing initiation message. Subsequently, sensing agent 536-1 may transmit a sensing transmission to sensing receiver 502-1 in response to the sensing initiation message and in accordance with the requested transmission configuration. In an implementation, sensing agent 536-1 may be configured to transmit the sensing transmission to sensing receiver 502-1 via transmitting antenna 532-1.

In an implementation, sensing receiver 502-1 may receive the sensing transmission from sensing transmitter 504-1 transmitted in response to the sensing initiation message. Sensing receiver 502-1 may be configured to receive the sensing transmission from sensing transmitter 504-1 via receiving antenna 514-1. According to an implementation, sensing agent 516-1 may be configured to process the sensing transmission to determine one or more sensing imprints. In an example, the one or more sensing imprints may be steady-state or baseline representations of time domain impulse response of the propagation channel between sensing transmitter 504-1 and sensing receiver 502-1. In an aspect, sensing receiver 502-1 and sensing transmitter 504-1 may be in a steady-state and objects between sensing receiver 502-1 and sensing transmitter 504-1 may be in a semi-static state. For example, objects such as furniture or fixtures in a room may be moved rarely and thus are in a semi-static state. Accordingly, the propagation channel between sensing transmitter 504-1 and sensing receiver 502-1 may be in a semi-static state or a steady-state (i.e., the propagation channel may be absent of any motion or movement). The manner in which a sensing imprint is determined is described hereinafter.

Figure 6:
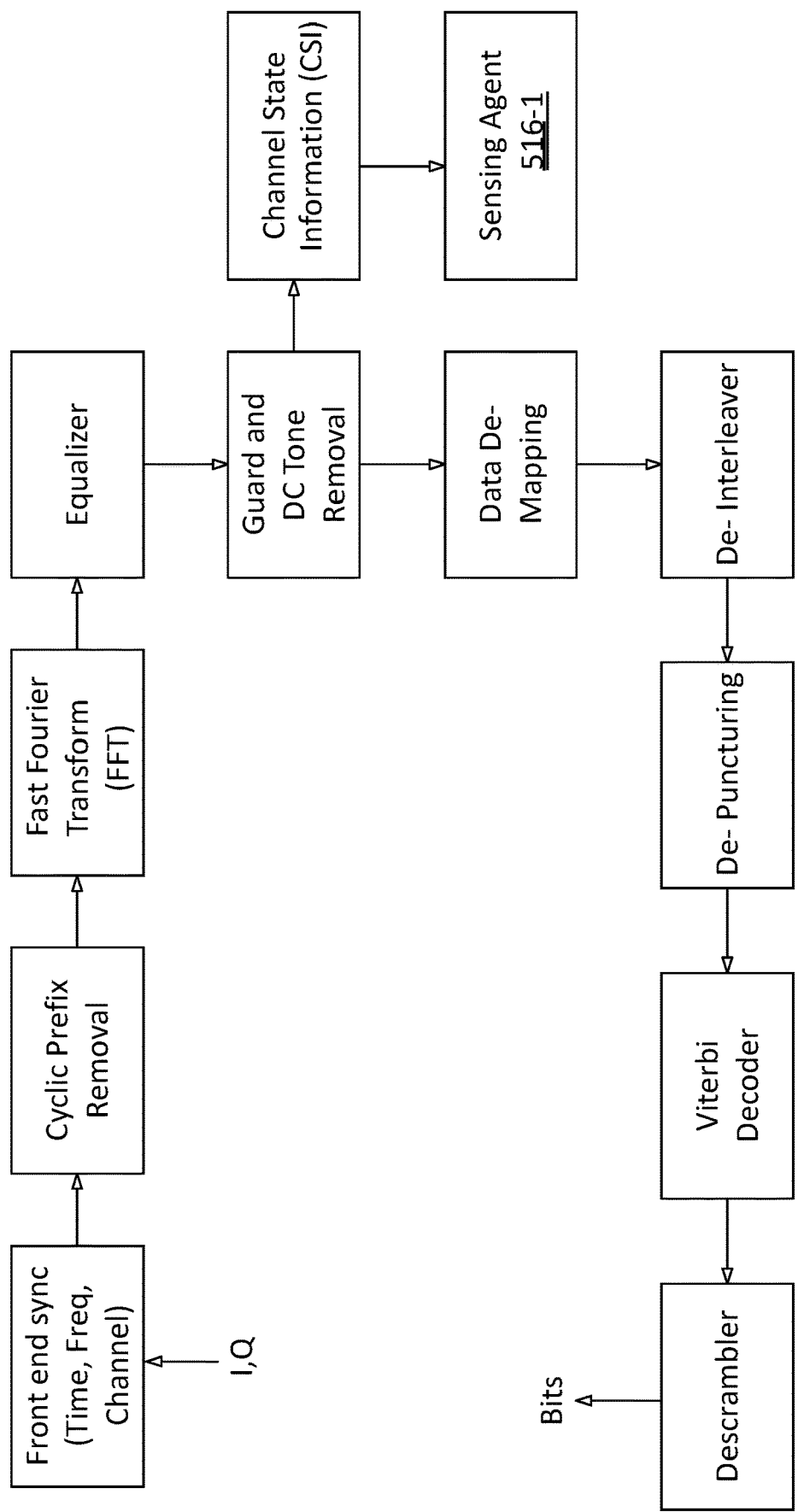
FIG. 6 illustrates a representation of a receiver chain of a sensing receiver, according to some embodiments.

According to an implementation, a baseband receiver of sensing receiver 502-1 may be configured to calculate CSI based on the sensing transmission. In some implementations, sensing receiver 502-1 may calculate a contribution to the CSI by a receiver chain. In an example, the receiver chain of sensing receiver 502-1 may include analog elements and digital elements. For example, the receiver chain may include the analog and digital components through which a received signal may travel from a reference point to a point at which the received signal may be read, i.e., by sensing agent 516-1 of sensing receiver 502-1. A representation 600 of the receiver chain of sensing receiver 502-1 is illustrated in FIG. 6. As described in FIG. 6, In-phase (I) and Quadra phase (Q) modulated symbols arrive at a frond end of the receiver where synchronization is performed including frequency and timing recovery. Further, time domain guard period (cyclic prefix) is removed, and the receiver performs a Fast Fourier Transform (FFT) on the received signal (for example, the I and Q modulated symbols). Guard tones and DC tones are then removed. CSI is then generated prior to data de-mapping, de-interleaving (using a de-interleaver), de-puncturing, decoding (using a Viterbi decoder) and finally descrambling (using a descrambler). As a result of descrambling, data bits are generated. The generated CSI is provided to sensing agent 516-1.

According to an implementation, upon receiving the CSI, sensing agent 516-1 may determine a sensing imprint of the propagation channel in the format of full Time Domain Channel Representation Information (TD-CRI). The sensing agent 516-1 may perform an Inverse Fast Fourier Transform (IFFT) on the CSI to determine the sensing imprint. This results in a time domain representation of the CSI. The sensing imprint may include complex values for each time domain tone. In an example, the sensing imprint may include as many full TD-CRI values as CSI values. The number of CSI values may scale with the propagation channel bandwidth. In an implementation, the number of CSI values and therefore the number of full TD-CRI values in the sensing imprint may be represented by equation (1) provided below:

$$\text{Size}_{sensing\ input} = \left[\left(\frac{\text{Channel } BW}{20 \text{ MHz}}\right) \times 52 \text{ complex values}\right] \quad (1)$$

In an implementation, sensing agent 516-1 may store the sensing imprint in sensing imprint storage 518-1. In an example, sensing agent 516-1 may store the sensing imprint as a baseline at a point of time of the propagation channel. In some implementations, sensing transmitter 504-1 may send one or more sensing transmissions to sensing receiver 502-1 with different delivered transmission configurations. In such implementations, sensing receiver 502-1 may determine and store a sensing imprint of the propagation channel associated with each delivered transmission configuration.

According to an implementation, a sensing imprint may be measured by sensing receiver 502-1 based on one or more sensing transmissions. In an example, the measurement may be made in either or both directions of the propagation channel, i.e., one or more sensing transmissions can be sent in one direction and the sensing imprint may be measured and stored for that direction of transmission. In some examples, another one or more sensing transmissions can be sent in the opposite direction and the sensing imprint may be measured and stored for that direction of transmission. In an implementation, the sensing imprint may be measured and stored in the time domain. In an example, the sensing imprint may be measured multiple times with multiple sensing transmissions and these measurements may be averaged to generate the sensing imprint.

According to an implementation, sensing imprints stored in sensing imprint storage 518-1 may be periodically or dynamically updated as required. In an example, a sensing imprint may need to be recalculated or updated if there is a change in the semi-static nature of one or more propagation channels between sensing receiver 502-1 and sensing transmitter 504-1. For example, if one or both of sensing receiver 502-1 and sensing transmitter 504-1 are moved, or if a semi-static object (for example, a piece of furniture) between sensing receiver 502-1 and sensing transmitter 504-1 is moved, there may be a change in the semi-static nature of the propagation channel. In some examples, the sensing imprint may also need to be updated in instances where sensing receiver 502-1 detects an object has moved into the sensing space affecting the propagation channel and has remained present and stationary for a period of time. In an implementation, the baseband receiver may send a notification to sensing receiver 502-1 that the sensing imprint that relates to the one or more propagation channels needs to be updated.

In some implementations, an automatic gain control (AGC) within the baseband receiver (for example, block "Front end sync" in FIG. 6) may precondition the I and Q samples prior to digitization. The AGC is a dynamic process, and its gain may change over time depending on conditions in the propagation channel. In some examples, a measure of a change of AGC gain or a signal from the AGC indicating that its gain has changed significantly may notify sensing receiver 502-1 that the sensing imprint that relates to the one or more propagation channels needs to be updated.

Although, it has been described that sensing receiver 502-1 determines and stores sensing imprints representing the semi-static or steady-state propagation channel between sensing receiver 502-1 and sensing transmitter 504-1, in some implementations, sensing receiver 502-1 may determine and store sensing imprints representing semi-static or steady-state propagation channels between sensing receiver 502-1 and sensing transmitters 504-(2-M). Sensing receiver 502-1 may also store an identifier (ID) associated with each sensing transmitter to uniquely identify each sensing transmitter and corresponding sensing imprints. An example of an ID of a sensing transmitter may include MAC ID, association ID, or any distinct identifier. Furthermore, sensing receiver 502-1 may store multiple sensing imprints for each sensing transmitter 504-(1-M) and, in an example, may distinguish each sensing imprint by a delivered transmission configuration or by another distinct identifier. An exemplary data structure for sensing imprints stored at sensing receiver 502-1 is shown in Table 1, provided below.

TABLE 1

Example data structure for sensing imprints stored at sensing receiver 502-1

| | Delivered Transmission Configuration | Imprint Creation Time | Sensing Imprint |
|---|---|---|---|
| Sensing transmitter 504-1 | Delivered Transmission Configuration (1, 1) | Imprint Creation Time (1, 1) | Sensing Imprint (1, 1) |
| | Delivered Transmission Configuration (1, 2) | Imprint Creation Time (1, 2) | Sensing Imprint (1, 2) |
| | Delivered Transmission Configuration (1, 3) | Imprint Creation Time (1, 3) | Sensing Imprint (1, 3) |
| | ... | ... | ... |
| | Delivered Transmission Configuration (1, N) | Imprint Creation Time (1, N) | Sensing Imprint (1, N) |
| Sensing transmitter 504-2 | Delivered Transmission Configuration (2, 1) | Imprint Creation Time (2, 1) | Sensing Imprint (2, 1) |
| | Delivered Transmission Configuration (2, 2) | Imprint Creation Time (2, 2) | Sensing Imprint (2, 2) |
| | Delivered Transmission Configuration (2, 3) | Imprint Creation Time (2, 3) | Sensing Imprint (2, 3) |
| | ... | ... | ... |
| | Delivered Transmission Configuration (2, N) | Imprint Creation Time (2, N) | Sensing Imprint (2, N) |
| ... | | | |
| Sensing transmitter 504-M | Delivered Transmission Configuration (M, 1) | Imprint Creation Time (M, 1) | Sensing Imprint (M, 1) |
| | Delivered Transmission Configuration (M, 2) | Imprint Creation Time (M, 2) | Sensing Imprint (M, 2) |
| | Delivered Transmission Configuration (M, 3) | Imprint Creation Time (M, 3) | Sensing Imprint (M, 3) |
| | ... | ... | ... |
| | Delivered Transmission Configuration (M, N) | Imprint Creation Time (M, N) | Sensing Imprint (M, N) |

In an example, an imprint creation time for a sensing imprint may refer to a time at which the sensing imprint is recorded/determined and stored in sensing receiver 502-1. For example, the imprint creation time may be a value of a system clock or a counter which may be used to determine a validity expiration of the sensing imprint.

According to some implementations, sensing receiver 502-1 may send a copy of stored sensing imprints representing semi-static or steady-state propagation channels between sensing receiver 502-1 and plurality of sensing transmitters 504-(1-M) to sensing algorithm manager 506. In an implementation, each of plurality of sensing receivers 502-(2-K) may also be configured to determine sensing imprints and send a copy of the sensing imprints to sensing algorithm manager 506. Accordingly, sensing algorithm manager 506 may store the copy of sensing imprints for a number of sensing receiver and sensing transmitter pairs, and optionally for multiple delivered transmission configurations per sensing receiver-sensing transmitter pair. In an example, sensing algorithm manager 506 may the locally store the copy of sensing imprints in a data storage. An exemplary data structure for sensing imprints stored by sensing algorithm manager 506 is shown in Table 2, provided below.

TABLE 2

Example data structure for sensing imprints stored at sensing receiver 502-1

| Sensing transmitter | Sensing receiver | Delivered Transmission Configuration | Imprint Creation Time | Sensing Imprint |
|---|---|---|---|---|
| 504-1 | 502-1 | (1, 1, 1) | (1, 1, 1) | (1, 1, 1) |

TABLE 2-continued

Example data structure for sensing imprints stored at sensing receiver 502-1

| | | | | |
|---|---|---|---|---|
| | | Delivered Transmission Configuration (1, 1, 2) | Imprint Creation Time (1, 1, 2) | Sensing Imprint (1, 1, 2) |
| | | Delivered Transmission Configuration (1, 1, 3) | Imprint Creation Time (1, 1, 3) | Sensing Imprint (1, 1, 3) |
| | | . . . | | |
| | | Delivered Transmission Configuration (1, 1, N) | Imprint Creation Time (1, 1, N) | Sensing Imprint (1, 1, 3) |
| | Sensing receiver 502-2 | Delivered Transmission Configuration (1, 2, 1) | Imprint Creation Time (1, 2, 1) | Sensing Imprint (1, 2, 1) |
| | | Delivered Transmission Configuration (1, 2, 2) | Imprint Creation Time (1, 2, 2) | Sensing Imprint (1, 2, 2) |
| | | Delivered Transmission Configuration (1, 2, 3) | Imprint Creation Time (1, 2, 3) | Sensing Imprint (1, 2, 3) |
| | | . . . | | |
| | | Delivered Transmission Configuration (1, 2, N) | Imprint Creation Time (1, 2, N) | Sensing Imprint (1, 2, N) |
| | . . . | | | |
| | Sensing receiver 502-K | Delivered Transmission Configuration (1, K, 1) | Imprint Creation Time (1, K, 1) | Sensing Imprint (1, K, 1) |
| | | Delivered Transmission Configuration (1, K, 2) | Imprint Creation Time (1, K, 2) | Sensing Imprint (1, K, 2) |
| | | Delivered Transmission Configuration (1, K, 3) | Imprint Creation Time (1, K, 3) | Sensing Imprint (1, K, 3) |
| | | . . . | | |
| | | Delivered Transmission Configuration (1, K, N) | Imprint Creation Time (1, K, N) | Sensing Imprint (1, K, N) |
| Sensing transmitter 504-2 | Sensing receiver 502-1 | Delivered Transmission Configuration (2, 1, 1) | Imprint Creation Time (2, 1, 1) | Sensing Imprint (2, 1, 1) |
| | | Delivered Transmission Configuration (2, 1, 2) | Imprint Creation Time (2, 1, 2) | Sensing Imprint (2, 1, 2) |
| | | Delivered Transmission Configuration (2, 1, 3) | Imprint Creation Time (2, 1, 3) | Sensing Imprint (2, 1, 3) |
| | | . . . | | |
| | | Delivered Transmission Configuration (2, 1, N) | Imprint Creation Time (2, 1, N) | Sensing Imprint (2, 1, N) |
| | Sensing receiver 502-2 | Delivered Transmission Configuration (2, 2, 1) | Imprint Creation Time (2, 2, 1) | Sensing Imprint (2, 2, 1) |
| | | Delivered Transmission Configuration (2, 2, 2) | Imprint Creation Time (2, 2, 2) | Sensing Imprint (2, 2, 2) |

TABLE 2-continued

Example data structure for sensing imprints stored at sensing receiver 502-1

| | | | | |
|---|---|---|---|---|
| | | Delivered Transmission Configuration (2, 2, 3) | Imprint Creation Time (2, 2, 3) | Sensing Imprint (2, 2, 3) |
| | | . . . | | |
| | | Delivered Transmission Configuration (2, 2, N) | Imprint Creation Time (2, 2, N) | Sensing Imprint (2, 2, N) |
| | . . . | | | |
| | Sensing receiver 502-K | Delivered Transmission Configuration (2, K, 1) | Imprint Creation Time (2, K, 1) | Sensing Imprint (2, K, 1) |
| | | Delivered Transmission Configuration (2, K, 2) | Imprint Creation Time (2, K, 2) | Sensing Imprint (2, K, 2) |
| | | Delivered Transmission Configuration (2, K, 3) | Imprint Creation Time (2, K, 3) | Sensing Imprint (2, K, 3) |
| | | . . . | | |
| | | Delivered Transmission Configuration (2, K, N) | Imprint Creation Time (2, K, N) | Sensing Imprint (2, K, N) |
| . . . | | | | |
| Sensing transmitter 504-M | Sensing receiver 502-1 | Delivered Transmission Configuration (M, 1, 1) | Imprint Creation Time (M, 1, 1) | Sensing Imprint (M, 1, 1) |
| | | Delivered Transmission Configuration (M, 1, 2) | Imprint Creation Time (M, 1, 2) | Sensing Imprint (M, 1, 2) |
| | | Delivered Transmission Configuration (M, 1, 3) | Imprint Creation Time (M, 1, 3) | Sensing Imprint (M, 1, 3) |
| | | . . . | | |
| | | Delivered Transmission Configuration (M, 1, N) | Imprint Creation Time (M, 1, N) | Sensing Imprint (M, 1, N) |
| | Sensing receiver 502-2 | Delivered Transmission Configuration (M, 2, 1) | Imprint Creation Time (M, 2, 1) | Sensing Imprint (M, 2, 1) |
| | | Delivered Transmission Configuration (M, 2, 2) | Imprint Creation Time (M, 2, 2) | Sensing Imprint (M, 2, 2) |
| | | Delivered Transmission Configuration (M, 2, 3) | Imprint Creation Time (M, 2, 3) | Sensing Imprint (M, 2, 3) |
| | | . . . | | |
| | | Delivered Transmission Configuration (M, 2, N) | Imprint Creation Time (M, 2, N) | Sensing Imprint (M, 2, N) |
| | . . . | | | |
| | Sensing receiver 502-K | Delivered Transmission Configuration (M, K, 1) | Imprint Creation Time (M, K, 1) | Sensing Imprint (M, K, 1) |
| | | Delivered Transmission Configuration (M, K, 2) | Imprint Creation Time (M, K, 2) | Sensing Imprint (M, K, 2) |

TABLE 2-continued

Example data structure for sensing imprints stored at sensing receiver 502-1

| Delivered Transmission Configuration (M, K, 3) | Imprint Creation Time (M, K, 3) | Sensing Imprint (M, K, 3) |
|---|---|---|
| ... | | |
| Delivered Transmission Configuration (M, K, N) | Imprint Creation Time (M, K, N) | Sensing Imprint (M, K, N) |

Referring again to FIG. 5, according to one or more implementations, for the purpose of Wi-Fi sensing, sensing receiver 502-1 may initiate a measurement campaign (or a Wi-Fi sensing session). In the measurement campaign, exchange of transmissions between sensing receiver 502-1 and sensing transmitter 504-1 may occur. In an example, control of these transmissions may be with the MAC layer of the IEEE 802.11 stack. According to an example implementation, sensing receiver 502-1 may initiate the measurement campaign via one or more sensing initiation messages. In an implementation, sensing agent 516-1 may be configured to generate a sensing initiation message. According to an implementation, sensing agent 516-1 may transmit the sensing initiation message to sensing transmitter 504-1 via transmitting antenna 512-1.

According to an implementation, sensing transmitter 504-1 may receive the sensing initiation message from sensing receiver 502-1 via receiving antenna 534-1. In an implementation, sensing agent 536-1 may apply the requested transmission configuration included in the sensing initiation message. Subsequently, sensing agent 536-1 may transmit a sensing transmission to sensing receiver 502-1 in response to the sensing initiation message and in accordance with the requested transmission configuration. In an example, the sensing transmission may include a delivered transmission configuration. In an implementation, sensing agent 536-1 may be configured to transmit the sensing transmission to sensing receiver 502-1 via transmitting antenna 532-1.

In an implementation, sensing receiver 502-1 may receive the sensing transmission from sensing transmitter 504-1 transmitted in response to the sensing initiation message. Sensing receiver 502-1 may be configured to receive the sensing transmission from sensing transmitter 504-1 via receiving antenna 514-1. According to an implementation, sensing agent 516-1 may be configured to generate a sensing measurement based on the sensing transmission. Subsequently, sensing agent 516-1 may generate a full TD-CRI of a propagation channel between sensing receiver 502-1 and sensing transmitter 504-1 based on the sensing measurement. In an implementation, upon receiving the sensing transmission, the baseband receiver of the sensing receiver 502-1 may calculate CSI and pass the CSI from the PHY to the MAC layer. The MAC layer may then convert the CSI to full TD-CRI using an IFFT.

In an example, sensing algorithm manager 506 may send a request for a high fidelity TD-CRI reconstruction to sensing receiver 502-1 where high fidelity TD-CRI reconstruction means that the resulting TD-CRI reconstruction may not exhibit any loss of fidelity of the propagation channel under measurement. In an example, this high fidelity TD-CRI reconstruction may be termed lossless, implying that it loses no fidelity of the propagation channel. According to an implementation, sensing agent 516-1 may select a time domain compression technique as appropriate. For example, sensing agent 516-1 may use lossy or lossless time domain compression technique depending on the sensing application requirements and use case. In an example, since it is not necessary to perform the subtraction between the full TD-CRI and the sensing imprint, computation required for lossy time domain compression may be less in comparison to lossless time domain compression. Accordingly, it may be preferable for sensing algorithm manager 506 to request the use of lossy time domain compression technique in cases where the loss of fidelity is acceptable.

According to an implementation, sensing agent 516-1 may obtain a sensing imprint representing a steady-state propagation channel between sensing receiver 502-1 and sensing transmitter 504-1. In an implementation, sensing agent 516-1 may obtain the sensing imprint representing the steady-state propagation channel between sensing receiver 502-1 and sensing transmitter 504-1 by retrieving the sensing imprint from sensing imprint storage 518-1. In an example, the obtained sensing imprint may be a previously recorded sensing imprint measured on one or more sensing transmissions from sensing transmitter 504-1 using the same delivered transmission configuration.

Upon obtaining the sensing imprint, sensing agent 516-1 may compare the full TD-CRI to the sensing imprint. According to an implementation, sensing agent 516-1 may compare the full TD-CRI to the sensing imprint in response to a request from sensing algorithm manager 506. In an implementation, sensing algorithm manager 506 may indicate to sensing receiver 502-1 a fidelity that is required in the sensing measurement, for example, based on sensing application requirements and use case.

In some implementations, there may be circumstances when either of the lossless or lossy time domain compression technique may be preferred over the other. In an example, if a sensing goal of sensing algorithm manager 506 is to detect motion anywhere in a surrounding area, lossy time domain compression technique may be sufficient to provide the required information. In some examples, if a sensing goal of sensing algorithm manager 506 is to detect fine-grained motion features, for example, a direction of motion or an ability to track where in the propagation channel, the motion is happening, then sensing algorithm manager 506 may request lossless updates of the propagation channel so that all available information can be applied to sensing. According to some examples, a decision on reconstruction technique may be influenced by a range of an object from sensing receiver 502-1 or sensing transmitter 504-1. If a sensing goal of sensing algorithm manager 506 is to detect motion when a disturbance (or motion) is close to sensing receiver 502-1 or sensing transmitter 504-1, then lossy time domain compression technique may be sufficient to detect the disturbance. However, if sensing algorithm manager 506 needs an expanded area of coverage where it is sensitive to any slight disturbance happening in the periphery of the propagation channel, then lossless time domain compression technique may be required to detect the disturbance.

According to an implementation, based on a comparison of the full TD-CRI to the sensing imprint, sensing agent 516-1 may identify a filtered TD-CRI according to differences between the full TD-CRI and the sensing imprint. In an implementation, sensing agent 516-1 may determine a set of time domain pulses of the full TD-CRI that differ from corresponding time domain pulses of the sensing imprint and designate the set of time domain pulses of the full TD-CRI as the filtered TD-CRI. According to an implementation, sensing agent 516-1 may identify only those differences between the time domain pulses of the full TD-CRI and the time domain pulses of the sensing imprint that exceed a measurement imprint delta threshold. In an implementation, the measurement imprint delta threshold may be a threshold above which a time domain pulse of a full TD-CRI may be considered to be different from a time domain pulse of a sensing imprint. In an example, the measurement imprint delta threshold may be defined in terms of an amplitude threshold or a phase threshold or a combination of both an amplitude threshold and a phase threshold.

According to an implementation, sensing agent 516-1 may determine a difference between the full TD-CRI and the sensing imprint based on calculating difference between the full TD-CRI and the sensing imprint on a time domain pulse-by-time domain pulse basis by phasor subtraction. In an example, the difference between each time domain pulse of the full TD-CRI and the sensing imprint may be expressed in terms of a difference in amplitude or a difference in phase or as a combination of differences in both amplitude and phase. In some examples, the difference between each time domain pulse of the full TD-CRI and the sensing imprint may be expressed as a phase and amplitude transformation (i.e., phase rotation and amplitude scaling). In some examples, the difference between each time domain pulse of the full TD-CRI and the sensing imprint may be expressed as a combination of representations, such as a difference in amplitude and a rotation in phase.

Figure 7:
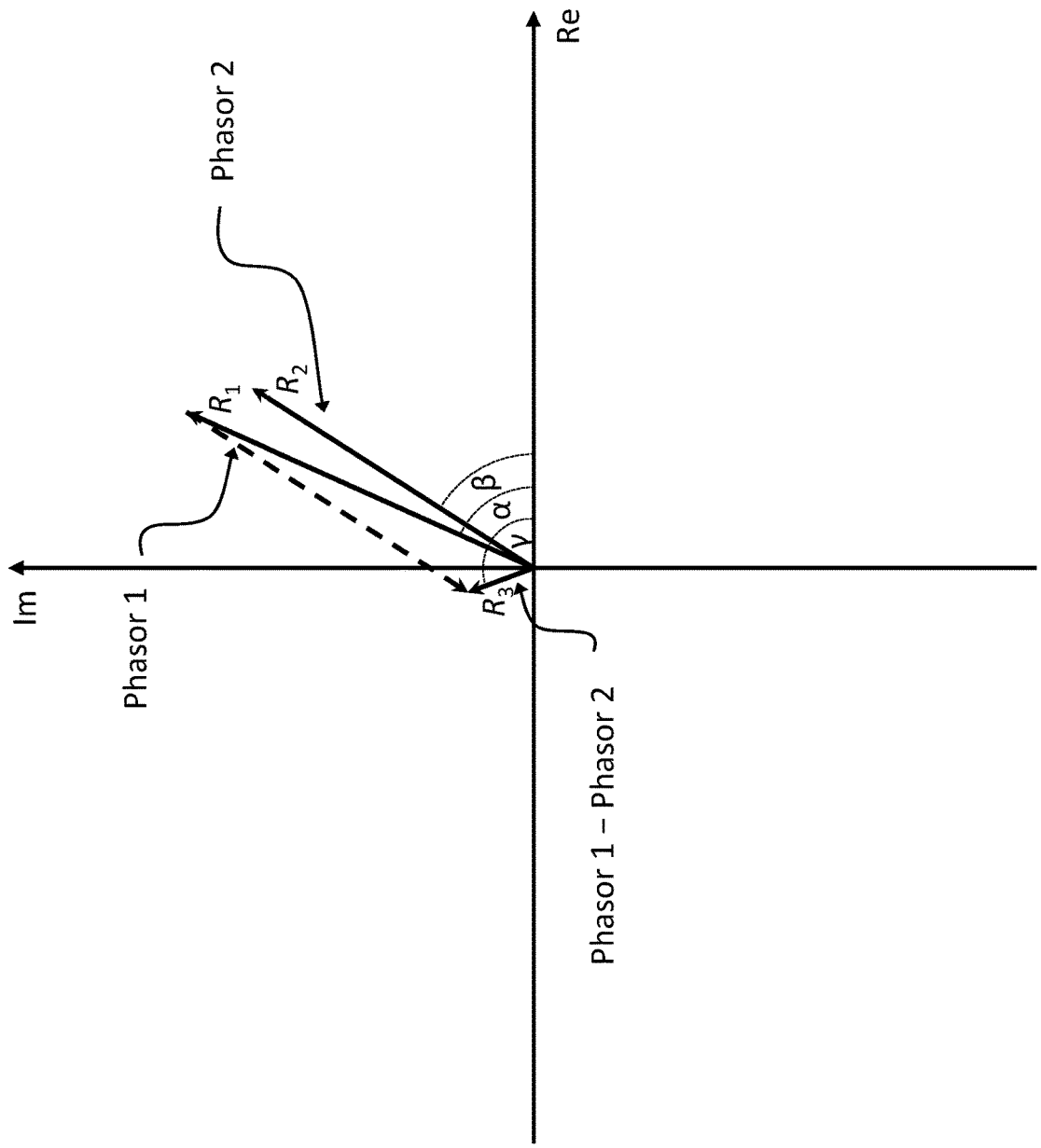
FIG. 7 illustrates an example of phasor subtraction, according to some embodiments.
Figure 8:
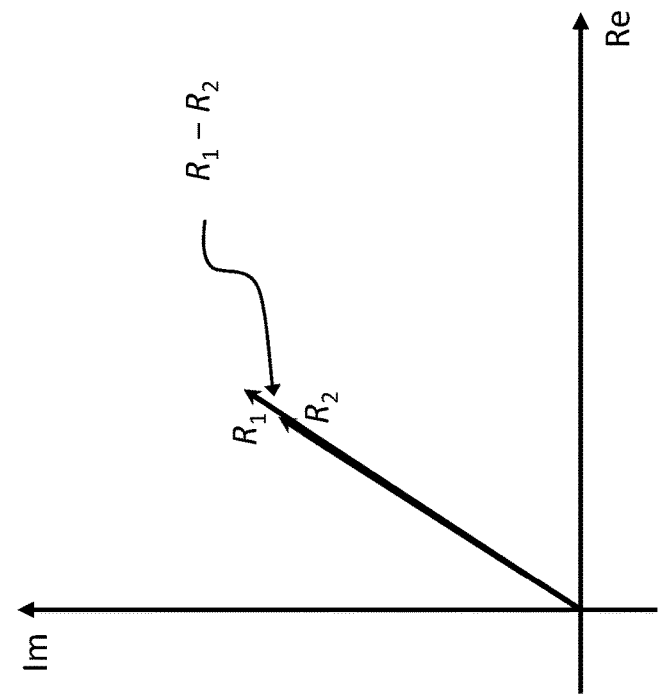
FIG. 8 illustrates examples of phase rotation, amplitude scaling, and a difference in amplitude after the phase rotation, according to some embodiments.

FIG. 7 illustrates example 700 of phasor subtraction, according to some embodiments. In FIG. 7, Re is the real axis and Im is the imaginary axis. In an example of FIG. 7, phasor 2 is subtracted from phasor 1. As described in FIG. 7, amplitude and phase of phasor 1 are represented by $R_1$ and $\alpha$, respectively, and amplitude and phase of phasor 2 are represented by $R_2$ and $\beta$, respectively. Further, amplitude and phase of the difference between the phasor 1 and phasor 2 are represented by $R_3$ and $\gamma$. FIG. 8 illustrates example 800 of phase rotation, amplitude scaling, and a difference in amplitude after the phase rotation. In FIG. 8, Re is the real axis and Im is the imaginary axis. As described in FIG. 8, the phase difference between phasor 1 and phasor 2 is $\theta$, and a scaling factor between the amplitude of phasor 1 and phasor 2 is a.

Referring back to FIG. 5, according to an implementation, sensing agent 516-1 may store the set of time domain pulses of the full TD-CRI that make up the filtered TD-CRI as differences between the set of time domain pulses of the full TD-CRI and the corresponding time domain pulses of the sensing imprint as an imprint delta defining the filtered TD-CRI in imprint delta storage 522-1. In an implementation, the imprint delta values that make up filtered TD-CRI may be represented by a numerical format with fewer bits than may be required to represent a complete time domain pulse of the filtered TD-CRI. According to an example, there may be no loss of precision as the range of the value that is being represented is reduced by the difference operation.

In an implementation, once the imprint delta is obtained, sensing agent 516-1 may evaluate the imprint delta individually for each time domain pulse of the full TD-CRI. According to an implementation, sensing agent 516-1 may compare each time domain pulse difference (i.e., difference between a time domain pulse of the full TD-CRI and a time domain pulse of the sensing imprint) to a measurement imprint delta threshold for amplitude or for phase, or for both amplitude and phase. Based on the comparison result, sensing agent 516-1 may determine that a time domain pulse of the full TD-CRI has changed. In an example, sensing agent 516-1 may determine that a time domain pulse of the full TD-CRI has changed when the measurement imprint delta threshold is exceeded only once. According to an implementation, the measurement imprint delta threshold must exceed a measurement imprint delta count on subsequent measurements before a time domain pulse of the full TD-CRI is considered to be different from a time domain pulse of the sensing imprint. In an example, the measurement imprint delta count may refer to a number of times that the measurement imprint delta threshold is exceeded before a time domain pulse of the full TD-CRI is considered to be different from a time domain pulse of the sensing imprint.

In an implementation, the measurement imprint delta threshold and the measurement imprint delta count may be configured by sensing receiver 502-1. In some implementations, the measurement imprint delta threshold and the measurement imprint delta count may be configured by sensing algorithm manager 506. According to an implementation, sensing algorithm manager 506 may send one or more measurement imprint delta thresholds and corresponding one or more measurement imprint delta counts to sensing receiver 502-1. According to an embodiment, upon initial association of sensing receiver 502-1 with sensing algorithm manager 506, sensing algorithm manager 506 may communicate one or more measurement imprint delta thresholds and corresponding one or more measurement imprint delta counts to sensing receiver 502-1 for use in future Wi-Fi sensing session(s). In an example, the one or more measurement imprint delta thresholds may be associated with a specific sensing imprint. For example, the measurement imprint delta thresholds may be associated with the sensing imprint for an uplink path between sensing transmitter 504-1 and sensing receiver 502-1 in a specific channel bandwidth and for a specific delivered transmission configuration.

According to an implementation, as a representation of the reflections of the propagation channel between sensing receiver 502-1 and sensing transmitter 504-1 for Wi-Fi sensing, sensing receiver 502-1 may send the filtered TD-CRI to sensing algorithm manager 506. In an implementation, sensing agent 516-1 may send the filtered TD-CRI to sensing algorithm manager 506 via a CRI transmission message. In an example implementation, sensing agent 516-1 may send the CRI transmission message including the filtered TD-CRI to sensing algorithm manager 506 via transmitting antenna 512-1. In an example, filtered TD-CRI may contain time domain pulses of the full TD-CRI to sensing algorithm manager 506 that are determined to have changed from the sensing imprint (the time domain pulses of the full TD-CRI that are different from the sensing imprint may be transmitted to sensing algorithm manager 506). In some examples, filtered TD-CRI may contain the imprint delta values that represent the time domain pulses of the full TD-CRI that are determined to have changed from the sensing imprint (the imprint delta of the changed time domain pulses of the full TD-CRI may be transmitted to the sensing algorithm manager 506).

According to an implementation, sensing agent 516-1 may indicate a location of time domain pulses within the filtered TD-CRI that represent the reflections in the propagation channel (i.e., the time domain tone that the time domain pulse or imprint delta represents) to sensing algorithm, manager 506.

In an implementation, sensing agent 516-1 may transmit a sensing imprint indicator along with the filtered TD-CRI to sensing algorithm manager 506. In an example, the sensing imprint indicator may refer to a version number or a unique identifier of the sensing imprint used by sensing receiver 502-1 to calculate the filtered TD-CRI. The unique identifier may be generated based on a combination of identifiers of any of sensing receiver 502-1, sensing transmitter 504-1, and the delivered transmission configuration to allow sensing algorithm manager 506 to determine which of a number of sensing imprints that it may have stored to use. In some implementations, sensing agent 516-1 may generate and transmit a cryptographic hash of the sensing imprint used by sensing receiver 502-1 to calculate the filtered TD-CRI along with the filtered TD-CRI to allow sensing algorithm manager 506 to determine which sensing imprint to use. In an implementation, sensing agent 516-1 may use SHA-256 algorithm to generate the cryptographic hash.

In an implementation, to avoid using a longer than necessary data field, for example, MAC PDU to send the filtered TD-CRI from sensing receiver 502-1 to sensing algorithm manager 506, the filtered TD-CRI time domain pulses or the imprint delta values may be arranged contiguously in the data message without gaps or nulls between them. However, there may have been gaps between the actual updated or selected full TD-CRI time domain pulses and therefore the original location of the selected full TD-CRI time domain pulses must be signaled from sensing receiver 502-1 to sensing algorithm manager 506. In an example, the updated or selected full TD-CRI time domain pulses may refer to the time domain pulses of the full TD-CRI that are different from the sensing imprint.

According to an implementation, sensing agent 516-1 may transmit a location bitmap indicating locations of the first time domain pulses in the full TD-CRI to sensing algorithm manager 506. In an example, the first time domain pulses may be a series of time domain pulses from within the full TD-CRI which have changed compared to the sensing imprint and are to be processed by sensing algorithm manager 506 to determine a current sensing measurement. Accordingly, each time domain pulse must be identified to allow reconstructed full TD-CRI to be generated at sensing algorithm manager 506 and the sensing measurement to be recreated.

Figure 9:
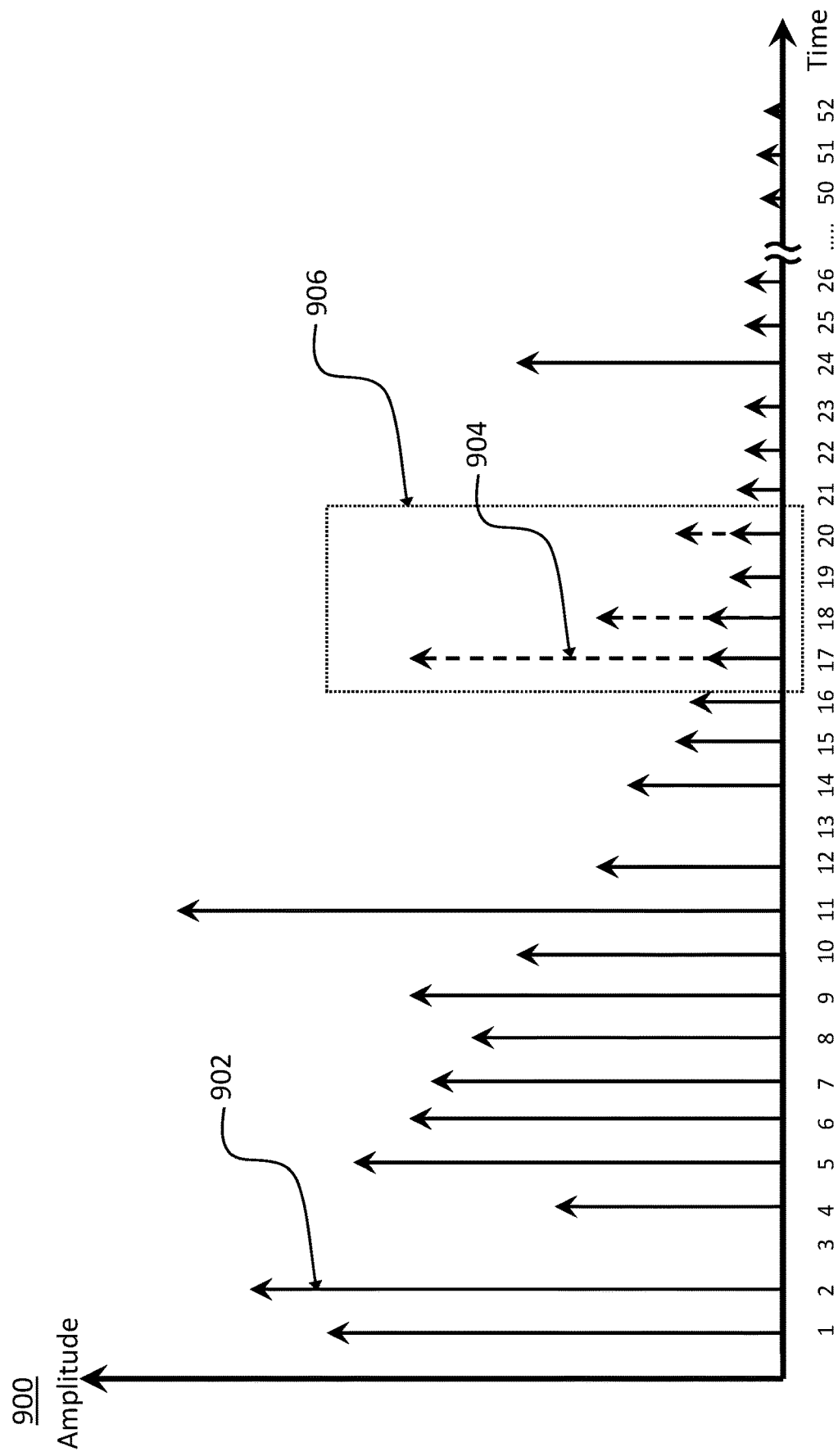
FIG. 9 depicts an illustration of filtered time domain channel representation information (TD-CRI), according to some embodiments.

FIG. 9 depicts illustration 900 of a filtered TD-CRI, according to some embodiments. An example of time domain pulses in a sensing imprint are shown using solid line arrows (represented as "902") and an example change to the sensing imprint in three time domain pulses is shown using dashed line arrows (represented as "904"). For clarity, in the example of FIG. 9, the series of selected full TD-CRI time domain values that differ from the sensing imprint are within the window represented as "906". In an example, the propagation channel between sensing receiver 502-1 and sensing transmitter 504-1 may be 20 MHz in bandwidth and may be represented by 52 complex time domain pulses in the full TD-CRI.

According to an implementation, sensing agent 516-1 may create a bitmap of a length required to represent all time domain pulses which carry data. In an example, the bitmap may be 52 bits long. In other examples, the bitmap may be 104 bits long. In an example, sensing agent 516-1 may populate the bitmap with a "1" where a time domain pulse has been selected and is present and a "0" where a time domain pulse has not been selected and is absent. In an example, the Most Significant Bit (MSB) of the bitmap refers to the first time domain tone and the Least Significant Bit (LSB) of the bitmap refers to the last time domain tone.

Referring to the example in FIG. 9, a 52 bits long bitmap (or 52-bit bitfield) is created as below:

0000000000000000$\underline{11}$0$\underline{1}$000000000000000000000-00000000000

In an implementation, the three updated time domain pulses (magnitude and phase) are transferred sequentially. In an example, the updated time domain pulses may be transferred as values which replace the corresponding value in the sensing imprint. In some examples, the imprint delta may be transferred to be applied as a change to the corresponding value in the sensing imprint. The type of update which is transferred may be signaled by additional bits in the bitfield. In an example, the value of an additional MSB may represent the type of update which is transferred. According to an implementation, to take advantage of the potential for low information content in the bitfield, sensing agent 516-1 may use a lossless data compression algorithm to reduce the number of bits transferred. An example of the lossless data compression algorithm is run-length encoding.

In an example, the bitmap may equal the number of tones in the FFT including the guard tones and DC tones, i.e., 64 bits for an example of a 20 MHz propagation channel bandwidth and 128 bits for an example of a 40 MHz propagation channel bandwidth. In the example, a first number of the MSB would be "0" to account for the guard tones and a second number of the LSB would also be "0" to account for the DC tone and the guard tones. According to an implementation, it may be assumed that the MSB of the bitmap maps to the first symbol of the FFT. Based on the assumption, the time domain pulses or imprint delta values may be populated according to the bitmap.

According to some implementations, for each time domain pulse in the filtered TD-CRI, sensing agent 516-1 may send three values instead of two values, where one of the three value may represent the position of the time domain pulse or imprint delta value in the full TD-CRI. In an example, the number of bits used to represent the additional value (i.e., the third value) or a size of the additional value may vary depending on the propagation channel bandwidth and the number of time domain pulses in the TD-CRI. For example, if the propagation channel bandwidth is 20 MHz and a 64-point FFT is required, the additional value may be 6 bits long. If the propagation channel bandwidth is 40 MHz and a 128-point FFT is required, the additional value may be 7 bits long. In an examples, the additional value could precede the value of the time domain pulse or imprint delta value. In some examples, the additional value could follow the value of the time domain pulse or imprint delta value.

In an example, the type of the values of filtered TD-CRI which are transferred (i.e., those which replace the corresponding time domain pulse values in the sensing imprint or those which reflect changes to the corresponding value in the sensing imprint) is signaled by a dedicated type of update field transferred along with the values themselves.

FIG. 10 depicts an example of set 1000 of changed time domain pulses in the full TD-CRI (selected time domain pulses) and FIG. 11 depicts another example of set 1100 of changed time domain pulses in the full TD-CRI (imprint delta), according to some embodiments. In an example, it may be assumed that there are no guard or DC tones prior to the start of the time domain representation. In both depictions, parameters that represent the location of the changed time domain pulses in the TD-CRI are transferred with the changed time domain pulses.

According to an implementation, sensing algorithm manager 506 may receive a filtered TD-CRI from sensing receiver 502-1. In an example, the filtered TD-CRI may include a plurality of time domain pulses. In an implementation, sensing algorithm manager 506 may receive a sensing imprint indicator along with the filtered TD-CRI. In an example, the sensing imprint indicator may refer to a version number or a unique identifier of the sensing imprint used by sensing receiver 502-1 to calculate the filtered TD-CRI. In an implementation, sensing algorithm manager 506 may also receive a location bitmap indicating locations of corresponding time domain pulses in the sensing imprint. In some implementations, sensing algorithm manager 506 may receive a cryptographic hash of the sensing imprint used by sensing receiver 502-1 to calculate the filtered TD-CRI along with the filtered TD-CRI to allow sensing algorithm manager 506 to determine which sensing imprint to use.

According to an implementation, upon receiving the filtered TD-CRI and the sensing imprint indicator and/or the cryptographic hash, sensing algorithm manager 506 may obtain a sensing imprint (or a copy of the sensing imprint) according to the sensing imprint indicator and/or the cryptographic hash from the data storage. In an implementation, sensing algorithm manager 506 may generate a reconstructed TD-CRI from the filtered TD-CRI and the sensing imprint. According to an implementation, sensing algorithm manager 506 may generate the reconstructed TD-CRI by replacing corresponding time domain pulses of the sensing imprint with the plurality of time domain pulses received in the filtered TD-CRI. Sensing algorithm manager 506 may then perform an FFT on the resulting time domain signal to obtain the near-exact frequency domain CSI. Subsequently, sensing algorithm manager 506 may detect a feature of interest in a sensing space according to the reconstructed frequency domain channel representation.

In some implementations, the filtered TD-CRI may include an imprint delta storing time domain pulse differences. Upon receiving the filtered TD-CRI, sensing algorithm manager 506 may generate the reconstructed TD-CRI by adding the time domain pulse differences to corresponding time domain pulses of the sensing imprint. In an example, sensing algorithm manager 506 may add the imprint delta to the corresponding time domain pulses in the sensing imprint using phasor addition. The operation of phasor addition is opposite to that of phasor subtraction shown in FIGS. 9 and 10. In an example, where the numerical representation of the imprint delta is modified to reduce the number of bits to transmit then the imprint delta is first cast to the numerical format and resolution of the corresponding time domain pulses in the copy of the stored sensing imprint to allow the phasor addition to proceed without numerical error. Thereafter, sensing algorithm manager 506 may then perform an FFT on the resulting time domain signal to obtain the near-exact frequency domain CSI. Subsequently, sensing algorithm manager 506 may detect a feature of interest in a sensing space according to the reconstructed frequency domain channel representation.

In examples where the sensing imprint used to determine the filtered TD-CRI cannot be identified by sensing algorithm manager 506, either by the sensing imprint indicator or the cryptographic hash, then the time domain pulses or imprint delta values may be discarded. In some implementations, sensing algorithm manager 506 may send a message to sensing receiver 502-1 to invalidate the stored sensing imprint. In some implementations, if the sensing imprint used to determine the filtered TD-CRI cannot be identified by sensing algorithm manager 506, either by the sensing imprint indicator or the cryptographic hash, and time domain pulses (and not imprint delta values) were sent, sensing algorithm manager 506 may utilize the lossy time domain compression technique in place of the lossless time domain compression technique.

According to an implementation, the sensing imprint used by sensing algorithm manager 506 to calculate the reconstructed TD-CRI or the sensing imprint used by sensing receiver 502-1 to calculate the filtered TD-CRI may need to be recalculated or updated, for example, a scenario where sensing receiver 502-1 detects a moving object in the propagation channel between sensing receiver 502-1 and sensing transmitter 504-1, resulting in an imprint delta between the full TD-CRI and the sensing imprint, and then the object that caused this imprint delta stops moving but stays in the sensing space. In such scenario, the baseline sensing imprint that was formed before the object entered the sensing space is no longer valid. It is likely that the imprint delta varies minimally from sensing measurement to sensing measurement when the object is no longer moving, and hence there will be repeated transmission of identical or similar information from sensing receiver 502-1 to the sensing algorithm manager 506. In such scenario, a new sensing imprint may be determined. In an example, updating of a sensing imprint may lead to creation of a new sensing imprint.

In some implementations, sensing receiver 502-1 or sensing algorithm manager 506 may determine that a new sensing imprint is required based one or more of three scenarios, namely Scenario 1, Scenario 2, and Scenario 3 provided below. Other example scenarios that are not discussed here are contemplated herein.

Scenario 1

In an example implementation, sensing receiver 502-1 or sensing algorithm manager 506 may detect whether a time domain pulse in the full TD-CRI that has initially differed from a corresponding time domain pulse in the sensing imprint returns to within a steady-state imprint delta threshold of the full TD-CRI value in the sensing imprint within steady-state imprint delta period. If sensing receiver 502-1 or sensing algorithm manager 506 detects that the changed time domain pulse of the full TD-CRI does not return to the sensing imprint or to within the steady-state imprint delta threshold of the sensing imprint within the steady-state imprint delta period, sensing receiver 502-1 or sensing algorithm manager 506 may determine that the stored sensing imprint is no longer valid and should be updated. Accordingly, sensing receiver 502-1 or sensing algorithm manager 506 may determine that a new sensing imprint is required.

Scenario 2

In an example implementation, sensing receiver 502-1 or sensing algorithm manager 506 may determine that a new sensing imprint is required when sensing receiver 502-1 or sensing algorithm manager 506 detects that a rate of change of the magnitude and/or phase of the time domain pulses that exhibit an imprint delta from the time domain pulses of the sensing imprint (i.e., the changed time domain pulses) drops below an imprint delta derivative threshold for an imprint delta derivative period. In an example, sensing receiver 502-1 or sensing algorithm manager 506 may determine that a new sensing imprint is required when sensing receiver 502-1 or sensing algorithm manager 506 determines that the difference between subsequent imprint delta measurements drops below the imprint delta derivative threshold for the imprint delta derivative period. In an example, the imprint delta derivative period may be set at a value to avoid a situation where a mobile object is detected which then remains static for a short period of time (i.e., rate of change of the magnitude and phase of the time domain pulses that exhibited an imprint delta from the time domain pulses falls to zero) but then moves again. In such situation, if the imprint delta derivative period is too short the sensing imprint may be recalculated if the object remains stationary for a short period of time, which is undesirable.

Scenario 3

In an example implementation, sensing receiver 502-1 or sensing algorithm manager 506 may determine that a new sensing imprint is required when sensing receiver 502-1 or sensing algorithm manager 506 detects that an imprint validity timer associated with the sensing imprint has expired. In an example, a sensing imprint may become invalid after an imprint validity period. In an example, sensing algorithm manager 506 may configure the imprint validity period and may determine when the imprint validity period expires.

In an implementation, sensing algorithm manager 506 may configure the steady-state imprint delta threshold, the steady-state imprint delta period, the imprint delta derivative threshold, and the imprint delta derivative period. Sensing algorithm manager 506 may send one or more steady-state imprint delta thresholds. In an example, the one or more steady-state imprint delta thresholds may be associated with a specific sensing imprint. For example, the one or more steady-state imprint delta thresholds may be associated with the sensing imprint for the uplink path between sensing transmitter 504-1 and sensing receiver 502-1 for a specific delivered transmission configuration.

In an example implementation, sensing algorithm manager 506 may configure the imprint delta derivative threshold below which a rate of change of an imprint delta between sensing measurements may be considered to be negligible. In an example, sensing algorithm manager 506 may configure the imprint delta derivative period over which the rate of change of the imprint delta between sensing measurements remains below the threshold.

According to an implementation, when a new sensing imprint is required, sensing receiver 502-1 may generate the new sensing imprint based on sensing transmissions that are normally occurring and not specifically requested for the purposes of generating the new sensing imprint. In an example, where the sensing imprint includes versions for multiple delivered transmission configurations, sensing receiver 502-1 may update only the version of the sensing imprint which corresponds to the delivered transmission configurations which are in use. In some example, sensing receiver 502-1 may determine that the complete sensing imprint (i.e., for all delivered transmission configurations) between sensing receiver 502-1 and sensing transmitter 504-1 is to be updated. In such scenarios, sensing receiver 502-1 may request sensing transmissions with the required requested transmission configurations.

In an implementation, when sensing receiver 502-1 determines that a new sensing imprint is required, for example, based on scenario 2, the new sensing imprint may be determined to be the channel impulse response at the point where the rate of change of the imprint delta of the time domain pulses drops below the imprint delta derivative threshold for the required imprint delta derivative period. In some examples, the new sensing imprint may be the average of sensing imprint average count channel impulse responses after the rate of change of the imprint delta drops below the imprint delta derivative threshold. In an implementation, sensing algorithm 506 may configure the sensing imprint average count of sensing measurements made on sensing transmissions from sensing transmitter 504-1 which share a common delivered transmission configuration that are averaged to reduce noise (for example, measurement noise). The resultant average full TD-CRI may become a sensing imprint for the delivered transmission configuration and sensing transmitter 504-1 that produced the sensing transmissions on which the sensing measurements were made.

In some implementations, sensing algorithm manager 506 may determine that a new sensing imprint is required and may send a request to sensing receiver 502-1 to create a new sensing imprint and to send the new sensing imprint to sensing algorithm manager 506. In an example, sensing algorithm manager 506 may notify sensing receiver 502-1 that the next X transmissions it receives will be sensing transmissions and that sensing receiver 502-1 is to make a sensing measurement on each of the sensing transmissions and combine these sensing measurements together to create the sensing imprint. In some implementations, sensing receiver 502-1 may determine that a new sensing imprint is required and may send a notification message to sensing algorithm manager 506 about the determination. In an example, such a determination may be made when sensing receiver 502-1 discovers that an imprint validity timer associated with the sensing imprint has expired. In an implementation, when the imprint validity period expires, sensing receiver 502-1 may process sensing measurements to determine a new sensing imprint. In some implementations, sensing transmitter 504-1 may be required to configure a new series of sensing transmissions to continue the measurement campaign.

According to an implementation, if it is determined that sensing receiver 502-1 or sensing transmitter 504-1 has moved (for example, based on detecting a complete change in the imprint delta, or by detecting a power interruption event, or due to a change in MAC address of sensing receiver 502-1 or sensing transmitter 504-1), then sensing algorithm manager 506 may create one or more new sensing imprints for the propagation channels that involve the reconfigured sensing receiver 502-1 or sensing transmitter 504-1. Further, in situations where a new sensing transmitter is added to system 500, sensing algorithm manager 506 may create one or more new sensing imprints for the propagation channels that involve the new sensing transmitter.

In some implementations, when a sensing imprint for a given delivered transmission configuration and a given set of sensing transmitters needs to be updated or recalculated, sensing receiver 502-1 may send a time domain pulse for every tone to sensing algorithm manager 506. The time domain pulse may include an average of several time domain pulses over several sensing transmissions. In an example, when sensing receiver 502-1 calculates a new sensing imprint, sensing receiver 502-1 may determine the time domain tones of the updated sensing imprint which differ from the time domain tones of the existing sensing imprint and may only send the time domain pulses for which the difference is greater than the measurement imprint delta threshold together with an indication of the location of the time domain pulses within the sensing imprint.

Some embodiments of the present disclosure as described above define sensing message types for Wi-Fi sensing, namely, sensing configuration message, sensing configuration response message, delta CRI message, and sensing imprint transmission message.

In an example, the sensing configuration message and the sensing configuration response message are carried in a new extension to a management frame of a type described in IEEE 802.11. FIG. 12 illustrates an example of a component of a management frame 1200 carrying a sensing transmission. In an example, system 500 may require acknowledgement frames and the management frame carrying sensing messages may be implemented as an Action frame and in another example, system 500 may not require acknowledgement frames and the management frame carrying sensing messages may be implemented as an Action No Ack frame.

In an implementation, the information content of all sensing message types may be carried in a format as shown in FIG. 12. In some examples, Transmission Configuration, Timing Configuration, Steering Matrix Configuration, and TD-CRI configuration as described in FIG. 12 are implemented as IEEE 802.11 elements. In some examples, the TD-CRI Configuration element is a part of the Transmission Configuration element.

In one or more embodiments, the sensing message types may be identified by the message type field, and each sensing message type may carry the other identified elements, according to some embodiments. Examples of sensing message types and TD-CRI configuration elements are shown in Table 3. Further, the TD-CRI configuration element details are shown in Table 4.

TABLE 3

Sensing message types and TD-CRI configuration elements

| Value | Message Type | Message Direction | TD-CRI Configuration |
|---|---|---|---|
| 0 | Sensing configuration message | Sensing algorithm manager to sensing receiver | Optional<br>Specifies the TD-CRI configuration parameters that the sensing receiver may use for generating filtered TD-CRI values to send to the sensing algorithm manager. |
|  |  | Sensing transmitter including sensing algorithm manager to sensing receiver | The sensing configuration message may be used when TD-CRI configuration parameters are to be sent to the sensing receiver for use in a future sensing session (i.e., the values are held in memory at the sensing receiver). The sensing configuration message may be sent upon association of the sensing transmitter with the sensing receiver. The sensing configuration message may be sent from the sensing algorithm manager which may be present on a separate device (such as the sensing transmitter) on the 802.11 network.<br>If this element is absent, then the sensing receiver may provide CSI values when channel representation information is requested. |
| 1 | Sensing configuration response message | Sensing receiver to sensing algorithm manager | Optional<br>In response to a TD-CRI Configuration element in a sensing configuration message, the sensing receiver receiving the sensing configuration message sends an acknowledgement in the TD-CRI configuration field and configures sensing agent with the provided values for use in generating filtered TD-CRI (possibly when triggered to do so, or always when sending channel representation information). |
|  |  | Sensing receiver to sensing transmitter including sensing algorithm manager |  |
| 2 to 5 and 8 to 255 | Reserved | N/A | N/A |

TABLE 4

TD-CRI Configuration Element Details

| Name | Type | Valid Range | Description |
|---|---|---|---|
| TD-CRI Configuration Element Version | 4-bit value | 1 | Version number of the TD-CRI Configuration Element.<br>0, 2 . . . 15: Reserved<br>1: Lossless TD-CRI |

TABLE 4-continued

TD-CRI Configuration Element Details

| Name | Type | Valid Range | Description |
| --- | --- | --- | --- |
| Measurement Imprint Delta Threshold Criteria | 2-bit value | 0 . . . 3 | Specifies whether amplitude, phase, or a combination of amplitude and phase determines whether a time domain pulse in a full TD-CRI differs from a sensing imprint.<br>00: No threshold to be applied (i.e., all values are considered to have passed the threshold test)<br>01: Amplitude threshold applies<br>10: Phase threshold applies<br>11: Both amplitude and phase threshold apply |
| Measurement Imprint Delta Count | Unsigned Integer | 0 . . . 255 | Number of consecutive sensing measurements in which the Imprint Delta Threshold Criteria is met before a time domain pulse in a full TD-CRI is considered to differ from a stored sensing imprint. A value of 0 means that this function is disabled. |
| Measurement Imprint Delta Threshold Amplitude | Unsigned Float | [0.0, 1.0] | Absolute amplitude threshold above which a time domain pulse in a full TD-CRI is considered to differ from a stored sensing imprint.<br>This threshold is applied based on Measurement Imprint Delta Threshold Criteria. |
| Measurement Imprint Delta Threshold Phase | Signed Float | $[-\pi/2, \pi/2]$ | Phase threshold above which a time domain pulse in a full TD-CRI is considered to differ from a stored sensing imprint. This threshold is applied based on Measurement Imprint Delta Threshold Criteria. |
| Steady-State Imprint Delta Threshold Criteria | 2-bit value | 0 . . . 3 | Specifies whether amplitude, phase, or a combination of amplitude and phase determines whether a time domain pulse in a full TD-CRI has returned to its steady-state when compared to a sensing imprint.<br>00: No threshold to be applied (i.e., all values are considered to have passed the threshold test)<br>01: Amplitude threshold applies<br>10: Phase threshold applies<br>11: Both amplitude and phase threshold apply |

TABLE 4-continued

TD-CRI Configuration Element Details

| Name | Type | Valid Range | Description |
| --- | --- | --- | --- |
| Steady-State Imprint Delta Period | Unsigned Integer | 0 . . . 65535 | A period in milliseconds over which a Steady-State Imprint Delta Threshold must be exceeded to determine that a sensing imprint may have become invalid.<br>A value of 0 means that this function is disabled. |
| Steady-State Imprint Delta Threshold Amplitude | Unsigned Float | [0.0, 1.0] | Absolute amplitude threshold below which a time domain pulse in a full TD-CRI is considered to have returned to its steady-state when compared to a sensing imprint.<br>This threshold is applied based on Steady-State Imprint Delta Threshold Criteria. |
| Steady-State Imprint Delta Threshold Phase | Signed Float | $[-\pi/2, \pi/2]$ | Phase threshold below which a time domain pulse in a full TD-CRI is considered to have returned to its steady-state when compared to a sensing imprint.<br>This threshold is applied based on Steady-State Imprint Delta Threshold Criteria. |
| Imprint Delta Derivative Threshold Criteria | 2-bit value | 0 . . . 3 | Specifies whether amplitude, phase, or a combination of amplitude and phase determines whether an imprint delta derivative is considered to indicate that a stored sensing imprint no longer represents a steady-state propagation channel between sensing receiver and sensing transmitter.<br>00: No threshold to be applied (i.e., all values are considered to have passed the threshold test)<br>01: Amplitude threshold applies<br>10: Phase threshold applies<br>11: Both amplitude and phase threshold apply |
| Imprint Delta Derivative Threshold Amplitude | Unsigned Float | [0.0, 1.0] | Absolute threshold for the amplitude of imprint delta derivative. When the amplitude of imprint delta derivative falls below this threshold for the Imprint Delta Derivative Period and there remains an imprint delta then it is considered to indicate that the stored sensing imprint no longer represents a steady-state propagation channel between sensing receiver and sensing transmitter.<br>This threshold is applied based on Imprint Delta Derivative Threshold Criteria. |

TABLE 4-continued

TD-CRI Configuration Element Details

| Name | Type | Valid Range | Description |
| --- | --- | --- | --- |
| Imprint Delta Derivative Threshold Phase | Signed Float | $[-\pi/2, \pi/2]$ | Threshold for the phase of imprint delta derivative. When the phase of imprint delta derivative falls below this threshold for the Imprint Delta Derivative Period and there remains an imprint delta then it is considered to indicate that the stored sensing imprint no longer represents a steady-state propagation channel between sensing receiver and sensing transmitter. This threshold is applied based on Imprint Delta Derivative Threshold Criteria. |
| Imprint Delta Derivative Period | Unsigned Integer | 0 . . . 65535 | A period in milliseconds over which the values of a derivative of an imprint delta must remain below an Imprint Delta Derivative Threshold to determine that a sensing imprint may have become invalid. |
| Imprint Validity Period | Unsigned Integer | 0 . . . 65535 | A maximum period in seconds for which a sensing imprint is considered valid. A value of 0 means that no sensing imprint is considered valid and a value of 65535 means that there is no limit on the validity. |
| Sensing Imprint Average Count | Unsigned Integer | 0 . . . 65535 | A count of sensing measurements which are averaged to create a sensing imprint. A value of 0 means that no average is made and the next sensing measurement is used to create a sensing imprint. |

In an example, the data provided in Table 4 may be encoded into an element for inclusion in sensing messages between sensing receiver 502-1, sensing transmitter 504-1, and sensing algorithm manager 506. In a measurement campaign involving multiple sensing receivers and multiple sensing transmitters, these parameters may be defined for all sensing receivers-sensing transmitters pairs. In an example, when these parameters are transmitted from sensing algorithm manager 506 or sensing transmitter 504-1 including sensing algorithm manager 506 to sensing receiver 502-1, then these parameters configure sensing receiver 502-1 to process a sensing transmission and calculate sensing measurements. In some examples, when these parameters are transmitted from sensing receiver 502-1 to sensing algorithm manager 506 or sensing transmitter 504-1 including sensing algorithm manager 506, then these parameters report the configuration used by sensing receiver 502-1.

According to some implementations, when sensing receiver 502-1 has calculated sensing measurements and created channel representation information (for example, in form of filtered TD-CRI), the sensing receiver 502-1 may be required to communicate the channel representation information to sensing algorithm manager 506 or sensing transmitter 504-1 including sensing algorithm manager 506. In an example, the sensing measurements may be processed as described to form channel representation information in the form of a sensing imprint and, subsequently, an imprint delta.

In an implementation, to provide a baseline for filtered TD-CRI, a version of sensing imprint is required by sensing algorithm manager 506. In an example, a sensing imprint may be transferred by a management frame and in an example. In an example, a message type may be defined which represents a Sensing Imprint Transmission Message.

In an example, the filtered TD-CRI may be transferred by a management frame. In an example, a message type may be defined which represents a Delta CRI Message.

Figure 13:
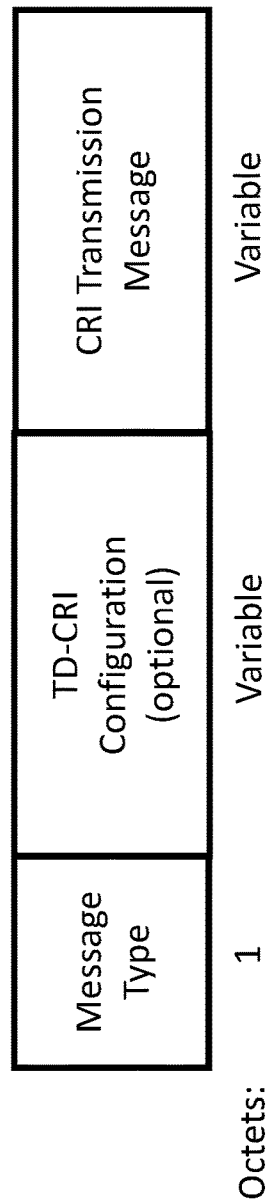
FIG. 13 illustrates a management frame carrying a Channel Representation Information (CRI) transmission message, according to some embodiments.

FIG. 13 illustrates an example of a component of a management frame 1300 carrying a CRI transmission message, according to some embodiments. In an example, system 500 may require acknowledgement frames and the management frame carrying the CRI transmission message may be implemented as an Action frame and in another example, system 500 may not require acknowledgement frames and the management frame carrying the CRI transmission message may be implemented as an Action No Ack frame. Examples of CRI transmission message and TD-CRI configuration elements are shown in Table 5. Further, Delta CRI Message Element details are shown in Table 6.

TABLE 5

| | | | | |
|---|---|---|---|---|
| | CRI Transmission Message and TD-CRI Configuration Elements |
| Value | Message Type | Message Direction | TD-CRI Configuration | CRI Transmission Message |
| 6 | Delta CRI Message | Sensing receiver to sensing transmitter including sensing algorithm manager Sensing receiver to sensing algorithm manager | Optional In the CRI transmission sent by the sensing receiver, this element is present if filtered TD-CRI are being sent and absent if CSI are being sent. If this element is present, the TD-CRI configuration that was used to create the filtered TD-CRI may be sent along with the filtered TD-CRI values. In another example, if this element is present, the element may contain a bit flag to indicate that the sensing receiver applied the TD-CRI configuration that was in the sensing transmission announcement or sensing measurement poll message which triggered the response. Alternatively, the element may contain multiple bit flags, one for each aspect of the TD-CRI configuration, to indicate which of the aspects of the TD-CRI configuration were applied. | Delta CRI Message as defined in Table 6. |
| 7 | Sensing Imprint Transmission Message | Sensing receiver to sensing transmitter including sensing algorithm manager Sensing receiver to sensing algorithm manager | N/A | Sensing imprint Transmission Message as defined in Table 7. |

TABLE 6

| Name | Type | Valid Range | Description |
| --- | --- | --- | --- |
| CRI Transmission Message Element Version | 4-bit value | 1 | Version number of the CRI Transmission Message Element.<br>0, 2 . . . 15: Reserved<br>1: Lossless TD-CRI |
| CRI Transmission Message Type | 1-bit value | 0 or 1 | Specifies the type of delta CRI included in the table and the numerical representation of the delta CRI.<br>0: Delta CRI is represented by time domain pulses which replace those in a sensing imprint.<br>In examples, the number of bits that represent the time domain pulses is the same as the number of bits that is used to store a time domain pulse in a sensing imprint.<br>1: Delta CRI is represented by imprint deltas which add to time domain pulses in a sensing imprint.<br>In examples, the number of bits that represent the imprint delta is the less than the number of bits that is used to store a time domain pulse in a sensing imprint. |
| IFFT Length | Integer | NFFT | Specifies the length of the IFFT used to calculate the full TD-CRI from the CSI. This value describes the maximum number of active time domain pulses which may be returned in the filtered TD-CRI and therefore the length of the bit field that represents the active time domain pulses. |
| Active Time Domain Pulses | Bit field | Length of NFFT with 1 representing an active time domain pulse | Specifies the position in the full TD-CRI of an active time domain pulse including DC tones and guard tones (i.e., up to a maximum value of NFFT). A value of 0 means that a tone is vacant and a value of 1 means that a tone is occupied. There follows in this element exactly one magnitude value and one phase value for each value of 1 in the bit field.<br>The MSB of the bit field represents the earliest tone (in time) in the filtered TD-CRI. |
| CRI Amplitude 1 | Unsigned Float | [0.0, 1.0] | Amplitude value for the first active time domain pulse. |
| CRI Phase 1 | Signed Float | [$-\pi/2$, $\pi/2$) | Phase value for the first active time domain pulse. |
| . | . | . | . |
| . | . | . | . |
| . | . | . | . |
| CRI Amplitude m | Unsigned Float | [0.0, 1.0] | Amplitude value for the mth active time domain pulse. |
| CRI Phase m | Signed Float | [$-\pi/2$, $\pi/2$) | Phase value for the mth active time domain pulse. |

Table 6 shows an example of a Delta CRI Message Element which transfers the TD-CRI using a bit field to represent the active (included/selected) time domain pulses whilst accounting for DC tones and guard tones. Other examples of data representation are described earlier and in examples, the Delta CRI Message Element may be adjusted to reflect those data schemes.

Table 7 shows an example of a Sensing Imprint Transmission Message Element which transfers a sensing imprint from sensing receiver 502-1 to sensing algorithm manager 506 or to sensing transmitter 504-1 including sensing algorithm manager 506. An example of a format of data storage for a sensing imprint for a single sensing receiver (i.e., sensing receiver 502-1) has been described in Table 1. In an example, the data structure described in Table 7 may be transferred via the Sensing Imprint Transmission Message Element or it may be compressed prior to transmission using any available lossless compression technique. In an example, the data that describes the sensing imprint is accompanied by a header which describes the format of the data as well as the devices and configurations that the data is associated with.

TABLE 7

Sensing Imprint Transmission Message Element Details

| Name | Type | Valid Range | Description |
| --- | --- | --- | --- |
| Sensing imprint data type | 2-bit field | 0 . . . 3 | Specifies the format of the sensing imprint data.<br>00: Uncompressed as Table 1.<br>01 . . . 11: Reserved |
| Sensing imprint header | | | Header containing sensing transmitter identifier and the delivered transmission configuration associated with the sensing imprint data |
| Sensing imprint invalid | 1-bit field | 0 or 1 | If set, then the current version of sensing imprint associated with the sensing imprint header information is removed from the data storage maintained by sensing algorithm manager. In this case, any following data is discounted.<br>If clear then the following sensing imprint data is added to the data storage maintained by sensing algorithm manager. If there is already a version of sensing imprint related to sensing receiver and sensing transmitter and delivered transmission configuration included in the sensing imprint header then this is replaced by the data contained in this Element.<br>In an example, a value of imprint validity period is stored with the sensing imprint after which the sensing imprint may be automatically removed from the data storage maintained by sensing algorithm manager. |
| Sensing imprint data | | variable | Sensing imprint data as defined in Table 1 to be added to the data storage maintained by sensing algorithm manager. |

TABLE 7-continued

In an implementation, when sensing algorithm manager 506 is implemented on a separate device (i.e., is not implemented within sensing transmitter 504-1), a management frame may not be necessary, and the sensing imprint and the TD-CRI may be encapsulated in a standard IEEE 802.11 data frame and transferred to sensing algorithm manager 506. In an example, the data structure described in Tables 6 and 7 may be used to format the sensing imprint and the TD CRI data. In an example, a proprietary header or descriptor may be added to the data structure to allow sensing algorithm manager 506 to detect that the data structure is of the form of a Sensing imprint Transmission Message Element or a Delta CRI Message Element. In an example, data may be transferred in the format shown in FIG. 13 and sensing algorithm manager 506 may be configured to interpret the Message Type value that represents a Sensing imprint Transmission Message Element and a Delta CRI Message Element.

Figure 14:
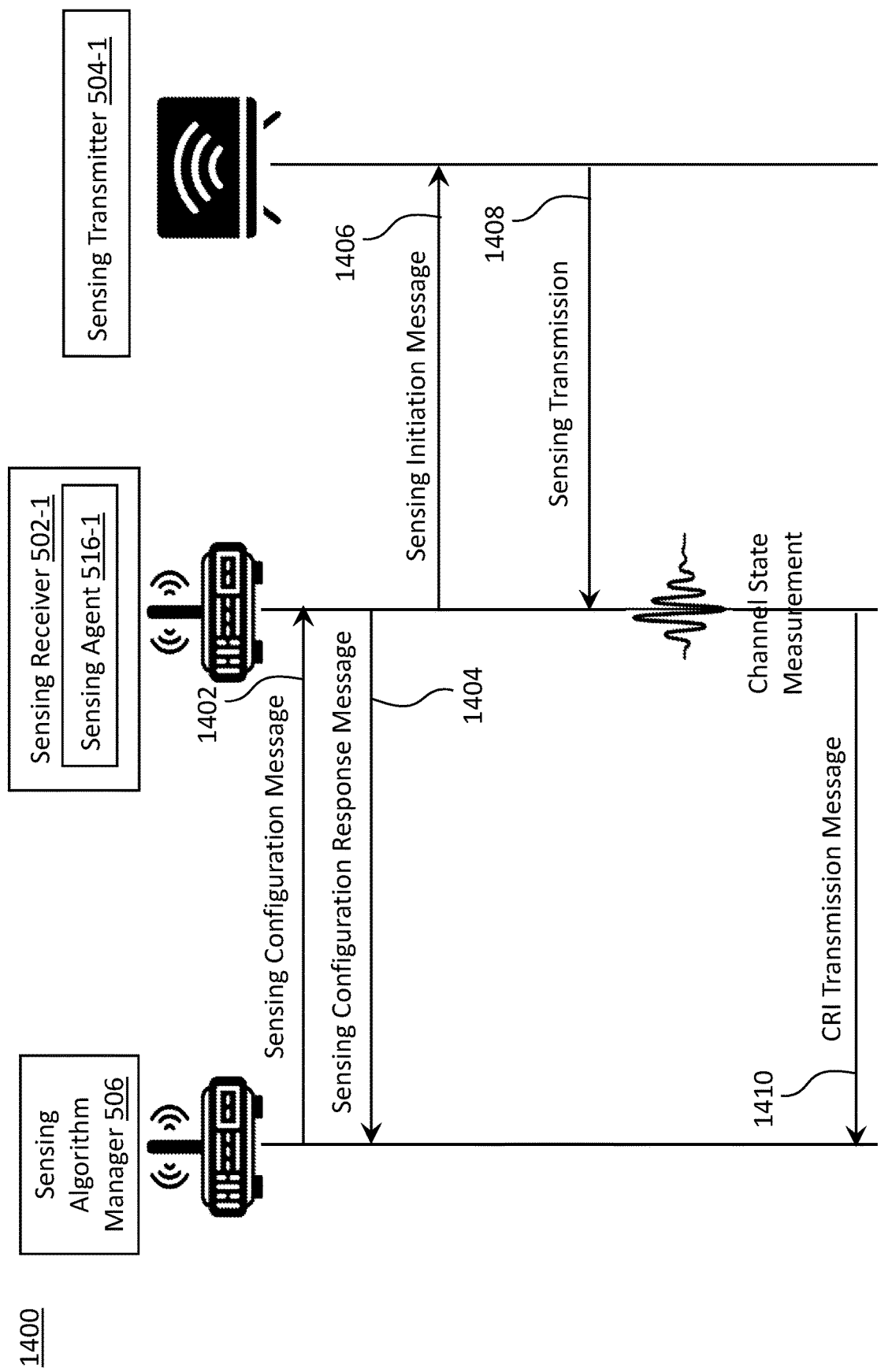
FIG. 14 depicts a sequence diagram for communication between a sensing receiver, a sensing transmitter, and a sensing algorithm manager, where the sensing receiver is a sensing initiator, according to some embodiments.

FIG. 14 depicts sequence diagram 1400 for communication between sensing receiver 502-1, sensing transmitter 504-1, and sensing algorithm manager 506, where sensing receiver 502-1 is a sensing initiator, according to some embodiments. FIG. 14 shows an example of a network (for example, 802.11 network) where sensing algorithm manager 506 is a separate device.

As shown in FIG. 14, at step 1402, sensing algorithm manager 506 may send a sensing configuration message to sensing receiver 502-1. In an example, the sensing configuration message may include TD-CRI configuration parameters. At step 1404, in response to the sensing configuration message, sensing receiver 502-1 may send an acknowledgment using a sensing configuration response message and configure sensing agent 516-1 with the TD-CRI configuration parameters for use in generating filtered TD-CRI. At step 1406, sensing receiver 502-1 may initiate a sensing session and send a sensing initiation message to sensing transmitter 504-1 requesting a sensing transmission. At step 1408, sensing transmitter 504-1 may send a sensing transmission to sensing receiver 502-1 in response to the sensing initiation message. Upon receiving the sensing transmission, sensing receiver 502-1 may perform a channel state measurement on the received sensing transmission and generate channel representation information using the TD-CRI configuration parameters. In an example, the sensing receiver 502-1 may generate filtered TD-CRI. At step 1410, sensing receiver 502-1 may send a CRI transmission message including the channel state measurement (i.e., the filtered TD-CRI) to sensing algorithm manager 506 over the air for further processing.

Figure 15:
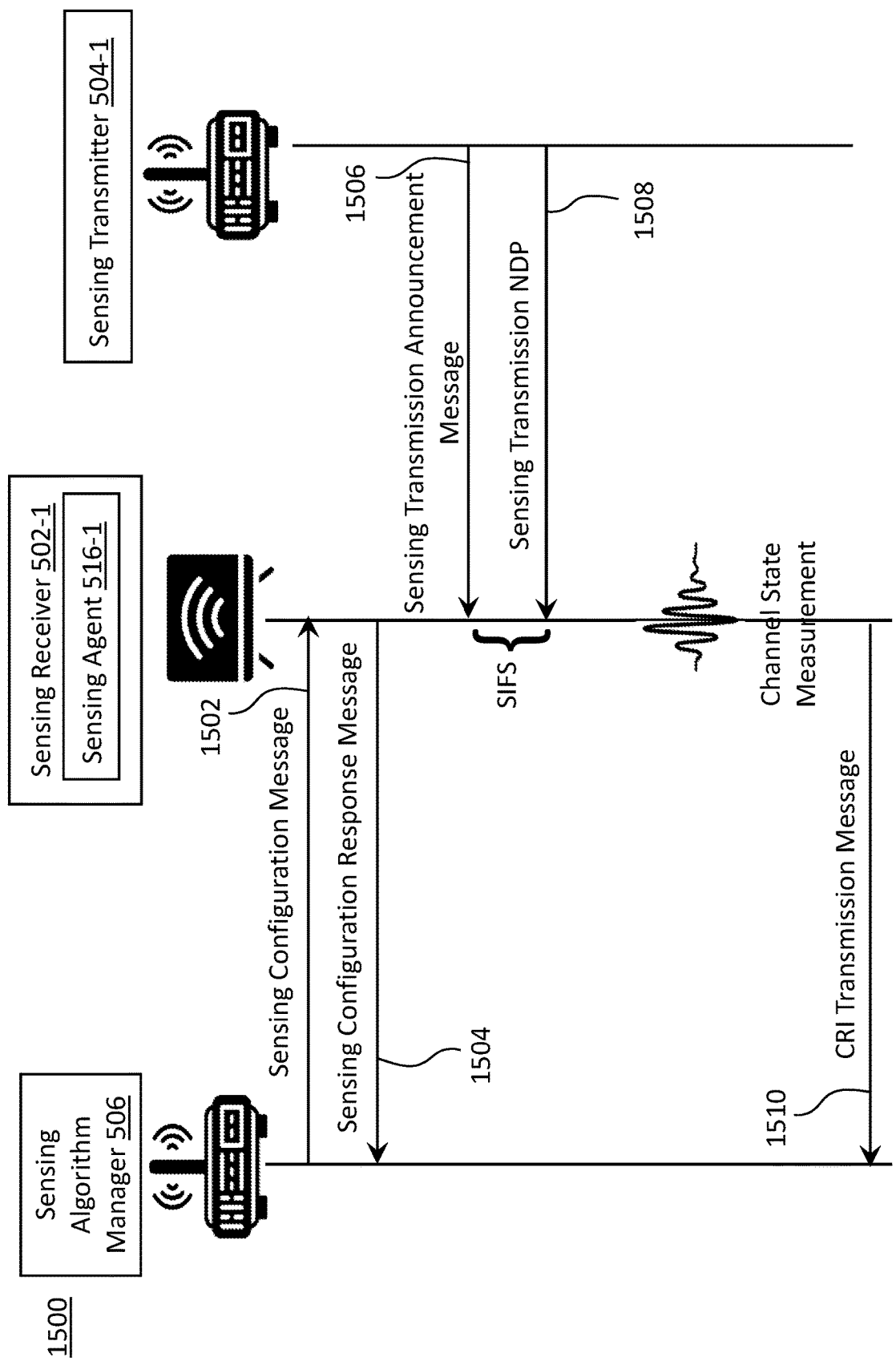
FIG. 15 depicts a sequence diagram for communication between a sensing receiver, a sensing transmitter, and a sensing algorithm manager, where the sensing transmitter is a sensing initiator, according to some embodiments.

FIG. 15 depicts sequence diagram 1500 for communication between sensing receiver 502-1, sensing transmitter 504-1, and sensing algorithm manager 506, where sensing transmitter 504-1 is a sensing initiator, according to some embodiments. FIG. 15 shows an example of a network (for example, 802.11 network) where sensing algorithm manager 506 is a separate device.

As shown in FIG. 15, at step 1502, sensing algorithm manager 506 may send a sensing configuration message to sensing receiver 502-1. In an example, the sensing configuration message may include TD-CRI configuration parameters. At step 1504, in response to the sensing configuration message, sensing receiver 502-1 may send an acknowledgment using a sensing configuration response message and configure sensing agent 516-1 with the TD-CRI configuration parameters for use in generating filtered TD-CRI. At step 1506, sensing transmitter 504-1 may initiate a sensing session and send a sensing transmission announcement message followed by a sensing transmission NDP to sensing receiver 502-1. As described in step 1508, the sensing transmission NDP follows the sensing transmission announcement message after one SIFS. In an example, the duration of SIFS is 10 μs. Sensing receiver 502-1 may perform a channel state measurement on the sensing transmission NDP and generate channel representation information based on the TD-CRI configuration parameters. In an example, the sensing receiver 502-1 may generate filtered TD-CRI. At step 1510, sensing receiver 502-1 may send a CRI transmission message including the channel state measurement (i.e., the filtered TD-CRI) to sensing algorithm manager 506 over the air for further processing.

Figure 16:
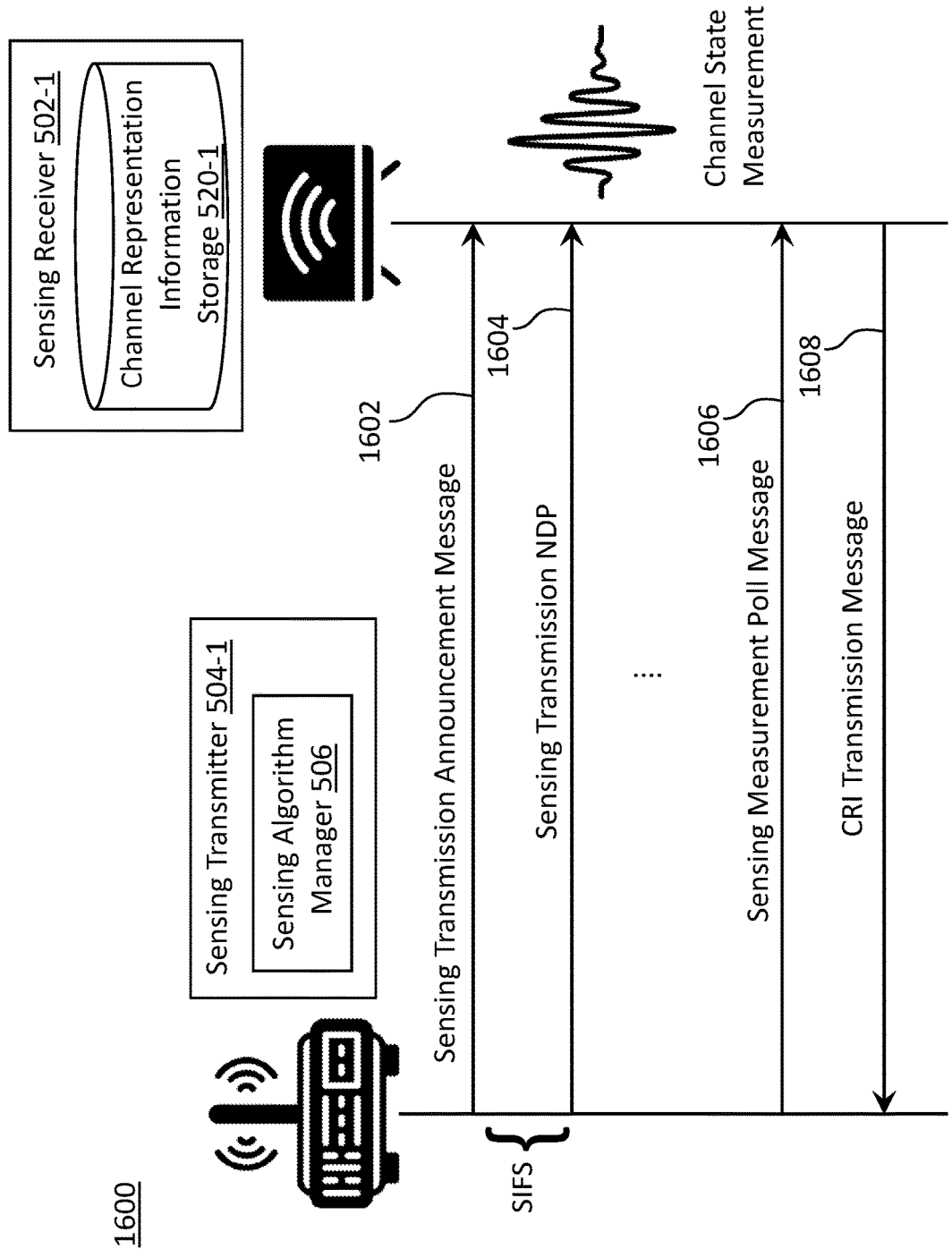
FIG. 16 depicts a sequence diagram for communication between a sensing receiver and a sensing transmitter including a sensing algorithm manager, where the sensing transmitter is a sensing initiator, according to some embodiments.

FIG. 16 depicts sequence diagram 1600 for communication between sensing receiver 502-1 and sensing transmitter 504-1 including sensing algorithm manager 506, where sensing transmitter 504-1 is a sensing initiator, according to some embodiments. FIG. 16 shows an example of a network (for example, 802.11 network) where sensing transmitter 504-1 includes sensing algorithm manager 506.

As shown in FIG. 16, at step 1602, sensing transmitter 504-1 may initiate a sensing session and may send a sensing transmission announcement message followed by a sensing transmission NDP to sensing receiver 502-1. In an example, the sensing transmission announcement message may include TD-CRI configuration parameters. As described in step 1604, the sensing transmission NDP follows the sensing transmission announcement message after one SIFS. In an example, the duration of SIFS is 10 μs. In an implementation, sensing receiver 502-1 may perform a channel state measurement on the sensing transmission NDP and generate channel representation information based on the TD-CRI configuration parameters. In an example, the sensing receiver 502-1 may generate filtered TD-CRI. In an implementation, sensing receiver 502-1 may store the channel state measurement in a temporary storage, such as channel representation information storage 520-1. In an example, sensing receiver 502-1 may hold the channel state measurement until it receives a sensing measurement poll message. At step 1606, sensing transmitter 504-1 may send a sensing measurement poll message to sensing receiver 502-1 which triggers sensing receiver 502-1 to send an already formatted channel state measurement (i.e., filtered TD-CRI) and transfer the channel state measurement to sensing transmitter 504-1. In another example, at step 1606, sensing transmitter 504-1 may send a sensing measurement poll message to sensing receiver 502-1 which triggers sensing receiver 502-1 to format the channel state measurement (i.e., create filtered TD-CRI) and transfer the channel state measurement to sensing transmitter 504-1. At step 1608, sensing receiver 502-1 may send a CRI transmission message including the channel state measurement (i.e., the filtered TD-CRI) to sensing transmitter 504-1 over the air. In an implementation, sensing algorithm manager 506 may further process the channel state measurement. In some implementations, sensing transmitter 504-1 may include the TD-CRI configuration parameters in the sensing measurement poll message. According to some implementations, sensing transmitter 504-1 may request the channel representation information in multiple formats using multiple sensing measurement poll messages.

According to an implementation, when a sensing transmission is made between sensing transmitter 504-1 and sensing receiver 502-1 (and vice-versa) which are fixed in space (i.e., not mobile), motion in the sensing space typically results in some, but not all, time domain pulses of a channel impulse response changing character. Additionally, if motion occurs in the sensing space and not in very close proximity to sensing receiver 502-1 or sensing transmitter 504-1, the constituent time domain pulses of the channel impulse response are highly decorrelated (there is very low cross-pulse correlation). This means that each time domain pulse is impacted independently of all others. As a consequence, the entire channel impulse response may be communicated to sensing algorithm manager 506 by identifying only the changes (in phase and amplitude) of the subset of the time domain pulses that are affected by the motion or movement. Accordingly, the amount of information transmitted from sensing receiver 502-1 to sensing algorithm manager 506 is significantly reduced by sending a filtered TD-CRI instead of all of the frequency domain CSI values provided by the baseband receiver. Accordingly, minimizing the amount of information transmitted between sensing receiver 502-1 and sensing algorithm manager 506 minimizes the overhead that system 500 puts on the Wi-Fi network. Also, in scenarios where the CSI may be passed from the MAC layer to higher layers, minimizing the amount of information passed reduces the traffic on data busses and saves microprocessor and memory activity and hence reduces power use of system 500.

According to an aspect of the present disclosure, if sensing receiver 502-1 sends filtered TD-CRI including only the time domain pulses that are impacted by the changes in the propagation channel impulse response, significantly fewer values compared with CSI values may be sent from sensing receiver 502-1 to sensing algorithm manager 506. As a result, the amount of information that is communicated from sensing receiver 502-1 to sensing algorithm manager 506 may be reduced significantly. Further, when sensing algorithm manager 506 receives the filtered TD-CRI including the time domain pulses that are impacted by the changes in the propagation channel impulse response together with an indication of the location of the time domain pulses in the time domain representation from sensing receiver 502-1, sensing algorithm manager 506 can reconstruct a time domain representation by combining the time domain pulses of the filtered TD-CRI with those of an identified sensing imprint in the correct location to form a reconstructed filtered TD-CRI and performing an FFT on the reconstructed filtered TD-CRI. As a result, near-exact frequency domain CSI is obtained (i.e., the R-CSI is nearly identical to the CSI). Therefore, according to aspects of the present disclosure, a near-lossless channel representation is achieved while still significantly decreasing the amount of data transmitted as compared to transmitting the CSI itself.

Figure 17A:
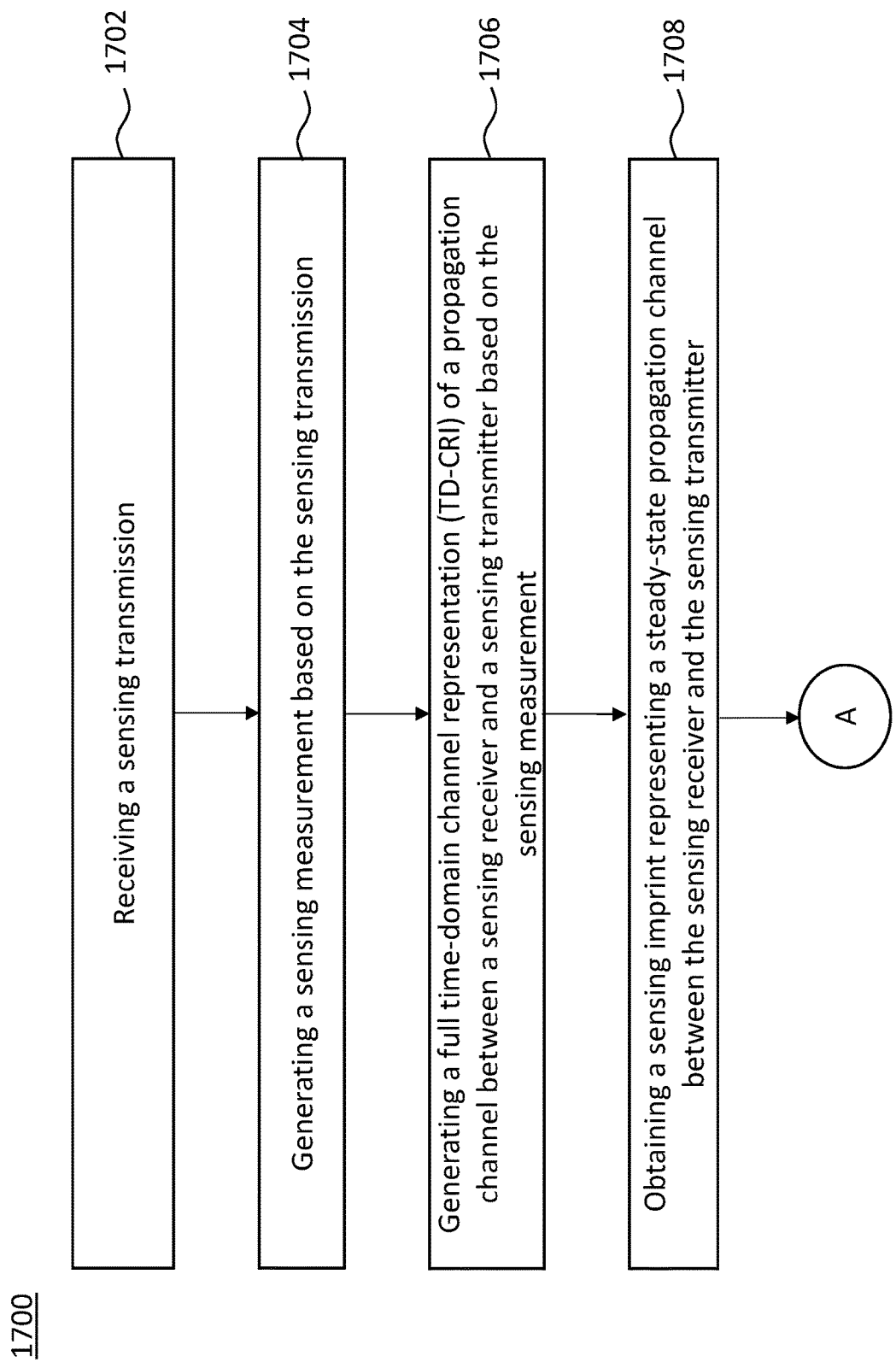
FIGS. 17A and 17B depict a flowchart for sending a filtered TD-CRI to a sensing algorithm manager, according to some embodiments.
Figure 17B:
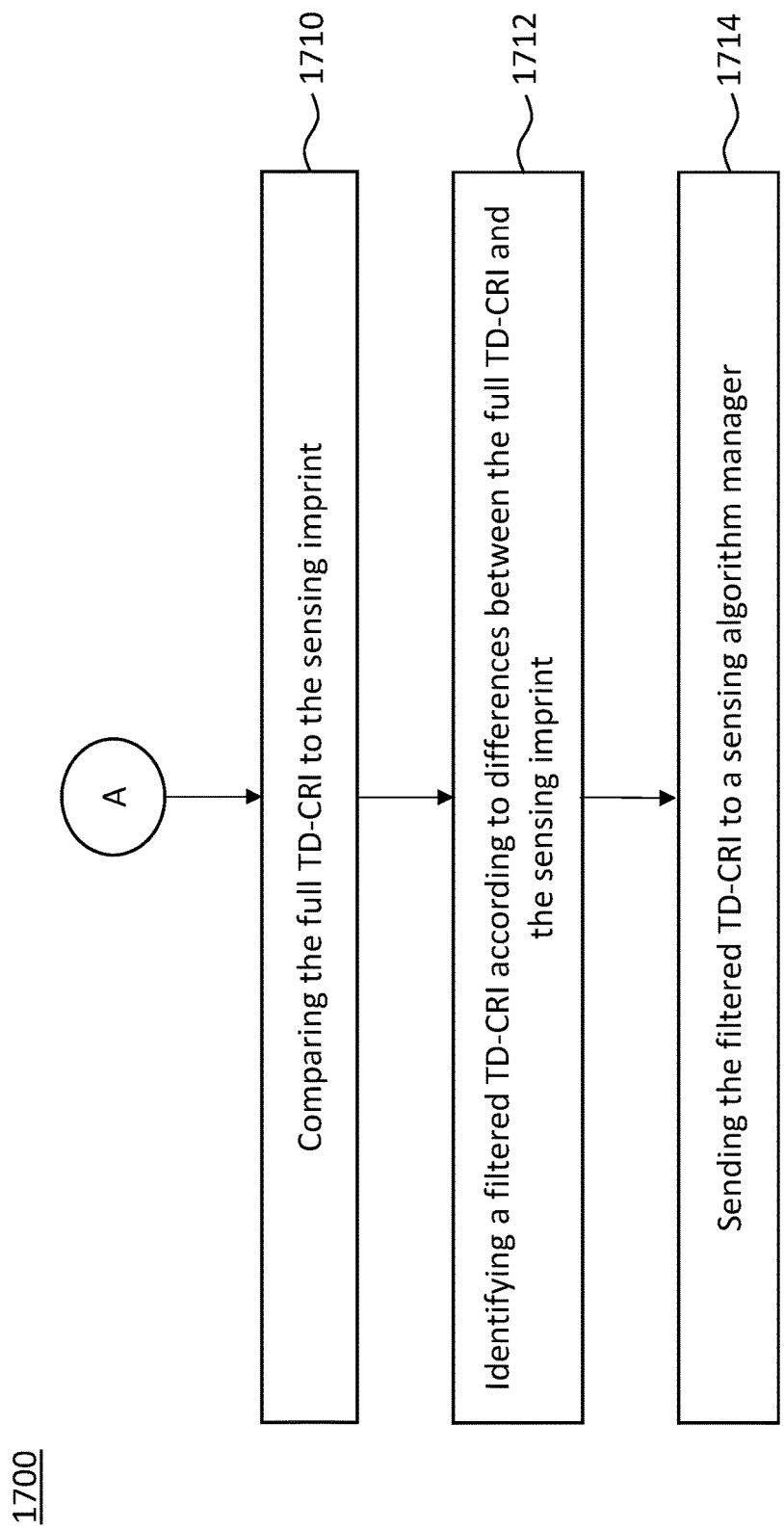

FIGS. 17A and 17B depicts flowchart 1700 for sending a filtered TD-CRI to sensing algorithm manager 506, according to some embodiments. In a brief overview of an implementation of flowchart 1700, at step 1702, a sensing transmission is received. At step 1704, a sensing measurement is generated based on the sensing transmission. At step 1706, a full TD-CRI of a propagation channel between sensing receiver 502-1 and sensing transmitter 504-1 is generated based on the sensing measurement. At step 1708, a sensing imprint representing a steady-state propagation channel between sensing receiver 502-1 and sensing transmitter 504-1 is obtained. At step 1710, the full TD-CRI is compared to the sensing imprint. At step 1712, a filtered TD-CRI is identified according to differences between the full TD-CRI and the sensing imprint. At step 1714, the filtered TD-CRI is sent to sensing algorithm manager 506.

Step 1702 includes receiving a sensing transmission. In an implementation, sensing receiver 502-1 may receive the sensing transmission from sensing transmitter 504-1.

Step 1704 includes generating a sensing measurement based on the sensing transmission. In an implementation, sensing receiver 502-1 may generate the sensing measurement based on the sensing transmission.

Step 1706 includes generating a full TD-CRI of a propagation channel between sensing receiver 502-1 and sensing transmitter 504-1 based on the sensing measurement. In an implementation, sensing receiver 502-1 may generate the full TD-CRI of the propagation channel between sensing receiver 502-1 and sensing transmitter 504-1 based on the sensing measurement.

Step 1708 includes obtaining a sensing imprint representing a steady-state propagation channel between sensing receiver 502-1 and sensing transmitter 504-1. In an implementation, sensing receiver 502-1 may obtain the sensing imprint representing the steady-state propagation channel between sensing receiver 502-1 and sensing transmitter 504-1. In an example, sensing receiver 502-1 may obtain the sensing imprint by retrieving the sensing imprint from sensing imprint storage 518-1.

Step 1710 includes comparing the full TD-CRI to the sensing imprint. In an implementation, sensing receiver 502-1 may compare the full TD-CRI to the sensing imprint.

Step 1712 includes identifying a filtered TD-CRI according to differences between the full TD-CRI and the sensing imprint. In an implementation, sensing receiver 502-1 may identify the filtered TD-CRI according to differences between the full TD-CRI and the sensing imprint. In an example, sensing receiver 502-1 may identify the filtered TD-CRI based on determining first time domain pulses of the full TD-CRI that differ from second time domain pulses of the sensing imprint and designating the first time domain pulses as the filtered TD-CRI. In an example, sensing receiver 502-1 may store differences between first time domain pulses of the full TD-CRI and second time domain pulses of the sensing imprint as an imprint delta defining the filtered TD-CRI. The differences stored as the imprint delta require fewer bits than the first time domain pulses. In an example, sensing receiver 502-1 may store only the differences that exceed a measurement imprint delta threshold.

Step 1714 includes sending the filtered TD-CRI to sensing algorithm manager 506. In an implementation, sensing receiver 502-1 may send the filtered TD-CRI to sensing algorithm manager 506. In some implementations, sensing receiver 502-1 may also send a sensing imprint indicator to sensing algorithm device 506.

Figure 18:
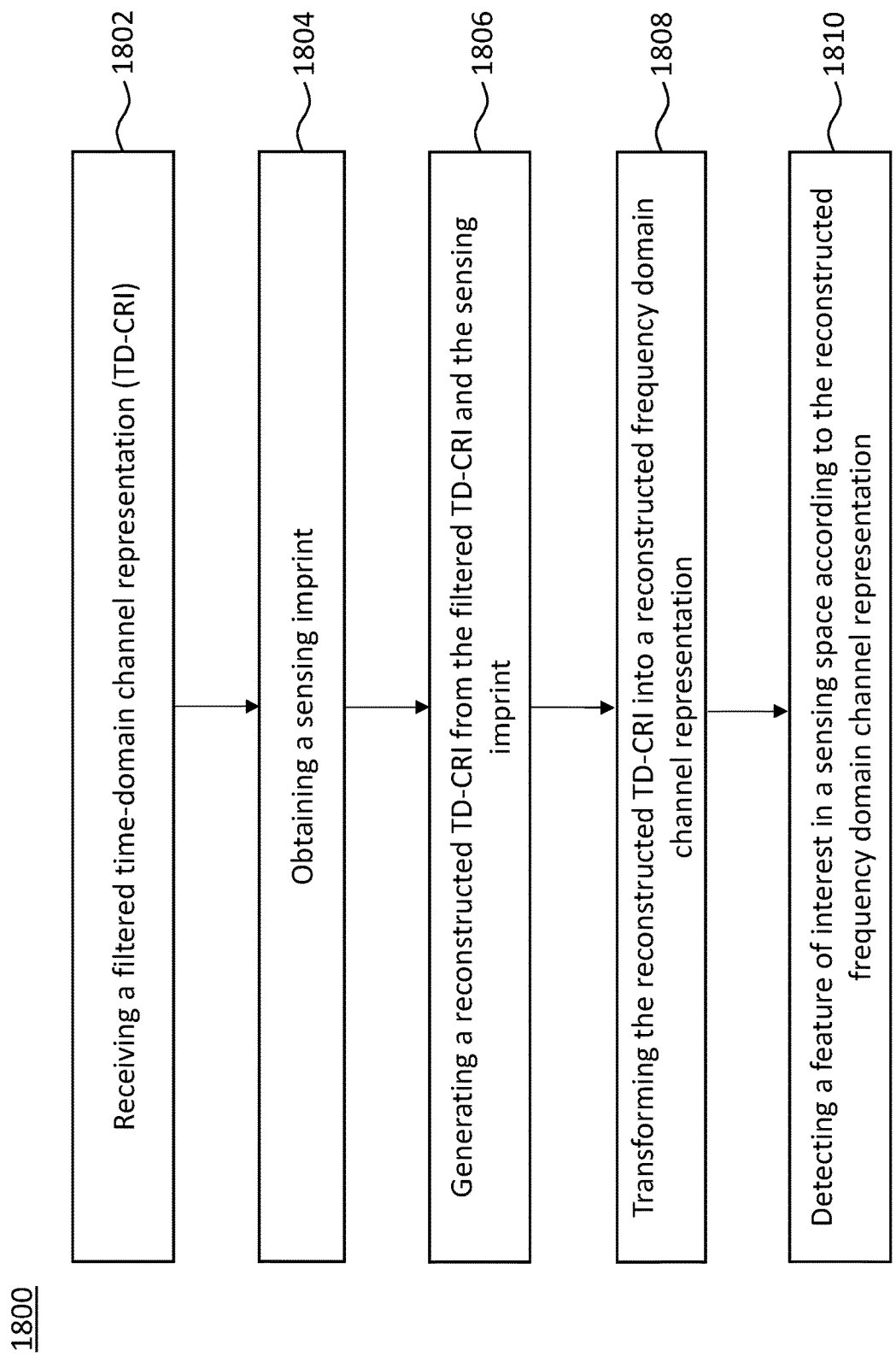
FIG. 18 depicts a flowchart for detecting a feature of interest in a sensing space, according to some embodiments.

FIG. 18 depicts flowchart 1800 for detecting a feature of interest in a sensing space, according to some embodiments. In a brief overview of an implementation of flowchart 1800, at step 1802, a filtered TD-CRI is received. At step 1804, a sensing imprint is obtained. At step 1806, a reconstructed TD-CRI is generated from the filtered TD-CRI and the sensing imprint. At step 1808, the reconstructed TD-CRI is transformed into a reconstructed frequency domain channel representation. At step 1810, a feature of interest is detected in a sensing space according to the reconstructed frequency domain channel representation Step 1802 includes receiving a filtered TD-CRI. In an implementation, sensing algorithm device 506 may receive a filtered TD-CRI from sensing receiver 502-1. In an example, the filtered TD-CRI may include a plurality of time domain pulses. In some implementations, sensing algorithm device 506 may receive an imprint delta storing time domain pulse differences. In an example, sensing algorithm device 506 may receiving a location bitmap indicating locations of the corresponding time domain pulses in the sensing imprint. In an example, sensing algorithm device 506 may receive a sensing imprint indicator.

Step 1804 includes obtaining a sensing imprint. In an implementation, sensing algorithm device 506 may obtain the sensing imprint. In an example, sensing algorithm device 506 may obtain the sensing imprint according to the sensing imprint indicator.

Step 1806 includes generating a reconstructed TD-CRI from the filtered TD-CRI and the sensing imprint. In an implementation, sensing algorithm device 506 may generate the reconstructed TD-CRI from the filtered TD-CRI and the sensing imprint. In an example, sensing algorithm device 506 may generate the reconstructed TD-CRI by replacing corresponding time domain pulses of the sensing imprint with the plurality of time domain pulses. In an example, sensing algorithm device 506 may generate the reconstructed TD-CRI by adding the time domain pulse differences to corresponding time domain pulses of the sensing imprint.

Step 1808 includes transforming the reconstructed TD-CRI into a reconstructed frequency domain channel representation. In an implementation, sensing algorithm device 506 may transform the reconstructed TD-CRI into the reconstructed frequency domain channel representation.

Step 1810 includes detecting a feature of interest in a sensing space according to the reconstructed frequency domain channel representation. In an implementation, sensing algorithm device 506 may detect the feature of interest in the sensing space according to the reconstructed frequency domain channel representation.

Figure 19A:
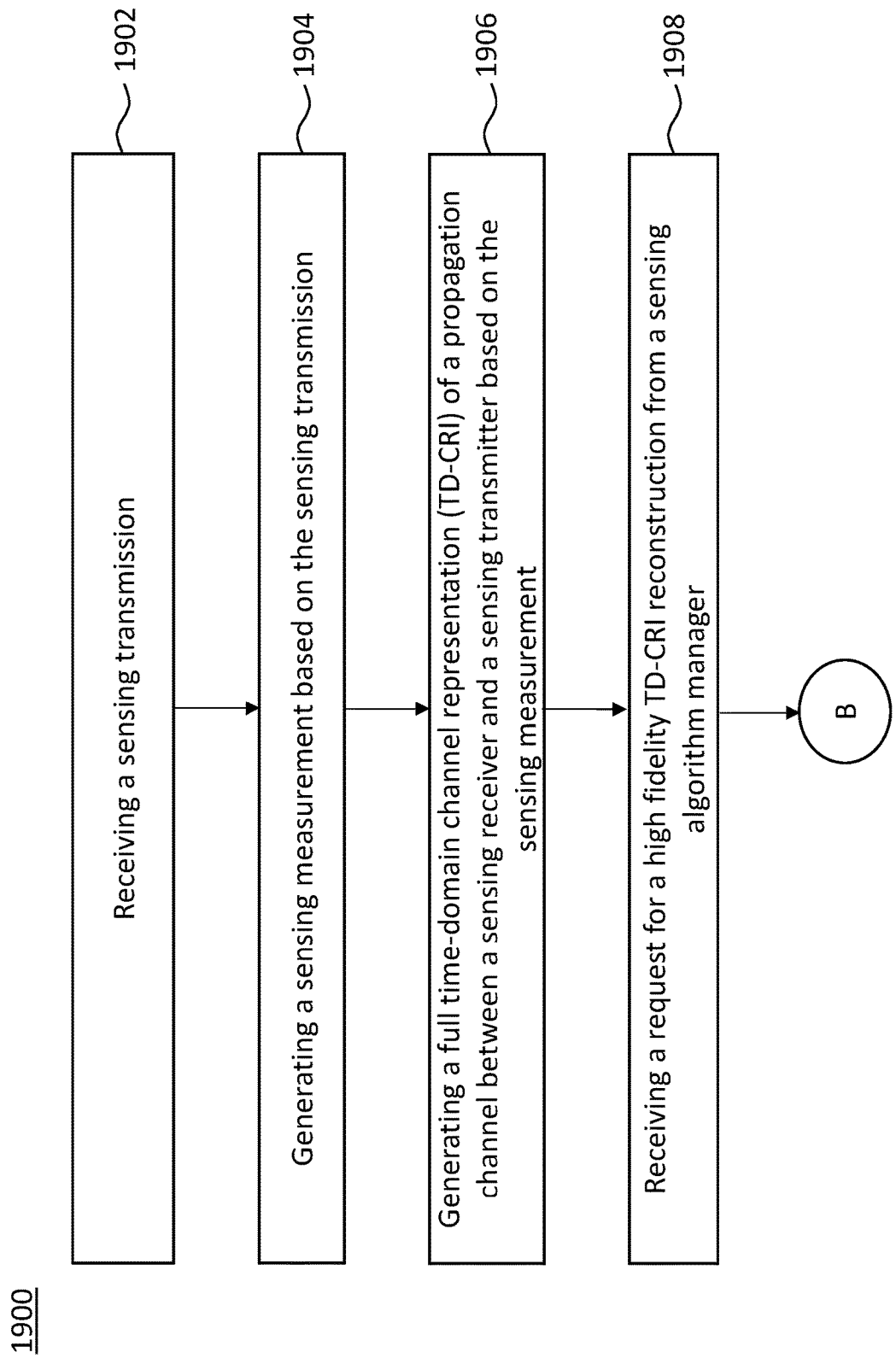
FIGS. 19A and 19B depict a flowchart for transmitting a location bitmap indicating locations in a full TD-CRI to a sensing algorithm manager, according to some embodiments.
Figure 19B:
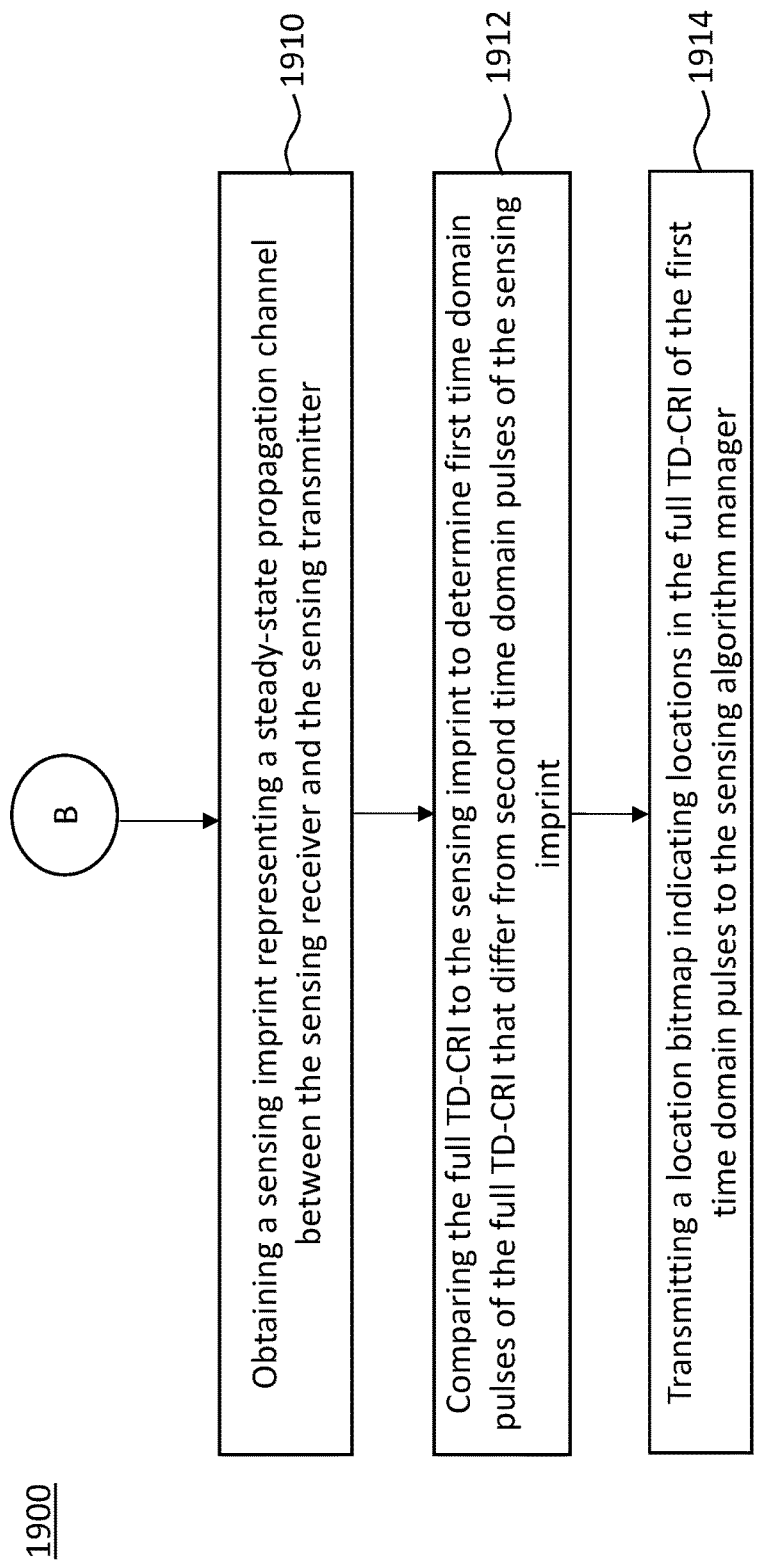

FIGS. 19A and 19B depict flowchart 1900 for transmitting a location bitmap indicating locations in a full TD-CRI of first time domain pulses to sensing algorithm manager 506, according to some embodiments. In a brief overview of an implementation of flowchart 1900, at step 1902, a sensing transmission is received. At step 1904, a sensing measurement is generated based on the sensing transmission. At step 1906, a full TD-CRI of a propagation channel between sensing receiver 502-1 and sensing transmitter 504-1 is generated based on the sensing measurement. At step 1908, a request for a high fidelity TD-CRI reconstruction is received from sensing algorithm manager 506. At step 1910, a sensing imprint representing a steady-state propagation channel between sensing receiver 502-1 and sensing transmitter 504-1 is obtained. At step 1912, the full TD-CRI is compared to the sensing imprint to determine first time domain pulses of the full TD-CRI that differ from second time domain pulses of the sensing imprint. At step 1914, a location bitmap indicating locations in the full TD-CRI of the first time domain pulses is transmitted to sensing algorithm manager 506.

Step 1902 includes receiving a sensing transmission. In an implementation, sensing receiver 502-1 may receive the sensing transmission from sensing transmitter 504-1.

Step 1904 includes generating a sensing measurement based on the sensing transmission. In an implementation, sensing receiver 502-1 may generate the sensing measurement based on the sensing transmission.

Step 1906 includes generating a full TD-CRI of a propagation channel between sensing receiver 502-1 and sensing transmitter 504-1 based on the sensing measurement. In an implementation, sensing receiver 502-1 may generate the full TD-CRI of the propagation channel between sensing receiver 502-1 and sensing transmitter 504-1 based on the sensing measurement.

Step 1908 includes receiving a request for a high fidelity TD-CRI reconstruction from sensing algorithm manager 506. In an implementation, sensing receiver 502-1 may receive the request for the high fidelity TD-CRI reconstruction from sensing algorithm manager 506.

Step 1910 includes obtaining a sensing imprint representing a steady-state propagation channel between sensing receiver 502-1 and sensing transmitter 504-1. In an implementation, sensing receiver 502-1 may obtain the sensing imprint representing the steady-state propagation channel between sensing receiver 502-1 and sensing transmitter 504-1. In an example, sensing receiver 502-1 may obtain the sensing imprint by retrieving the sensing imprint from sensing imprint storage 518-1.

Step 1912 includes comparing the full TD-CRI to the sensing imprint to determine first time domain pulses of the full TD-CRI that differ from second time domain pulses of the sensing imprint. In an implementation, sensing receiver 502-1 may compare the full TD-CRI to the sensing imprint to determine first time domain pulses of the full TD-CRI that differ from second time domain pulses of the sensing imprint.

Step 1914 includes transmitting a location bitmap indicating locations in the full TD-CRI of the first time domain pulses to sensing algorithm manager 506. In an implementation, sensing receiver 502-1 may transmit the location bitmap indicating locations in the full TD-CRI of the first time domain pulses to sensing algorithm manager 506.

Figure 20:
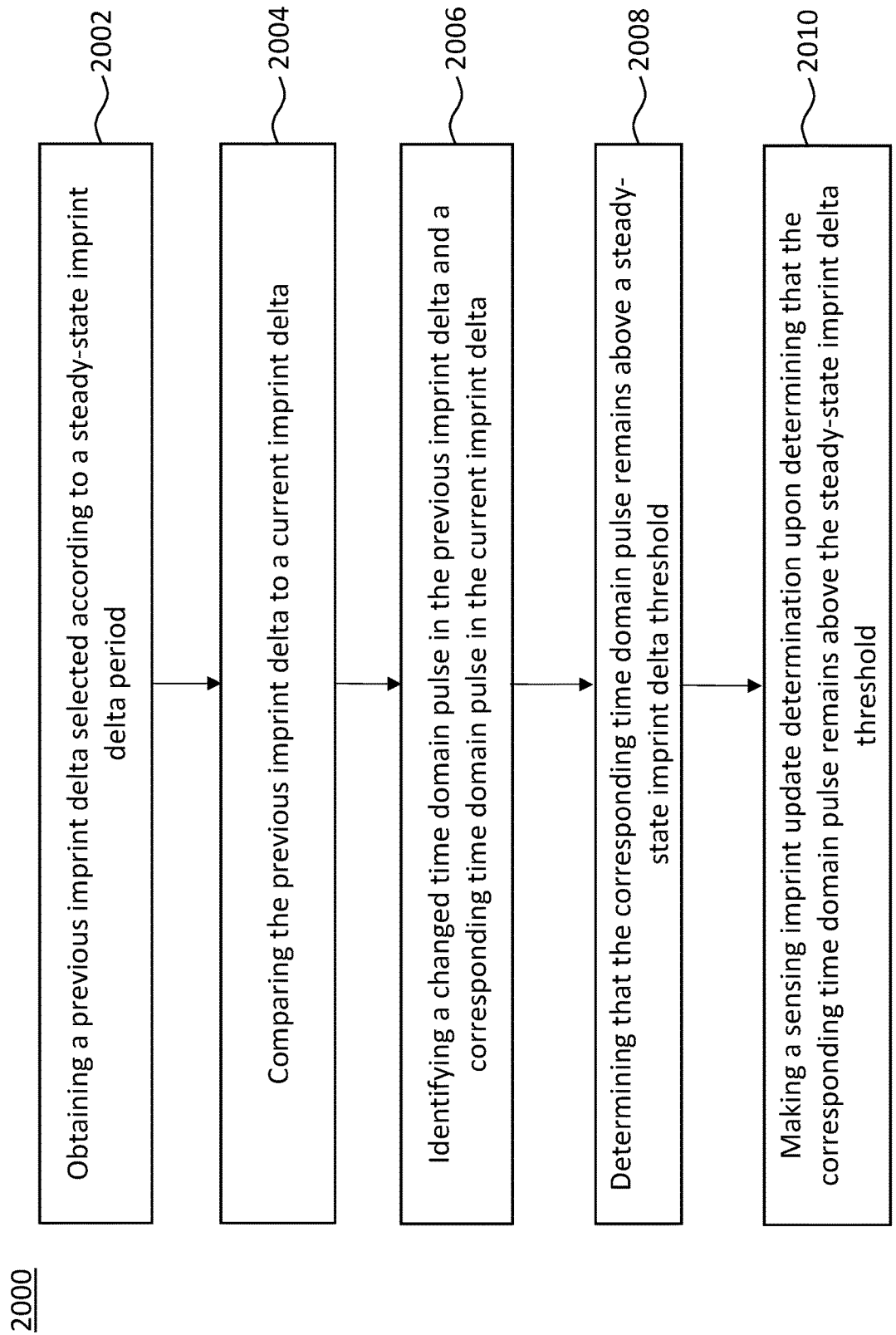
FIG. 20 depicts a flowchart for making a sensing imprint update determination based on a steady-state imprint delta threshold, according to some embodiments.

FIG. 20 depicts flowchart 2000 for making a sensing imprint update determination based on a steady-state imprint delta threshold, according to some embodiments. In a brief overview of an implementation of flowchart 2000, at step 2002, a previous imprint delta selected according to a steady-state imprint delta period is obtained. At step 2004, the previous imprint delta is compared to a current imprint delta. At step 2006, a changed time domain pulse in the previous imprint delta and a corresponding time domain pulse in the current imprint delta are identified. At step 2008, it is determined that the corresponding time domain pulse remains above a steady-state imprint delta threshold. At step 2010, sensing imprint update determination is made upon determining that the corresponding time domain pulse remains above the steady-state imprint delta threshold.

Step 2002 includes obtaining a previous imprint delta selected according to a steady-state imprint delta period. In an implementation, sensing receiver 502-1 may obtain the previous imprint delta selected according to the steady-state imprint delta period. In some implementations, sensing algorithm manager 506 may obtain the previous imprint delta selected according to the steady-state imprint delta period.

Step 2004 includes comparing the previous imprint delta to a current imprint delta. In an implementation, sensing receiver 502-1 may compare the previous imprint delta to the current imprint delta. In some implementations, sensing algorithm manager 506 may compare the previous imprint delta to the current imprint delta.

Step 2006 includes identifying a changed time domain pulse in the previous imprint delta and a corresponding time domain pulse in the current imprint delta. In an implementation, sensing receiver 502-1 may identify the changed time domain pulse in the previous imprint delta and the corresponding time domain pulse in the current imprint delta. In some implementations, sensing algorithm manager 506 may identify the changed time domain pulse in the previous imprint delta and the corresponding time domain pulse in the current imprint delta.

Step 2008 includes determining that the corresponding time domain pulse remains above a steady-state imprint delta threshold. In an implementation, sensing receiver 502-1 may determine that the corresponding time domain pulse remains above the steady-state imprint delta threshold. In some implementations, sensing algorithm manager 506 may determine that the corresponding time domain pulse remains above a steady-state imprint delta threshold.

Step 2010 includes making a sensing imprint update determination upon determining that the corresponding time domain pulse remains above the steady-state imprint delta threshold. In an implementation, sensing receiver 502-1 may make the sensing imprint update determination upon determining that the corresponding time domain pulse remains above the steady-state imprint delta threshold. In some implementations, sensing algorithm manager 506 may make a sensing imprint update determination upon determining that the corresponding time domain pulse remains above the steady-state imprint delta threshold.

Figure 21:
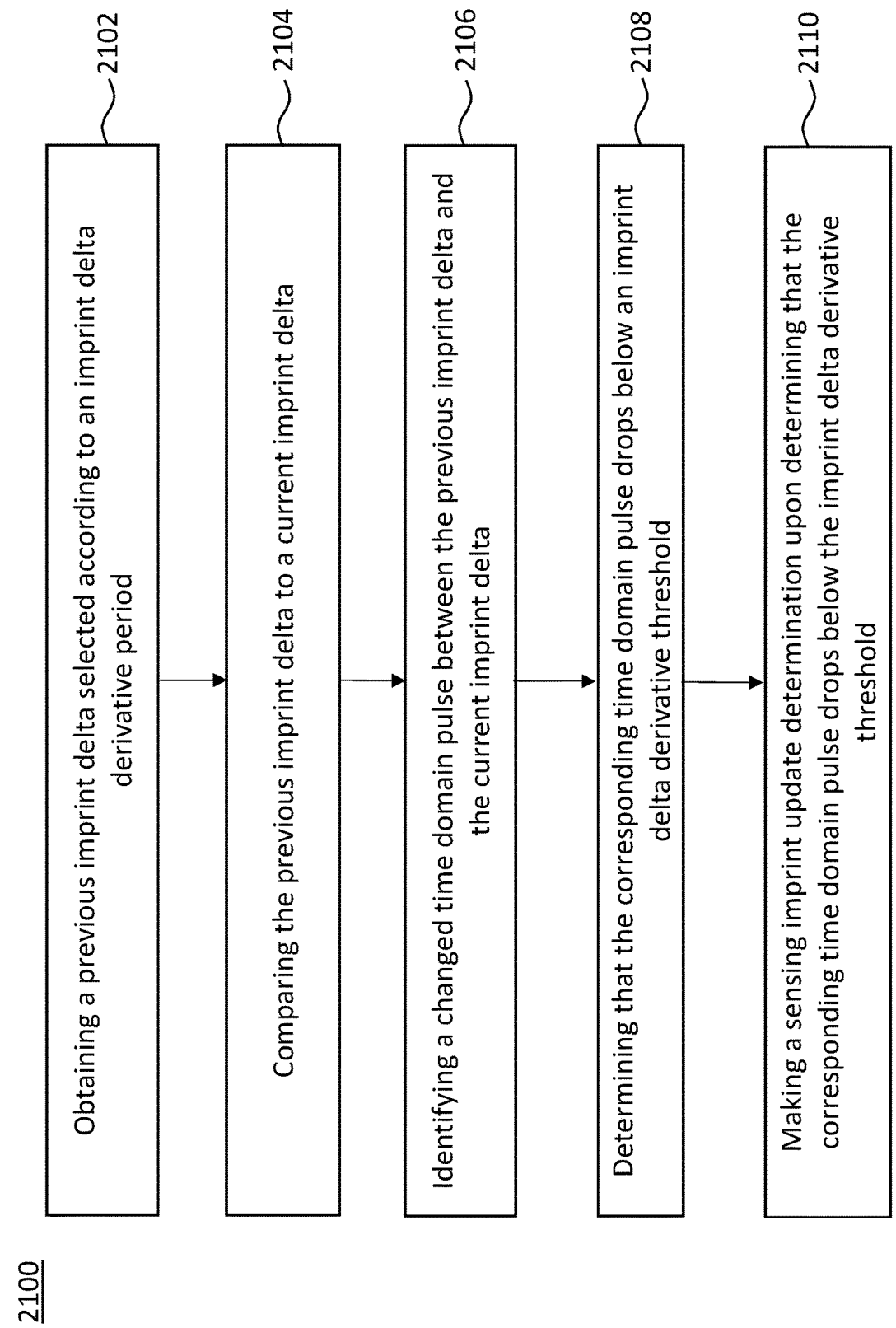
FIG. 21 depicts a flowchart for making a sensing imprint update determination based on an imprint delta derivative threshold, according to some embodiments.

FIG. 21 depicts flowchart 2100 for a sensing imprint update determination based on an imprint delta derivative threshold, according to some embodiments. In a brief overview of an implementation of flowchart 2100, at step 2102, a previous imprint delta selected according to an imprint delta derivative period is obtained. At step 2104, the previous imprint delta is compared to a current imprint delta. At step 2106, a changed time domain pulse between the previous imprint delta and the current imprint delta is identified. At step 2108, it is determined that the corresponding time domain pulse drops below an imprint delta derivative threshold. At step 2110, a sensing imprint update determination is made upon determining that the corresponding time domain pulse drops below the imprint delta derivative threshold.

Step 2102 includes obtaining a previous imprint delta selected according to an imprint delta derivative period. In an implementation, sensing receiver 502-1 may obtain the previous imprint delta selected according to then imprint delta derivative period. In some implementations, sensing algorithm manager 506 may obtain the previous imprint delta selected according to the imprint delta derivative period.

Step 2104 includes comparing the previous imprint delta to a current imprint delta. In an implementation, sensing receiver 502-1 may compare the previous imprint delta to the current imprint delta. In some implementations, sensing algorithm manager 506 may compare the previous imprint delta to the current imprint delta.

Step 2106 includes identifying a changed time domain pulse between the previous imprint delta and the current imprint delta. In an implementation, sensing receiver 502-1 may identify the changed time domain pulse between the previous imprint delta and the current imprint delta. In some implementations, sensing algorithm manager 506 may identify the changed time domain pulse between the previous imprint delta and the current imprint delta.

Step 2108 includes determining that the corresponding time domain pulse drops below an imprint delta derivative threshold. In an implementation, sensing receiver 502-1 may determine that the corresponding time domain pulse drops below the imprint delta derivative threshold. In some implementations, sensing algorithm manager 506 may determine that the corresponding time domain pulse drops below the imprint delta derivative threshold.

Step 2110 includes making a sensing imprint update determination upon determining that the corresponding time domain pulse drops below the imprint delta derivative threshold. In an implementation, sensing receiver 502-1 may make the sensing imprint update determination upon determining that the corresponding time domain pulse drops below the imprint delta derivative threshold. In some implementations, sensing algorithm manager 506 may make the sensing imprint update determination upon determining that the corresponding time domain pulse drops below the imprint delta derivative threshold.

Further embodiments include:

Embodiment 1 is a method for Wi-Fi sensing carried out by a sensing receiver including a transmitting antenna, a receiving antenna, and at least one processor configured to execute instructions, the method comprising: receiving, via the receiving antenna, a sensing transmission; generating, by the at least one processor, a sensing measurement based on the sensing transmission; generating, by the at least one processor, a full time-domain channel representation (TD-CRI) of a propagation channel between the sensing receiver and a sensing transmitter based on the sensing measurement; obtaining, by the at least one processor, a sensing imprint representing a steady-state propagation channel between the sensing receiver and the sensing transmitter; comparing, by the at least one processor, the full TD-CRI to the sensing imprint; identifying, by the at least one processor, a filtered TD-CRI according to differences between the full TD-CRI and the sensing imprint; and sending the filtered TD-CRI to a sensing algorithm manager.

Embodiment 2 is the method of embodiment 1, wherein identifying the filtered TD-CRI includes: determining first time domain pulses of the full TD-CRI that differ from second time domain pulses of the sensing imprint; and designating the first time domain pulses as the filtered TD-CRI.

Embodiment 3 is the method of embodiment 1 or 2, further comprising: obtaining, by the sensing algorithm manager, the sensing imprint; and generating, by the sensing algorithm manager, a reconstructed TD-CRI by replacing corresponding time domain pulses of the sensing imprint with the first time domain pulses of the filtered TD-CRI.

Embodiment 4 is the method of embodiment 2 or 3 further comprising: transmitting, to the sensing algorithm manager, a location bitmap indicating locations in the full TD-CRI of the first time domain pulses.

Embodiment 5 is the method of any of embodiments 1-4, further comprising storing differences between first time domain pulses of the full TD-CRI and second time domain pulses of the sensing imprint as an imprint delta defining the filtered TD-CRI.

Embodiment 6 is the method of embodiment 5, wherein the differences stored as the imprint delta require fewer bits than the first time domain pulses.

Embodiment 7 is the method of embodiment 5 or 6, wherein: storing differences between first time domain pulses of the full TD-CRI and second time domain pulses of the sensing imprint includes storing only the differences that exceed a measurement imprint delta threshold.

Embodiment 8 is the method of embodiment 7, further comprising: obtaining, by the sensing algorithm manager, the sensing imprint; and generating, by the sensing algorithm manager, a reconstructed TD-CRI by adding the differences stored in the imprint delta to corresponding time domain pulses of the sensing imprint.

Embodiment 9 is the method of embodiments 7 or 8, further comprising transmitting, to the sensing algorithm manager, a location bitmap indicating imprint delta locations corresponding to TD-CRI locations.

Embodiment 10 is the method of any of embodiments 1-9, wherein comparing the full TD-CRI to the sensing imprint is performed responsive to a request from the sensing algorithm manager for a high fidelity TD-CRI reconstruction.

Embodiment 11 is the method of any of embodiments 1-10, further comprising transmitting, to the sensing algorithm manager, a sensing imprint indicator.

Embodiment 12 is the method of any of embodiments 1-11, further comprising: making a sensing imprint update determination; and updating, responsive to the sensing imprint update determination, the sensing imprint.

Embodiment 13 is the method of embodiment 12, wherein making the sensing imprint update determination includes: obtaining a previous imprint delta selected according to a steady-state imprint delta period; comparing the previous imprint delta to a current imprint delta; identifying a changed time domain pulse in the previous imprint delta and a corresponding time domain pulse in the current imprint delta; and determining that the corresponding time domain pulse remains above a steady-state imprint delta threshold.

Embodiment 14 is the method of embodiments 12 or 13, wherein making a sensing imprint update determination includes: obtaining a previous imprint delta selected according to an imprint delta derivative period; comparing the previous imprint delta to a current imprint delta; identifying a changed time domain pulse between the previous imprint delta and the current imprint delta; and determining that the corresponding time domain pulse drops below an imprint delta derivative threshold.

Embodiment 15 is the method of any of embodiments 12-14 wherein making a sensing imprint update determination includes determining that an imprint validity timer has expired.

Embodiment 16 is a method for Wi-Fi sensing carried out by a device including a receiving antenna and at least one processor configured to execute instructions, the method comprising: receiving, via the receiving antenna, a filtered TD-CRI; obtaining, by the at least one processor, a sensing imprint; generating, by a sensing algorithm manager, a reconstructed TD-CRI from the filtered TD-CRI and the sensing imprint; transforming the reconstructed TD-CRI into a reconstructed frequency domain channel representation; and detecting, by the sensing algorithm manager, a feature of interest in a sensing space according to the reconstructed frequency domain channel representation.

Embodiment 17 is the method of embodiment 16, wherein: receiving the filtered TD-CRI includes receiving a plurality of time domain pulses, and generating the reconstructed TD-CRI includes replacing corresponding time domain pulses of the sensing imprint with the plurality of time domain pulses.

Embodiment 18 is the method of embodiment 17, further comprising receiving a location bitmap indicating locations of the corresponding time domain pulses in the sensing imprint.

Embodiment 19 is the method of any of embodiments 16-18, wherein: receiving the filtered TD-CRI includes receiving an imprint delta storing time domain pulse differences, and generating the reconstructed TD-CRI includes adding the time domain pulse differences to corresponding time domain pulses of the sensing imprint.

Embodiment 20 is the method of embodiment 19, further comprising receiving a location bitmap indicating locations of the corresponding time domain pulses in the sensing imprint.

Embodiment 21 is the method of any of embodiments 16-20, further comprising receiving a sensing imprint indicator, wherein obtaining the sensing imprint is performed according to the sensing imprint indicator.

Embodiment 22 is the method of any of embodiments 16-21, further comprising making a sensing imprint update determination; and updating, responsive to the sensing imprint update determination, the sensing imprint.

Embodiment 23 is the method of embodiment 22, wherein making a sensing imprint update determination includes: obtaining a previous imprint delta selected according to a steady-state imprint delta period; comparing the previous imprint delta to a current imprint delta; identifying a changed time domain pulse in the previous imprint delta and a corresponding time domain pulse in the current imprint delta; and determining that the corresponding time domain pulse remains above a steady-state imprint delta threshold.

Embodiment 24 is the method of embodiments 22 or 23, wherein making a sensing imprint update determination includes: obtaining a previous imprint delta selected according to an imprint delta derivative period; comparing the previous imprint delta to a current imprint delta; identifying a changed time domain pulse between the previous imprint delta and the current imprint delta; and determining that the corresponding time domain pulse drops below an imprint delta derivative threshold.

Embodiment 25 is the method of any of embodiments 22-24, wherein making a sensing imprint update determination includes determining that an imprint validity timer has expired.

Embodiment 26 is a method for Wi-Fi sensing carried out by a sensing receiver including a transmitting antenna, a receiving antenna, and at least one processor configured to execute instructions, the method comprising: transmitting, via the transmitting antenna, a sensing trigger message; receiving, via the receiving antenna, a sensing transmission from a sensing transmitter; obtaining, by the at least one processor, a channel representation information based on the sensing transmission; identifying, by the at least one processor, that a difference between the channel representation information and a sensing imprint exceeds a threshold, wherein the sensing imprint includes two or more previously measured channel representation information; and sending the channel representation information to a sensing algorithm manager responsive to identifying that the difference exceeds the threshold.

Embodiment 27 is the method of embodiment 26, wherein the sensing imprint represents a steady-state propagation channel between the sensing transmitter and the sensing receiver.

Embodiment 28 is the method of embodiments 26 or 27, wherein the channel representation information includes one or more of Channel State Information (CSI), full time domain channel representation information (TD-CRI), and filtered TD-CRI.

Embodiment 29 is the method of any of embodiments 26-28, wherein the threshold includes one or more of an amplitude threshold or a phase threshold, or a combination of both an amplitude threshold and a phase threshold.

Embodiment 30 is the method of any of embodiments 26-29, wherein the sensing transmission includes a sensing transmission null data PPDU (NDP).

Embodiment 31 is the method of any of embodiments 26-30, further comprising updating, by the at least one processor, the sensing imprint responsive to a change in a semi-static nature of one or more propagation channels between the sensing receiver and the sensing transmitter.

Embodiment 32 is a method for Wi-Fi sensing carried out by a device including a transmitting antenna, a receiving antenna, and at least one processor configured to execute instructions, the method comprising: receiving, via the receiving antenna from a sensing initiator, a threshold; receiving, via the receiving antenna from a sensing transmitter, a sensing transmission announcement message and a sensing transmission null data PPDU (NDP); obtaining, by the at least one processor, a channel representation information based on the sensing transmission NDP; receiving, via the receiving antenna from the sensing initiator, a measurement poll message; identifying, by the at least one processor, that a difference between the channel representation information and a sensing imprint exceeds the threshold, wherein the sensing imprint includes two or more previously measured channel representation information; and sending, by the at least one processor to the sensing initiator via the transmitting antenna, the channel representation information responsive to identifying that the difference exceeds the threshold.

Embodiment 33 is a method for Wi-Fi sensing carried out by a device including a transmitting antenna, a receiving antenna, and at least one processor configured to execute instructions, the method comprising: receiving, via the receiving antenna, a sensing imprint from a sensing receiver; transmitting, via the transmitting antenna, a sensing transmission to the sensing receiver; transmitting, via the transmitting antenna, a measurement poll message; receiving, via the receiving antenna, a channel representation information based on the sensing transmission; identifying, by the at least one processor, that a difference between the channel representation information and the sensing imprint exceeds a threshold, wherein the sensing imprint includes two or more previously measured channel representation information; sending the channel representation information to a sensing algorithm manager responsive to identifying that the difference exceeds the threshold.

Embodiment 34 is a system for Wi-Fi sensing comprising a sensing receiver including: a transmitting antenna, a receiving antenna, and at least one processor configured to execute instructions for: transmitting, via the transmitting antenna, a sensing trigger message; receiving, via the receiving antenna, a sensing transmission from a sensing transmitter; obtaining a channel representation information based on the sensing transmission; identifying that a difference between the channel representation information and a sensing imprint exceeds a threshold, wherein the sensing imprint includes two or more previously measured channel representation information; and sending the channel representation information to a sensing algorithm manager responsive to identifying that the difference exceeds the threshold.

Embodiment 35 is the system of embodiment 34, wherein the sensing imprint represents a steady-state propagation channel between the sensing transmitter and the sensing receiver.

Embodiment 36 is the system of embodiments 34 or 35, wherein the channel representation information includes one or more of Channel State Information (CSI), full time domain channel representation information (TD-CRI), and filtered TD-CRI.

Embodiment 37 is the system of any of embodiments 34-36, wherein the threshold includes one or more of an amplitude threshold or a phase threshold, or a combination of both an amplitude threshold and a phase threshold.

Embodiment 38 is the system of any of embodiments 34-37, wherein the sensing transmission includes a sensing transmission null data PPDU (NDP).

Embodiment 39 is the system of any of embodiments 34-38, wherein the at least one processor is further configured to update the sensing imprint responsive to a change in a semi-static nature of one or more propagation channels between the sensing receiver and the sensing transmitter.

Embodiment 40 is a system for Wi-Fi sensing comprising a device including: a transmitting antenna, a receiving antenna, and at least one processor configured to execute instructions for: receiving, via the receiving antenna from a sensing initiator, a threshold; receiving, via the receiving antenna from a sensing transmitter, a sensing transmission announcement message and a sensing transmission null data PPDU (NDP); obtaining a channel representation information based on the sensing transmission NDP; receiving, via the receiving antenna from the sensing initiator, a measurement poll message; identifying that a difference between the channel representation information and a sensing imprint exceeds the threshold, wherein the sensing imprint includes two or more previously measured channel representation information; and sending to the sensing initiator, via the transmitting antenna, the channel representation information responsive to identifying that the difference exceeds the threshold.

Embodiment 41 is a system for Wi-Fi sensing comprising a device including: a transmitting antenna, a receiving antenna, and at least one processor configured to execute instructions for: receiving, via the receiving antenna, a sensing imprint from a sensing receiver; transmitting, via the transmitting antenna, a sensing transmission to the sensing receiver; transmitting, via the transmitting antenna, a measurement poll message; receiving, via the receiving antenna, a channel representation information based on the sensing transmission; identifying that a difference between the channel representation information and the sensing imprint exceeds a threshold, wherein the sensing imprint includes two or more previously measured channel representation information; sending the channel representation information to a sensing algorithm manager responsive to identifying that the difference exceeds the threshold.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for Wi-Fi sensing carried out by a sensing responder including a transmitting antenna, a receiving antenna, and at least one processor configured to execute instructions, the method comprising:

receiving, via the receiving antenna, a sensing transmission announcement;

receiving, via the receiving antenna and subsequent to receiving the sensing transmission announcement, a plurality of sensing transmissions from a sensing transmitter;

obtaining, by the at least one processor of the sensing responder, a plurality of channel representation information based on the plurality of sensing transmissions;

identifying, by the at least one processor of the sensing responder, that differences between the plurality of channel representation information and a sensing imprint exceed a threshold associated with motion in a sensing space, wherein the sensing imprint is representative of a previously measured CSI and was previously transmitted for sensing measurement processing and wherein the plurality of channel representation information have not been transmitted by the sensing responder;

counting a number of the differences that exceed the threshold; and transmitting, via the transmitting antenna of the sensing responder responsive to identifying that the number of the differences that exceed the threshold is greater than or equal to a delta count value, a sensing measurement report to a sensing initiator.

2. The method of claim 1, wherein each of the plurality of channel representation information includes one or more of Channel State Information (CSI), full time domain channel representation information (TD-CRI), and filtered TD-CRI.

3. The method of claim 1, wherein the threshold includes one or more of an amplitude threshold or a phase threshold, or a combination of both an amplitude threshold and a phase threshold.

4. The method of claim 1, wherein the plurality of sensing transmissions includes a sensing transmission null data PPDU (NDP).

5. The method of claim 1, further comprising updating, by the at least one processor, the sensing imprint responsive to a change in a semi-static nature of one or more propagation channels between the sensing responder and the sensing transmitter.

6. The method of claim 1, wherein the sensing measurement report includes the plurality of channel representation information.

7. The method of claim 1, wherein the previously measured CSI is associated with a lack of motion in a sensing space.

8. The method of claim 1, further comprising updating, by the at least one processor, the sensing imprint according to the plurality of channel representation information responsive to the number of the differences that exceed the threshold being greater than or equal to the delta count value.

9. A system for Wi-Fi sensing comprising a sensing responder including:

a transmitting antenna, a receiving antenna, and at least one processor configured to execute instructions for:

receiving, via the receiving antenna, a sensing transmission announcement;

receiving, via the receiving antenna and subsequent to receiving the sensing transmission announcement, a plurality of sensing transmissions from a sensing transmitter;

obtaining a plurality of channel representation information based on the plurality of sensing transmissions;

identifying that differences between the plurality of channel representation information and a sensing imprint exceed a threshold associated with motion in a sensing space, wherein the sensing imprint is representative of a previously measured CSI and was previously transmitted for sensing measurement processing and wherein the plurality of channel representation information have not been transmitted by the sensing responder;

counting a number of the differences that exceed the threshold; and transmitting, responsive to identifying that the number of the differences that exceed the threshold is greater than or equal to a delta count value, a sensing measurement report to a sensing initiator.

10. The system of claim 9, wherein each of the plurality of channel representation information includes one or more of Channel State Information (CSI), full time domain channel representation information (TD-CRI), and filtered TD-CRI.

11. The system of claim 9, wherein the threshold includes one or more of an amplitude threshold or a phase threshold, or a combination of both an amplitude threshold and a phase threshold.

12. The system of claim 9, wherein the plurality of sensing transmissions includes a sensing transmission null data PPDU (NDP).

13. The system of claim 9, wherein the at least one processor is further configured to update the sensing imprint responsive to a change in a semi-static nature of one or more propagation channels between the sensing responder and the sensing initiator.

14. The system of claim 9, wherein the sensing measurement report includes the plurality of channel representation information.

15. The system of claim 9, wherein the previously measured CSI is associated with a lack of motion in a sensing space.

16. The system of claim 9, wherein the at least one processor is further configured to update the sensing imprint according to the plurality of channel representation information responsive to the number of the differences that exceed the threshold being greater than or equal to the delta count value.

* * * * *